United States Patent

Kai et al.

[11] Patent Number: 5,940,064
[45] Date of Patent: Aug. 17, 1999

[54] DISPLAY-INTEGRATED COORDINATE INPUT DEVICE

[75] Inventors: Tsutomu Kai, Hirakata; Masahiro Yamamoto, Kyoto; Naoyuki Ito, Katano; Shouzou Fujiwara, Ibaraki; Takeshi Okuno, Hirakata; Hideo Koseki, Kanazawa; Masahito Matsunami, Hirakata; Hisashi Tomitani, Ishikawa, all of Japan

[73] Assignee: Matsushita Electric Industrial Co., Inc., Japan

[21] Appl. No.: 08/888,084

[22] Filed: Jul. 3, 1997

Related U.S. Application Data

[62] Division of application No. 08/391,577, Feb. 21, 1995.

[30] Foreign Application Priority Data

| Feb. 21, 1994 | [JP] | Japan | 6-021691 |
| May 23, 1994 | [JP] | Japan | 6-108716 |
| Jul. 5, 1994 | [JP] | Japan | 6-153924 |
| Nov. 16, 1994 | [JP] | Japan | 6-281877 |
| Nov. 16, 1994 | [JP] | Japan | 6-281878 |

[51] Int. Cl.[6] ................................................ G09G 5/00
[52] U.S. Cl. ............................................................. 345/173
[58] Field of Search ........................... 345/173, 174, 345/87

[56] References Cited

U.S. PATENT DOCUMENTS

| 5,418,551 | 5/1995 | Ise | 345/174 |
| 5,491,706 | 2/1996 | Tagawa et al. | 345/174 |
| 5,534,886 | 5/1993 | Nomura et al. | 345/104 |
| 5,581,274 | 12/1996 | Tagawa | 345/174 |

Primary Examiner—Mark K. Zimmerman
Assistant Examiner—Ronald Laneau
Attorney, Agent, or Firm—Morrison & Foerster

[57] ABSTRACT

A liquid crystal module comprises a liquid crystal panel including mutually orthogonal row electrodes and column electrodes and a liquid crystal layer sealed between the electrodes as a display element, a row electrode driving circuit driving the row electrodes of the liquid crystal panel, and a column electrode driving circuit driving the column electrodes. A detecting electrode detects scanning signals applied to the row and column electrodes of the liquid crystal panel by electrically coupling to the electrodes with electrostatic coupling capacity. A coordinate detecting circuit converts the signals obtained from the detecting electrode into row and column coordinates. A correction arithmetic circuit corrects positional differences by using correction parameters of the device which have been obtained from output values of the coordinate detecting circuit beforehand. The display-integrated coordinate input device improves detection precision at the edges of a matrix panel.

26 Claims, 41 Drawing Sheets

Liquid Crystal Panel

640 × 400 dot 0.3mm Pitch (Row, Column)

0.27 × 0.27mm$^2$/Dixel

DISPLAY-INTEGRATED COORDINATE INPUT DEVICE

This application is a division of application Ser. No. 08/391,577, filed Feb. 21, 1995, still pending.

FIELD OF THE INVENTION

The invention relates to a display-integrated coordinate input device in which a tablet for inputting coordinates is integrated with a matrix-type display.

BACKGROUND OF THE INVENTION

Since pen input devices are very useful for the image input of diagrams and the like and are miniature, they are taking the place of other information input means such as keyboards and mouses. Particularly, by combining a display device with a coordinate detection device in one body, input images are displayed rapidly on the display device, and the handling of the device has been improving.

In order to manufacture a coordinate input device having displaying properties at a low price, a display-integrated coordinate input device is disclosed which carries out display and coordinate detection by using time sharing while applying a display electrode, used for the display of a matrix panel such as a liquid crystal display, and also as an electrode for detecting coordinates (Published Unexamined (Laid-open) Japanese Patent Application No. Hei 2-255911).

A conventional display-integrated coordinate input device is explained below.

The principles of a display-integrated tablet in an electrostatic capacity coupling method is disclosed in Published Unexamined (Laid-open) Japanese Patent Application No. Sho 54-24538 and Published Unexamined (Laid-open) Japanese Patent Application No. Sho 62-180417.

As shown in FIG. 37, a conventional display-integrated coordinate input device includes a matrix panel (for example, a liquid crystal panel) 11 having display elements connected to each intersection of mutually orthogonal row electrodes $Y_1$–$Y_n$ and column electrodes $X_1$–$X_m$, an electrode drive circuit consisting of a row electrode drive circuit 12 for driving row electrodes and a column electrode drive circuit 13, a detection electrode 2 for detecting the scanning signals of matrix panel 11, a coordinate detection circuit 3 consisting of a row coordinate detection circuit and a column coordinate detection circuit for detecting row and column coordinates respectively from signals obtained by detection electrode 2, and a control circuit 7 for controlling row electrode drive circuit 12, column electrode drive circuit 13 and coordinate detection circuit 3.

In a display period, a coordinate detection pulse is continuously supplied at one electrode unit from row electrode drive circuit 12 to the row electrodes of matrix panel 11. Along with the coordinate detection pulse supplied to the row electrodes of matrix panel 11, voltage in response to display data is supplied from column electrode drive circuit 13 to the column electrodes of matrix panel 11, providing display.

On the other hand, in a row coordinate detection period, coordinate detection pulse is continuously supplied from the row electrode drive circuit 12 to the row electrodes of matrix panel 11. When the detection electrode 2 is contacted to the predetermined position of matrix panel 11, the row coordinate detection circuit 3 detects the row coordinate at the detection electrode contacting position from a coordinate detection pulse, detected through electrostatic coupling capacity between the detection electrode 2 and the row electrodes. In a column a coordinate detection period, coordinate detection pulse is continuously supplied from the column electrode drive circuit 13 to the column electrodes of the matrix panel 11. When the detection electrode 2 is contacted to a predetermined position of matrix panel 11, column coordinate detection circuit 3 detects the column coordinate at the detection electrode contacting position from a coordinate detection pulse detected through electrostatic coupling capacity between the detection electrode 2 and the column electrodes. Therefore, one matrix panel is used to display images and detect coordinates.

Since obtained row and column coordinate data is immediately displayed as display data, input images such as diagrams and letters look as if they are handwritten on a flat surface.

In addition, the coordinate detection circuit 3 detects a coordinate detection pulse through electrostatic coupling capacity between the detection electrode 2 and the row electrodes, and coordinates are detected from the time when the output becomes maximum (called "peak detection coordinate").

The Positions of coordinates are detected by applying the time when detecting signals become a maximum, so that a positional mistake caused by the height of detection electrode 2 is prevented. This can be understood from a simple model shown in FIG. 38 which detects electrostatic induction signals appearing on the detection electrode 2 by shifting a scanning electrode, connected to power source $V_0$, at a fixed speed v on a sheet electrode, connected to ground.

Suppose a coordinate at the center of the driving electrode is $x_c$; the width of the electrode is $2x_w$; the position of the detection electrode is $P(x_p, y_p, h_p)$; and coupling capacity per unit area of each section of the scanning electrode is $C(x, y)$. Then, output $V(t)$ is expressed as in the following Formula 1.

$$V(t) = \frac{\int_{xa}^{xb} dx \int_{0}^{yL} dy C(xp-x, yp-y, hp) V(x, y)}{\int_{xa}^{xb} dx \int_{0}^{yL} dy C(xp-x, yp-y, hp) + C_{other}}$$

$$= \frac{1}{C_{SUM}} \int_{xa}^{xb} dx \int_{0}^{yL} dy C(xp-x, yp-y, hp) V(x, y)$$

Formula 1

The denominator is set as in the following Formula 2.

$$C_{SUM} = \int_{xa}^{xb} dx \int_{0}^{yL} dy C(xp-x, yp-y, hp) + C_{other}$$

Formula 2

The following Formula 3 is provided, when a coordinate at the center of the driving electrode is $x_c$, scanning speed is v, and time from the beginning of scanning is t.

$$\chi_c = vt - \chi_w$$

Formula 3

Thus, under the conditions that the coupling capacity between detection electrode 2 and the drive electrode stay constant, the following Formula 4 is found when output $V(t)$ is differentiated with time t.

$$\frac{dV(t)}{dt} =$$

Formula 4

-continued $$\frac{1}{C_{SUM}} \int_0^{yL} dy \{ C(x_p - x_a - x_w, y_p - y, h_p) V(x_a + x_w, y) - C(x_p - x_a + x_w, y_p - y, h_p) V(x_a - x_w, y) \} \frac{dx_a}{dt}$$

Under conditions that (1) V(x, y) does not vary in response to x and (2) C(x, y, h) is an even function in regard to x, the differentiated value of output V(t) becomes 0 when the following Formula 5 is satisfied.

$$x_c = x_p \quad \text{Formula 5}$$

Thus, by utilizing the appearance time of the maximum detection signal, the y coordinate of detection electrode 2 is detected, and the x coordinate of detection electrode 2 can be detected without being dependent on h (height) coordinate. Similarly, the x coordinate of detection electrode 2 is detected, and the y coordinate of detection electrode 2 can be detected without being dependent on the h coordinate.

Methods of determining the appearance time of the maximum value include (a) a method of detecting the zero point by using a differential filter (in this case, the potential change of the maximum value is 0), (b) a method of detecting edges and a mid-point (treatment of an average value) (The appearance time of the peak is the same as the average time of appearance times of leading edge and trailing edge of comparator output.) and (c) a method of detecting peak values by a curve of the second order (by approximating a detection signal waveform around the maximum value, the peak appearance time is measured based on the potential information of three points or more). A method of determining the appearance time of the maximum value is selected from these methods.

However, the following problems are found when a STN-type liquid crystal panel is used as a matrix panel.

(1) For example, the electrode width is 270 μm and wide relative to 300 μm electrode pitch, and 90% of the induction signals from the electrode on the back layer is shut off. Especially when a TFT active matrix panel or the like is used, the effective area is further restricted.

(2) The height of a pen (detection electrode) is limited by applying a protective plate such as an acrylic plate and glass to protect the panel, so that the intensity of detecting signals is weakened. Thus, in order to increase the intensity, it is necessary to widen the width of the coordinate detection pulse (in other words, increasing the number of scanning electrodes at the same time) so as to maintain the detection intensity. However, due to the structural problem of the panel in that an electrode used for detecting coordinates is placed only in a display area, $x_w$ becomes small in the peripheral section when the signal intensity is at maximum, thereby generating a positional difference.

(3) Since the electrode width is quite wide as described in (1) and the cell thickness of the panel is 6–8 μm and thin, the coupling capacity between the electrodes is large. Also, the transmission of signals, transmitting ITO, is delayed because the electrode resistance of ITO is large, thus generating a positional difference.

The positional difference, caused by the structure around leading electrodes which are led to the row and column drive circuits of the matrix panel, is explained below.

FIG. 39 is a perspective view of a section of the matrix panel of a conventional display-integrated coordinate input device using a STN-type liquid crystal panel. As shown in FIG. 39, the matrix panel includes a first glass substrate 310 placed on top, a second glass substrate 320 placed on the bottom, and a liquid layer 35 disposed between the first glass substrate 310 and the second glass substrate 320. On first glass substrate 310, column electrodes 15 (x coordinates) are formed at a first predetermined direction at a first predetermined pitch. Row electrodes 19 (y coordinates) are formed in second glass substrate 320 at a second predetermined direction which is at right angle to the first predetermined direction, at a second predetermined pitch (in general, the same as the first predetermined pitch).

Generally, a section where column electrodes 15 and row electrodes 19 are indirectly laminated to each other in space is a display area, and a section besides the area is a non-display area. At the edges of glass substrate 310, which are at right angles to the first predetermined direction, each tab 34 is applied to the predetermined number of column electrodes 15. As a whole, a plurality of tabs 34 is arranged in the first predetermined direction. Tabs 34 are to connect column electrode drive circuit 13 and column electrodes 15 shown in FIG. 37. The pitch of connecting terminals or the like on tabs 34 is different from the first pitch of column electrodes 15, and is generally narrower than the first pitch. Therefore, at the non-display area on first glass substrate 310, each column electrode 15 is connected to the connecting terminals or the like of tabs 34, so that parallel connecting electrodes 313, having the same pitch as the connecting terminals or the like of tabs 34, and non-parallel (inclined) leading electrodes 312 or the like which connect parallel connection electrodes 15 to column electrodes 311 are formed. Similarly, at the edges of glass substrate 320, which are at right angles to the second predetermined direction, each tab 34 is applied to the predetermined number of row electrodes 19. As a whole, a plurality of tabs 34 is arranged in the second predetermined direction. Tabs 34 connect row electrode drive circuit 12 and row electrodes 19 as shown in FIG. 37. The pitch of connecting terminals or the like on tabs 34 is different from the second pitch of row electrodes 19. Therefore, at the non-display area on second glass substrate 320, each row electrode 19 is connected to the connecting terminals or the like of tabs 34, so that parallel connecting electrodes 323, having the same pitch as the connecting terminals or the like of tabs 34, and non-parallel (inclined) leading electrodes 322 or the like which connect connection electrodes 323 to row electrodes 19 are formed. A triangular dummy electrode 16 is formed around the neighboring section of two tabs 34. Dummy electrodes 16 normally prevent the accumulation of charge, the leakage of light, etc. during manufacturing. The dummy electrodes are connected to a line adjacent to leading electrodes 312 and 322.

The detection of coordinates at the panel edge of the display-integrated coordinate input device using the conventional matrix panel will now be explained.

In FIG. 39, suppose the first predetermined direction of arranged column electrodes 15 is X, and the second predetermined direction of arranged row electrodes 19 is Y. When detection electrode 2 is pointed at the center of matrix panel 11, X and Y coordinates are detected with about 1 dot precision. However, when detection electrode 2 is shifted, for example, in the X direction on line 500 near the edge of the matrix panel 11, a positional difference equivalent to several dots is generated in the X direction due to coordinate detection pulse applied to dummy electrodes 16. There is also a positional difference due to the shape of non-parallel leading electrodes 312. For instance, when detection electrode 2 is shifted in the Y direction on line 600 of matrix panel 11, a positional difference equivalent to several dots is found in the X direction. This phenomenon varies in response to the shape of non-parallel leading electrodes 312.

These positional differences are also found with respect to leading electrodes 322.

Therefore, the display-integrated coordinate input device using the conventional matrix panel generates positional differences near the edges of matrix panel 11, which is caused by the coordinate detection pulse applied to dummy electrodes 16 and the shapes of non-parallel leading electrodes 312 and 322. In other words, the device cannot provide preferble coordinate detection precision at the edges of the panel.

The driving voltage of a coordinate detection pulse in the conventional display-integrated coordinate input device is explained below.

FIG. 40 shows one embodiment of a voltage waveform applied to the electrodes of the matrix panel of the conventional display-integrated coordinate input device. In the figure, $T_w$ is a display period and $T_d$ is a detection period; $T_w$ is generally longer than $T_d$. Also, $t_1$ is the scanning period of one line in $T_w$, $t_2$ is the scanning period of one line in $T_d$, with $t_1$ being much longer than $t_2$. $R_1$, $R_2$ and $R_m$ are waveforms applied to row electrodes; $S_1$, $S_2$ and $S_n$ are waveforms applied to column electrodes.

In $T_w$, voltage at the level of $V_0$ or $V_5$ is applied to the row electrodes in a selection period, and voltage at the level of $V_1$ or $V_4$ is applied in a non-selection period. When the display is ON, voltage at the level of $V_0$ or $V_5$ is applied to the column electrodes. Voltage at the level of $V_2$ or $V_3$ is applied to the electrodes if the display is OFF.

On the other hand, a coordinate detection pulse is applied continuously to the row and column electrodes in $T_d$ as described above. In order not to leave direct current in $T_d$, $V_0$ and $V_5$ are applied in the selection period and in the non-selection period respectively, even though there are various amplitudes of applied pulse.

FIG. 41 shows an example of conventional liquid crystal drive power circuits. As shown in this figure, a circuit includes resistances r and R for dividing liquid crystal driving voltage for display ($V_{LCD}$) to voltage $V_0$, $V_1$, $V_2$, $V_3$, $V_4$ and $V_5$, and operation amplifiers 901, 902, 903 and 904. When the drive conditions of the liquid crystal display vary due to a change in temperature or the like, $V_0-V_5$ is changed by varying $V_{LCD}$ so as to provide preferable display.

In the above-noted conventional driving methods, the voltage level is determined by $V_{LCD}$, and the voltage level of a driving pulse applied to the electrodes in a display period is equal to the voltage level of a coordinate detection pulse applied to the electrodes. Therefore, when the drive conditions of the display change, it is necessary to vary driving voltage.

However, if the driving voltage is changed, the amplitude of a coordinate detection pulse in a detection period also changes, thus changing the intensity of signals detected by the detection electrode and varying detection precision.

As described above, conventional display-integrated coordinate input devices have poor detection precision particularly at the edges of the matrix panels, so that they are not suitable for input devices which require detection precision at the edges of panels, such as Windows.

SUMMARY OF THE INVENTION

It is an object of the invention to solve the above-mentioned conventional problems by providing a display-integrated coordinate input device which possesses various detection methods, correction properties, new panel structures and driving methods, thereby improving detection precision particularly at the edges of a matrix panel.

In order to accomplish this and other objects and advantages, a display-integrated coordinate input device of the invention includes:

a matrix panel having more than one row electrode (y direction), more than one column electrode (x direction) and a display element sealed into the row electrodes and the column electrodes;

a row electrode drive circuit for driving the row electrodes;

a column electrode drive circuit for driving the column electrodes;

a detection electrode for detecting scanning signals applied to the row electrodes and the column electrodes by electrically coupling the row electrodes and the column electrodes with electrostatic coupling capacity;

a coordinate detection circuit for obtaining positional information from output signals of the detection electrode;

a correction circuit for correcting coordinates output from the coordinate detection circuit; and a control circuit for controlling the matrix panel, the row electrode drive circuit, the column electrode drive circuit, the detection electrode, the coordinate detection circuit and the correction circuit. The row electrodes are at right angles to the column electrodes.

It is preferable that the correction circuit includes an x coordinate conversion circuit for converting x coordinates (column position) in response to x coordinates (column position) output from the coordinate detecting circuit, a y coordinate conversion circuit for converting y coordinates (row position) in response to y coordinates (row position) output from the coordinate detecting circuit, and a memory circuit for storing corrections.

It is preferable that the correction circuit includes a y coordinate conversion circuit for converting y coordinates (row position) in response to x coordinates (column position) and y coordinates (row position) output from the coordinate detection circuit, an x coordinate conversion circuit for converting x coordinates (column position) in response to x coordinates (column position) and y coordinates (row position) output from said coordinate detection circuit, and a memory circuit for storing corrections.

It is preferable that the correction circuit includes a y coordinate conversion circuit for converting y coordinates (row position) in response to x coordinates (column position) and y coordinates (row position) output from the coordinate detection circuit, an x coordinate conversion circuit for converting x coordinates (column position) in response to x coordinates (column position) and y coordinates (row position) output from the coordinate detection circuit, a memory circuit for storing corrections, and a correction arithmetic circuit for storing corrections in response to a delay of driving signals in the correction circuit.

It is preferable that the display-integrated coordinate input device further includes a means for obtaining information for calculating corrections in response to a delay of driving signals, and that the corrections are calculated from positional differences of coordinates by adjusting positions of coordinates of at least two points.

Furthermore, it is preferable that the correction circuit includes a first correction circuit for outputting corrections which change in response to the distance between a panel edge in the x direction and the detection electrode, a second correction circuit for outputting corrections which change in response to the distance between a panel edge in the y direction and the detection electrode, and a multiplication circuit which outputs the product of first correction circuit output and second correction circuit output.

It is preferable that the coordinate detection circuit includes a first coordinate detection circuit and a second coordinate detection circuit, and that the correction circuit includes an arithmetic circuit for operating the positions of the detection electrode from two coordinate values transmitted from the coordinate detection circuit. The first coordinate detection circuit is a magnitude comparator which changes its output as soon as a signal detected by the detection electrode exceeds a predetermined relative potential, and the second coordinate detection circuit is a magnitude comparator which changes its output as soon as a signal detected by the detection electrode falls below the predetermined relative potential.

It is preferable that the display-integrated coordinate input device further includes a means for switching the relative potential of the magnitude comparator in a row coordinate detection period and a column coordinate detection period.

It is preferable that the display-integrated coordinate input device further includes a means for switching the relative potential of the magnitude comparator by detecting the driving voltage of a matrix panel.

It is preferable that the display-integrated coordinate input device further includes a means for switching the relative potential of the magnitude comparator in response to a signal intensity generated in the detection electrode.

It is preferable that the correction circuit further includes an average value circuit which outputs average values of the first coordinate detection circuit and the second coordinate detection circuit, and that the arithmetic circuit includes a selector which selects the output of the second coordinate detection circuit when a coordinate is below a second predetermined level, selects the output of the first coordinate detection circuit when a coordinate is above a first predetermined level, and selects the output of the average value circuit when a coordinate falls between the first and the second predetermined level.

It is preferable that the coordinate detection circuit includes a first coordinate detection circuit, a second coordinate detection circuit and a third coordinate detection circuit, and that the correction circuit includes an arithmetic circuit which operates the position of the detection electrode from three coordinates transmitted from the first coordinate detection circuit, second coordinate detection circuit and third coordinate detection circuit. The first coordinate detection circuit is a magnitude comparator which changes its output as soon as a signal detected by the detection electrode exceeds a predetermined relative potential; the second coordinate detection circuit is a magnitude comparator which changes its output as soon as a signal detected by the detection electrode falls below the predetermined relative potential; and the third coordinate detection circuit is a magnitude comparator which changes its output as soon as a signal detected by the detection electrode reaches a maximum.

It is preferable that the display-integrated coordinate input device further includes a means of switching the relative potential of the magnitude comparator in a row coordinate detection period and a column coordinate detection period.

It is preferable that the display-integrated coordinate input device further includes a means of switching the relative potential of the magnitude comparator by detecting the driving voltage of a matrix panel.

It is preferable that the display-integrated coordinate input device further includes a means of switching relative potential of the magnitude comparator in response to a signal strength generated at the detection electrode.

It is also preferable that the arithmetic circuit includes a selector which selects the output of the second coordinate detection circuit when a coordinate is below a second predetermined value, selects the output of the first coordinate detection circuit when a coordinate is above a first predetermined value and selects the output of the third coordinate detection circuit when a coordinate falls between the first and the second predetermined value.

It is further preferable that the display-integrated coordinate input device includes a means for utilizing the output of the second coordinate detection circuit when a coordinate is below a second predetermined value, the output of the first coordinate detection circuit when a coordinate is above a first predetermined value and the output of the third coordinate detection ciruit when a coordinate is between the first and the second predetermined value, and that the means gradually changes mixing ratios of outputs in response to the distance from a switching point.

It is preferable that the matrix panel includes column electrodes arranged in a first predetermined direction on a first glass substrate at a first predetermined pitch, and row electrodes arranged in a second predetermined direction, which is at right angles to the first predetermined direction, on a second glass substrate at a second predetermined pitch, and that the column electrodes and the row electrodes are led to a sealing section in a non-display area with no bending points, while maintaining the first predetermined pitch and the second predetermined pitch respectively. The second glass substrate is disposed so as to face the first glass substrate through a layer made of a display material. The non-display area is an area not including a display area where at least the column electrodes and the row electrodes are laminated to each other.

It is also preferable that the matrix panel includes column electrodes arranged in a first predetermined direction on a first glass substrate at a first predetermined pitch, row electrodes arranged in a second predetermined direction, which is at a right angle to the first predetermined direction, on a second glass substrate at a second predetermined pitch, leading electrodes disposed in a non-display area and a conductive film which is applied on the leading electrodes so as to electrically shield them. The second glass substrate is disposed so as to face the first glass substrate through a layer made of a display material. The non-display area is an area not including a display area where at least the column electrodes and the row electrodes are laminated to each other.

It is further preferable that the matrix panel is a liquid crystal panel.

Another display-integrated coordinate input device of the invention includes:

- a matrix panel having more than one row electrode (y direction), more than one column electrode (x direction), dummy electrodes which are electrically insulated from the column electrodes and the row electrodes and are formed between TABs at a leading section of the matrix panel, and a display element sealed into the row electrodes and the column electrodes;
- a row electrode drive circuit for driving the row electrodes;
- a column electrode drive circuit for driving the column electrodes;
- a dummy electrode drive circuit connected to the dummy electrodes which outputs a fixed voltage in a coordinate detection period;
- a detection electrode for detecting scanning signals applied to the row electrodes and the column electrodes by electrically coupling the row electrodes and the column electrodes with electrostatic coupling capacity;

a coordinate detection circuit for obtaining positional information from output signals of the detection electrode; and a control circuit for controlling the matrix panel, the row electrode drive circuit, the column electrode drive circuit, the dummy electrode drive circuit, the detection electrode and the coordinate detection circuit. The row electrodes are at right angles to the column electrodes.

It is preferable that the dummy electrodes on the matrix panel are supplied with voltage at a level in which the display element does not respond.

It is also preferable that the dummy electrodes are given signals for alternating current as applied voltage which are used in a display mode period of the matrix panel.

It is further preferable that the matrix panel includes column electrodes arranged in a first predetermined direction on a first glass substrate at a first predetermined pitch, and row electrodes arranged in a second predetermined direction, which is at right angle to the first predetermined direction, on a second glass substrate at a second predetermined pitch, and that the column electrodes and the row electrodes are led to a sealing section in a non-display area with no bending points, while maintaining the first predetermined pitch and the second predetermined pitch respectively. The second glass substrate is disposed so as to face the first glass substrate through a layer made of a display material. The non-display area is an area not including a display area where at least the column electrodes and the row electrodes are laminated to each other.

It is also preferable that the matrix panel includes column electrodes arranged in a first predetermined direction on a first glass substrate at a first predetermined pitch, row electrodes arranged in a second predetermined direction, which is at a right angle to the first predetermined direction, on a second glass substrate at a second predetermined pitch, leading electrodes disposed in a non-display area and a conductive film which is applied on the leading electrodes so as to electrically shield them. The second glass substrate is disposed so as to face the first glass substrate through a layer made of a display material. The non-display area is an area not including a display area where at least the column electrodes and the row electrodes are laminated to each other.

It is preferable that the matrix panel is a liquid crystal panel.

Another display-integrated coordinate input device of the invention includes:

a matrix panel having more than one row electrode (y direction) and more than one column electrode (x direction);

a row electrode drive circuit which applies a row scanning pulse for display in response to driving conditions of the matrix panel in a display period, and supplies, by switching, a row detecting pulse for coordinate detection having a constant amplitude in a detection period, regardless of driving conditions of the display period;

a column electrode drive circuit which applies a column scanning pulse for display in response to driving conditions of the matrix panel in a display period, and supplies, by switching, a column detecting pulse for coordinate detection having a constant amplitude in a detection period, regardless of driving conditions of the display period;

a drive power circuit which supplies voltage at a level required for driving the column electrodes and row electrodes to the column electrode drive circuit and the row electrode drive circuit;

a detection electrode for detecting scanning signals for detection supplied to the row electrodes and the column electrodes by electrically coupling the row electrodes and the column electrodes with electrostatic coupling capacity; and a control circuit for controlling the matrix panel, the row electrode drive circuit, the column electrode drive circuit, the drive power circuit and the detection electrode. The row electrodes are at right angles to the column electrodes.

It is preferable that the scanning pulse for detection has an amplitude higher than the maximum amplitude of driving pulse in a display period.

It is also preferable that the column electrode drive circuit includes a selection circuit, which outputs by selecting driving voltage for detection in a display period, and a driving power source, and that the row electrode drive circuit includes a selection circuit, which outputs by selecting driving voltage for detection in a display period, and a driving power source.

It is further preferable that the matrix panel includes column electrodes arranged in a first predetermined direction on a first glass substrate at a first predetermined pitch, and row electrodes arranged in a second predetermined direction, which is at a right angle to the first predetermined direction, on a second glass substrate at a second predetermined pitch, and that the column electrodes and the row electrodes are led to a sealing section in a non-display area with no bending points, while maintaining the first predetermined pitch and the second predetermined pitch respectively. The second glass substrate is disposed so as to face the first glass substrate through a layer made of a display material. The non-display area is an area not including a display area where at least the column electrodes and the row electrodes are laminated to each other.

It is preferable that the matrix panel includes column electrodes arranged in a first predetermined direction on a first glass substrate at a first predetermined pitch, row electrodes arranged in a second predetermined direction, which is at a right angle to the first predetermined direction, on a second glass substrate at a second predetermined pitch, leading electrodes disposed in a non-display area and a conductive film which is applied on the leading electrodes so as to electrically shield them. The second glass substrate is disposed so as to face the first glass substrate through a layer made of a display material. The non-display area is an area not including a display area where at least the column electrodes and the row electrodes are laminated to each other.

It is also preferable that the matrix panel is a liquid crystal panel.

The first display-integrated coordinate input device of the invention includes:

a matrix panel having more than one row electrode (y direction), more than one column electrode (x direction) and a display element sealed into the row electrodes and the column electrodes;

a row electrode drive circuit for driving the row electrodes;

a column electrode drive circuit for driving the column electrodes;

a detection electrode for detecting scanning signals applied to the row electrodes and the column electrodes by electrically coupling the row electrodes and the column electrodes with electrostatic coupling capacity;

a coordinate detection circuit for obtaining positional information from output signals of the detection electrode;

a correction circuit for correcting coordinates output from the coordinate detection circuit; and a control circuit for controlling the matrix panel, the row electrode drive circuit, the column electrode drive circuit, the detection electrode, the coordinate detection circuit and the correction circuit. Also, the row electrodes are at right angles to the column electrodes in the device. In this preferable structure of the first display-integrated coordinate input device of the invention, the device can input coordinates not only at the central but also at the peripheral section of the panel with high precision. Since the device includes the correction circuit correcting positional differences that are caused by certain characteristics of the matrix panel, it has a wider coordinate detection area, thereby improving its linearity. Coordinate signals obtained from level detection which can maintain linearity at panel edges are used in the device, so that input over the entire panel of the device becomes possible. Furthermore, high detection precision can be achieved over the entire panel of the device by alternating coordinate signals obtained from peak detection, and coordinate signals obtained from level detection. The peak detection can maintain detection coordinates without being influenced by the height of the detection electrode while the level detection can maintain linearity at panel edges.

In the first display-integrated coordinate input device of the invention, the correction circuit preferably includes an x coordinate conversion circuit for converting x coordinates (column position) in response to x coordinates (column position) output from the coordinate detection circuit, a y coordinate conversion circuit for converting y coordinates (row position) in response to y coordinates (row position) output from the coordinate detection circuit, and a memory circuit for storing corrections. Thus, as the coordinate detection area of the device becomes wider, and linearity improves.

In the above-noted first device of the invention, the correction circuit preferably includes a y coordinate conversion circuit for converting y coordinates (row position) in response to x coordinates (column position) and y coordinates (row position) output from the coordinate detection circuit, an x coordinate conversion circuit for converting x coordinates (column position) in response to x coordinates (column position) and y coordinates (row position) output from the coordinate detection circuit, and a memory circuit for storing corrections. Therefore, there is an improvement in the coordinate detection precision of the device, particularly at the four edges of the matrix panel.

In the first embodiment of the invention, the correction circuit preferably includes a y coordinate conversion circuit for converting y coordinates (row position) in response to x coordinates (column position) and y coordinates (row position) output from the coordinate detection circuit, an x coordinate conversion circuit for converting x coordinates (column position) in response to x coordinates (column position) and y coordinates (row position) output from the coordinate detection circuit, a memory circuit for storing corrections, and a correction arithmetic circuit for storing corrections in response to a delay of driving signals in the correction circuit. As a result, the coordinate detection precision of the device improves, especially at the four edges of the matrix panel.

Preferably, the first display-integrated coordinate input device of the invention further includes a means to obtain information for calculating corrections in response to a delay of driving signals: the corrections are calculated from positional differences of coordinates by adjusting positions of coordinates at at least two points. Thus, positional differences caused by the delay of electrodes can be prevented.

In the first display-integrated coordinate input device of the invention mentioned above, the correction circuit preferably includes a first correction circuit for outputting corrections which change in response to the distance between a panel edge in the x direction and the detection electrode, a second correction circuit for outputting corrections which change in respose to the distance between a panel edge in the y direction and the detection electrode, and a multiplication circuit which outputs the product of the first correction circuit output and the second correction circuit output. The coordinate detection precision at the four edges of the matrix panel, therefore, improves.

In the above-mentioned first embodiment of the invention, the coordinate detection circuit preferably includes a first coordinate detection circuit and a second coordinate detection circuit. The correction circuit preferably includes an arithmetic circuit for calculating the position of the detection electrode from two coordinate values transmitted from the coordinate detection circuit. The first coordinate detection circuit is a magnitude comparator which changes its output as soon as a signal detected by the detection electrode exceeds a predetermined relative potential, and the second coordinate detection circuit is a magnitude comparator which changes its output as soon as a signal detected by the detection electrode falls below the predetermined relative potential. Thus, the coordinate detection precision at the four edges of the matrix panel improves.

Preferably, the first display-integrated coordinate input device further includes a means of switching the relative potential of the magnitude comparator in a row coordinate detection period and a column coordinate detection period. As a result, the potential level of each row and column coordinate can be kept constant, so that row and column coordinates are stably obtained.

Preferably, the above-mentioned first display-integrated coordinate input device further includes a means of switching the relative potential of the magnitude comparator by detecting the driving voltage of a matrix panel. Thus, the generation of positional differences due to the change in driving voltage can be controlled.

Preferably, the first embodiment of the invention mentioned above further includes a means of switching the relative potential of the magnitude comparator in response to signal intensity generated in the detection electrode. Therefore, positional differences due to the change in signal intensity are prevented. The change in signal intensity is caused by the structural difference of the detection electrode in the matrix panel.

Above-noted first embodiment of the invention, the correction circuit preferably further includes an average value circuit which outputs average values of the first coordinate detection circuit and the second coordinate detection circuit, and the arithmetic circuit preferably includes a selector which selects the output of the second coordinate detection circuit when a coordinate is below a second predetermined value, selects the output of the first coordinate detection circuit when the coordinate is above a first predetermined value, and selects the output of the average value circuit when a coordinate falls between the first and the second value. Hence, it becomes possible to input coordinates over the entire matrix panel of the device, and detect error in the coordinate detection period, caused by alternating at each value, can be prevented.

In the first embodiment mentioned above, the coordinate detection circuit preferably includes a first coordinate detection circuit, a second coordinate detection circuit and a third coordinate detection circuit. Also, the correction circuit preferably includes an arithmetic circuit which calculates the position of the detection electrode from three coordinates transmitted from the first coordinate detection circuit, the second coordinate detection circuit and the third coordinate detection circuit. The first coordinate detection circuit is a magnitude comparator which changes its output as soon as a signal detected by the detection electrode exceeds a predetermined relative potential; the second coordinate detection circuit is a magnitude comparator which changes its output as soon as a signal detected by the detection electrode falls below the predetermined relative potential; and the third coordinate detection circuit is a magnitude comparator which changes its output as soon as a signal detected by the detection electrode reaches maximum. Thus, detection precision at the edges of the matrix panel improves, and the precision at the center of the panel also improves due to the third coordinate detection circuit.

Preferably, the first display-integrated coordinate input device further includes a means of switching the relative potential of the magnitude comparator in a row coordinate detection period and a column coordinate detection period. Thus, positional differences caused by the change in driving voltage of the matrix panel can be prevented.

In the above-mentioned first embodiment of the invention, the arithmetic circuit preferably includes a selector which selects the output of the second coordinate detection circuit when a coordinate is below a second predetermined value, selects the output of the first coordinate detection circuit when the coordinate is above a first predetermined value, and selects the output of the third coordinate detection circuit when the coordinate falls between the first and the second predetermined values. Therefore, one suitable output can be chosen from three outputs of peak and level detection coordinates in response to the position of the detection electrode, so that coordinates can be input over the entire matrix panel.

Preferably, the above-mentioned first display-integrated coordinate input device further includes a means for utilizing the output of the second coordinate detection circuit when a coordinate is below a second predetermined value, the output of the first coordinate detection circuit when a coordinate is above a first predetermined value and the output of the third coordinate detection ciruit when a coordinate falls between the first and the second predetermined values. Also, the means preferably changes the mixing ratios of outputs gradually in response to the distance from a switching point. Coordinates with continuity and with no positional differences thus can be obtained.

In the above-noted first device of the invention, the matrix panel preferably includes column electrodes arranged in a first predetermined direction on a first glass substrate at a first predetermined pitch, and row electrodes arranged in a second predetermined direction, which is at a right angle to the first predetermined direction, on a second glass substrate at a second predetermined pitch. The column electrodes and the row electrodes are preferably led to a sealing section in a non-display area with no bending points, while maintaining the first predetermined pitch and the second predetermined pitch respectively. The second glass substrate is disposed so as to face the first glass substrate through a layer made of a display material. The non-display area is an area not including a display area where at least the column electrodes and the row electrodes are laminated to each other. As a result, without being influenced by coordinate detection pulse applied to the dummy electrodes at the matrix panel edges or coordinate detection pulse influenced by the shapes of non-parallel leading electrodes, detection precision at the edges of the matrix panel improves.

In the first device of the invention, the matrix panel preferably includes column electrodes arranged in a first predetermined direction on a first glass substrate at a first predetermined pitch, row electrodes arranged in a second predetermined direction, which is at a right angle to the first predetermined direction, on a second glass substrate at a second predetermined pitch, leading electrodes disposed in a non-display area and a conductive film which is applied on the leading electrodes so as to electrically shield them. The second glass substrate is disposed so as to face the first glass substrate through a layer made of a display material. The non-display area is an area other than a display area where at least the column electrodes and the row electrodes are laminated to each other. Thus, even if the shapes of leading and dummy electrodes are the same as conventional shapes, a pulse used for detecting coordinates at the dummy electrodes and the leading electrodes is detected, thereby improving the detection precision at the matrix panel edges.

In the first embodiment of the invention, a liquid crystal panel is preferably used as the matrix panel. Thus, a liquid crystal display-integrated coordinate input device which can detect stably is provided.

The second embodiment of the display-integrated coordinate input device of this invention includes:

a matrix panel having more than one row electrode (y direction), more than one column electrode (x direction), dummy electrodes which are electrically insulated from the column electrodes and the row electrodes and are formed between TABs at a leading section of the matrix panel, and a display element sealed into the row electrodes and the column electrodes;

a row electrode drive circuit for driving the row electrodes;

a column electrode drive circuit for driving the column electrodes;

a dummy electrode drive circuit connected to the dummy electrodes which output a fixed voltage in a coordinate detection period;

a detection electrode for detecting scanning signals applied to the row electrodes and the column electrodes by electrically coupling the row electrodes and the column electrodes with electrostatic coupling capacity;

a coordinate detection circuit for obtaining positional information from output signals of the detection electrode; and a control circuit for controlling the matrix panel, the row electrode drive circuit, the column electrode drive circuit, the dummy electrode drive circuit, the detection electrode and the coordinate detection circuit. The row electrodes are at right angles to the column electrodes. In this preferable structure of the device, since a coordinate detection pulse is not included in voltage applied to the dummy electrodes and there are no strains in detection signals around the dummy electrodes, detection precision improves.

Also, in the second device of the invention, the dummy electrodes on the matrix panel are preferably supplied with voltage at a level such that the display element does not respond. Thus, preferable display quality can be maintained.

The gap between the dummy electrode and the neighboring column electrode or row electrode is generally $100\mu$ or above. In the second embodiment, the dummy electrodes are preferably supplied with signals for alternating current as applied voltage. The signals are supplied in a display mode period of the matrix panel. Thus, the difference in effective voltage between the voltage applied to the dummy electrodes and the voltage given to the neighboring row and column electrodes becomes small. As a result, the display element sealed into the gap among the dummy electrodes, column electrodes and row electrodes does not respond even if the voltage is applied, so that it becomes possible to maintain preferable display quality.

The third embodiment of the display-integrated coordinate input device of this invention includes:

a matrix panel having more than one row electrode (y direction) and more than one column electrode (x direction);

a row electrode drive circuit which applies a row scanning pulse for display in response to driving conditions of the matrix panel in a display period, and operates by switching to a row detecting scanning pulse for coordinate detection having a constant amplitude in a detection period, regardless of driving conditions of the display period;

a column electrode drive circuit which applies a column scanning pulse for display in response to driving conditions of the matrix panel in a display period, and operates by switching to a column detecting scanning pulse for coordinate detection having a constant amplitude in a detection period, regardless of driving conditions of the display period;

a drive power circuit which supplies voltage at a level required for driving the column electrodes and row electrodes to the column electrode drive circuit and the row electrode drive circuit;

a detection electrode for detecting scanning signals for detection supplied to the row electrodes and the column electrodes by electrically coupling the row electrodes and the column electrodes with electrostatic coupling capacity; and a control circuit for controlling the matrix panel, the row electrode drive circuit, the column electrode drive circuit, the drive power circuit and the detection electrode. The row electrodes are at right angles to the column electrodes. Therefore, in this preferable structure of the third embodiment, the intensity of detection signals is not influenced by a change in the driving conditions for display, so that the device can detect stably.

In the third device of the invention, the scanning pulse for detection preferably has amplitude higher than the maximum amplitude of driving pulse in a display period. Suppose the voltage applied to the row electrodes in the selection period of a display period is $V_0$ or $V_5$, the voltage applied to the row electrodes in the non-selection period is $V_1$ or $V_4$, the voltage applied to column electrodes is $V_0$ or $V_5$ when the display is ON, and the voltage applied to the column electrodes is $V_2$ or $V_3$ when the display is OFF. Thus, $V_0 > V_1$, $V_2 > V_3$ and $V_4 > V_5$.

Moreover, in the third embodiment, the column electrode drive circuit preferably includes a selection circuit, which outputs by selecting driving voltage for detection in a display period, and a driving power source. Also, the row electrode drive circuit preferably includes a selection circuit, which outputs by selecting a driving voltage for detection in a display period, and a driving power source. Thus, it becomes possible to drive the device without the application of an outside circuit.

Therefore, the invention provides a display-integrated coordinate input device which can improve detection precision at the matrix panel edges, and is not influenced by external environment such as a change in display conditions. The display-integrated coordinate input device of the invention can be used for Windows and the like which require high precision also at the peripheral edges of the matrix panel. Handwritten letters and diagrams are input with high precision even at the matrix panel peripheral sections of the device. Moreover, since images are displayed immediately, it is possible to apply the device of the invention to portable information terminals such as pen personal computers and personal digital assistant PDA.

BRIEF DESCRIPTION OF THE DRAWINGS

FIG. 3 (b) is a graph showing the results of positional differences caused by the delay of driving signals of the ITO electrode of the embodiment.

FIG. 5 (b) is a diagram showing positional correction coordinates in ITO delay correction of the embodiment.

FIG. 5 (c) is a diagram showing positional correction coordinates in ITO delay correction of the embodiment.

FIG. 5 (d) is a diagram showing positional correction coordinates in ITO delay correction of the embodiment.

FIG. 20 (b) is a graph showing the dependency of detection coordinates on detection electrode height of the embodiment.

DETAILED DESCRIPTION OF THE INVENTION

The invention will be explained further in detail by referring to the following examples.

EXAMPLE 1

Figure 1:
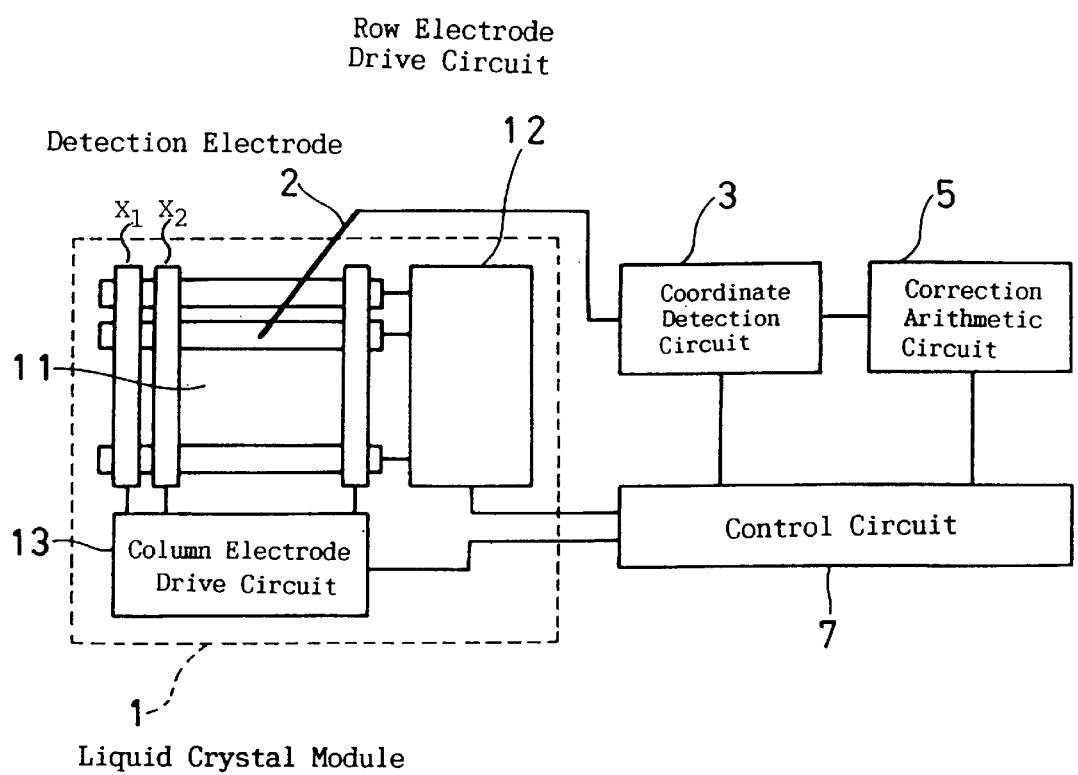
FIG. 1 is a schematic view of a display-integrated coordinate input device of a first embodiment of the invention.

FIG. 1 is a schematic view of the first embodiment of the display-integrated coordinate input device of the invention. In FIG. 1, a liquid crystal module 1 comprises a liquid crystal panel 11 including mutually orthogonal row electrodes $Y_1-Y_n$ and column electrodes $X_1-X_m$ and a liquid crystal layer disposed among the electrodes as a display element, a row electrode driving circuit 12 driving the row electrodes of liquid crystal panel 11, and a column electrode driving circuit 13 driving the column electrodes. A detection electrode 2 detects scanning signals applied to the row and column electrodes of liquid crystal panel 11 by electrically coupling to the electrodes with electrostatic coupling capacity. A coordinate detection circuit 3 converts the signals obtained from detection electrode 2 to row and column coordinates. A correction arithmetic circuit 5 corrects positional differences by using the correction parameter of the device, which has taken in output values of coordinate detection circuit 3 beforehand. A control circuit 7 controls liquid crystal module 1, coordinate detection circuit 3 and correction arithmetic circuit 5.

In its display period, this display-integrated coordinate input device supplies scanning pulses to each row electrode one after another from row electrode drive circuit 12. Along with the supply of scanning pulses to the row electrodes, voltage in response to display data is supplied to the column electrodes from column electrode drive circuit 12 so as to be displayed on liquid crystal panel 11. In its row coordinate detection time, the device continuously scans coordinate detection pulses from the row electrode drive circuit 12 to the row electrodes. When detection electrode 2 is contacted to a predetermined area of liquid crystal panel 11, row coordinates in the contacting area are detected from coordinate detection pulses which are detected at row coordinate detection circuit 3 from the electrostatic coupling capacity between detection electrode 2 and the row electrodes, so that the coordinates are corrected by the correction arithmetic circuit 5. In its column coordinate detection period, the device scans coordinate detection pulses from the column electrode drive circuit 13 to the column electrodes. When detection electrode 2 is contacted to a predetermined area of liquid crystal panel 11, column coordinates in the contacting area are then detected from coordinate detection pulses which are detected at column coordinate detection circuit 3 from the electrostatic coupling capacity between detection electrode 2 and the column electrodes, so that the coordinates are corrected by correction arithmetic circuit 5. Thus, the device displays images and detects coordinates with a single liquid crystal panel 11.

Methods of correcting positional differences by applying liquid crystal panel 11 to detect coordinates are explained below.

<Correction of ITO (indium-tin oxide) Delay>

Positional differences caused by the transmission delays of signals at ITO are now explained.

Figure 2:
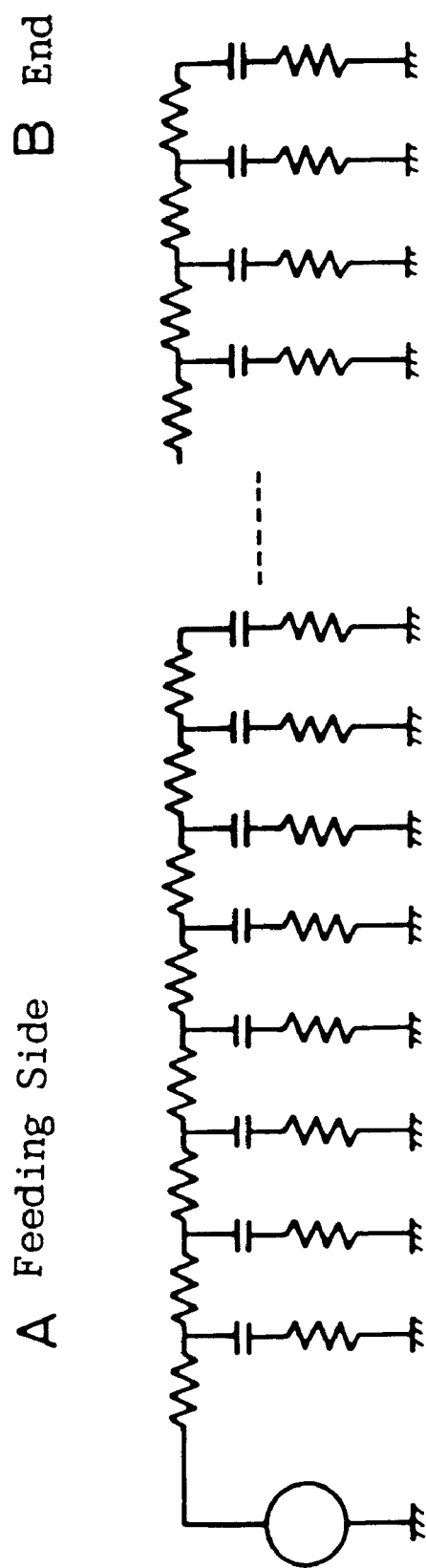
FIG. 2 is a diagram showing a signal transmission-type equivalent circuit at an ITO electrode of the first embodiment.

A signal transmission system of one segment electrode is as an equivalent circuit shown in FIG. 2. For example, when the electrode pitch of a liquid crystal panel is 0.3 mm, ITO space is normally one-tenth of the electrode pitch and thus 30 μm. The sheet resistivity of the ITO electrode is commonly 30Ω☐ (square); the cell thickness of liquid crystal is 7 μm; the dielectric constant is about 7; the resistance per unit pixel is 33Ω; and the distributed capacitance per cell is 0.7 pF. It is required to employ the system as a distribution constant circuit.

Figure 3:
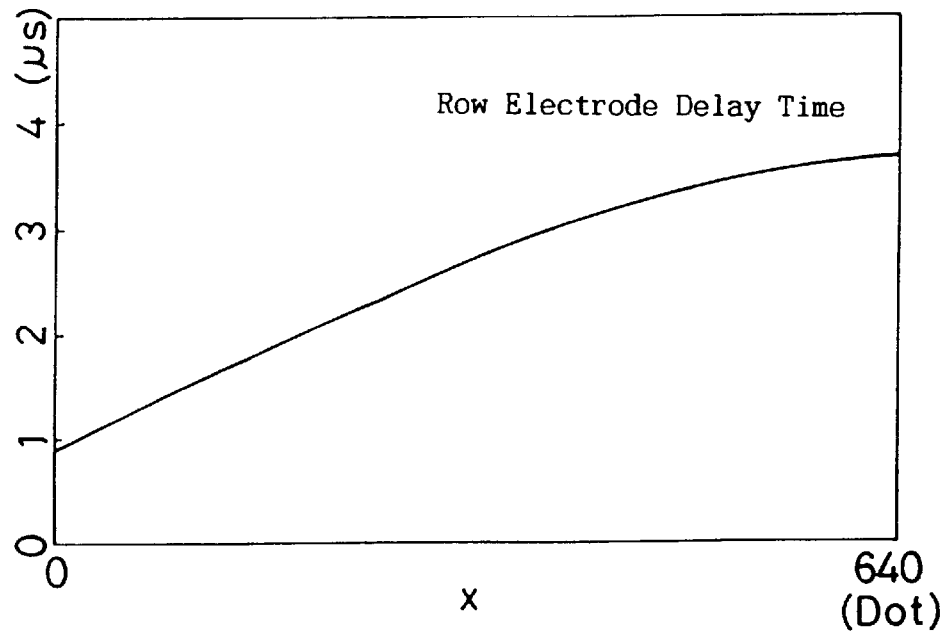
FIG. 3 (a) is a graph showing the results of positional differences caused by the delay of driving signals of the ITO electrode of the embodiment.
Figure 3:
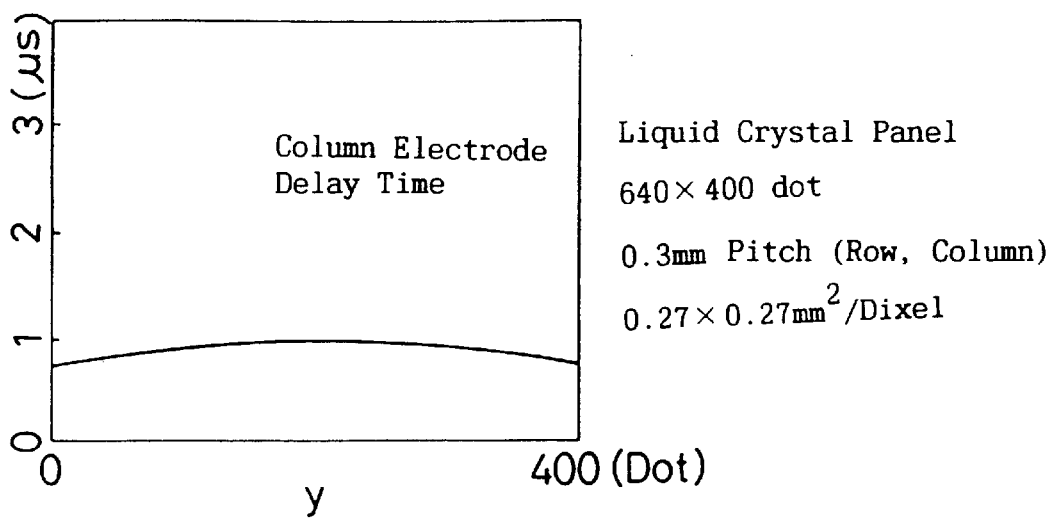

Thus, driven signals are delayed when transmitted. As a result, as shown in FIGS. 3 (a) and 3 (b), y coordinates are not constant even when detected signals are on a straight line parallel to the X axis; x coordinates are not constant even if detected signals are on a straight line parallel to the y axis. For instance, even when y coordinates are on a straight line parallel to the x axis, transmission delays of about 3 μ sec occur with a distance of 640 pixels from a signal supplying terminal. Therefore, by using a circuit shown in FIG. 4, positional differences caused by the transmission delays of signals at an ITO electrode are eliminated.

Figure 4:
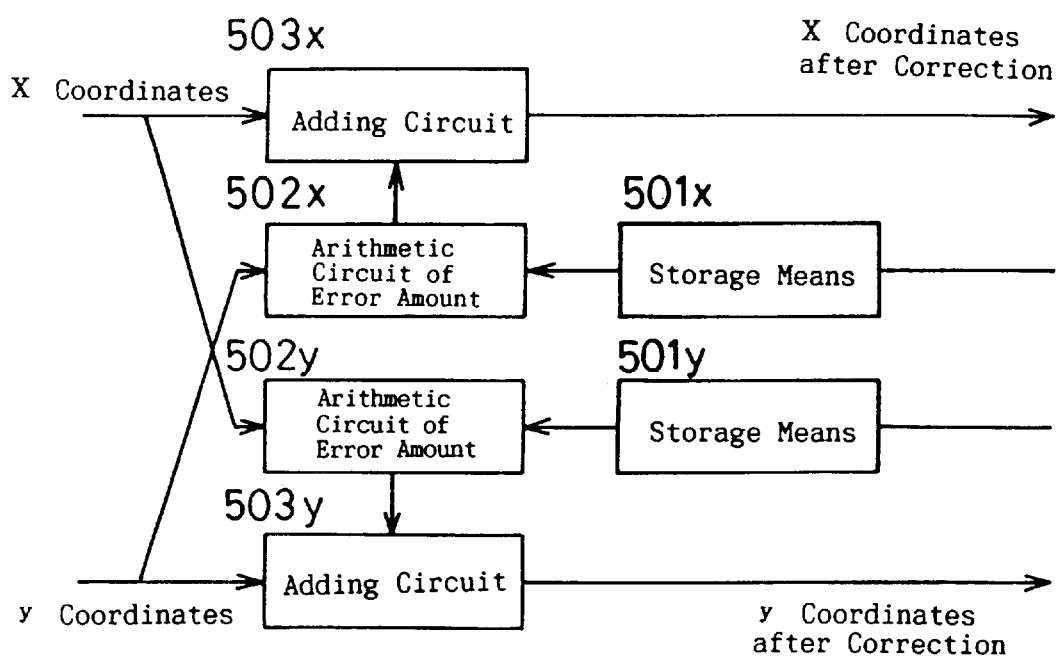
FIG. 4 is a schematic view of a driving signal delay correction circuit of the ITO electrode of the embodiment.

In FIG. 4, 501x is a storage means so as to store correction information needed for correcting x coordinates: 502x is an arithmetic circuit of error amount for calculating the amount of difference from correction information of y coordinates and storage means 501x; 503x is an adding circuit for adding the output of the arithmetic circuit of error amount 502x to the x coordinates; 501y is a storage means to store correction information required for correcting y coordinates; 502y is an arithmetic circuit of error amount for calculating the amount of difference from correction information of x coordiante values and storage means 501y; and 503y is an adding circuit for adding the output of the arithmetic circuit of error amount 502y to the y coordinates.

With reference to corrdinate detection circuit 3 (shown in FIG. 1), y coordinates are determined from the appearance time of a peak value in the row coordinate (y coordinate) detection period, and x coordinate values are determined from the appearance time of a peak value in the column coordinate (x coordinate) detection period. These y and x coordinates are input to arithmetic circuits of error amount 502x and 502y. By referring to the input y coordinates, the amount of difference relative to x coordinates is calculated; and the amount of difference relative to y coordinates is calculated from the input x coordinates. Parameters required for these calculations are stored in storage means 501x and 501y by the methods mentioned below.

In adding circuits 503x and 503y, positional differences caused by ITO delay are corrected by deducting the amount of difference, which is based on delays detected at arithmetic circuits of error amount 502x and 502y, from coordinates obtained from coordinate detection circuit 3 (shown in FIG. 1).

Correction methods and means to obtain correction information are explained as follows.

(1) Method of Calculating from Physical Parameter

The delay time of driving signals by ITO can be calculated from the physical parameter of an ITO electrode (sheet resistivity σ, width W, length L and distributed capacitance C), driving signal source impedance $R_i$ and terminal impedance $R_o$. By further adding driving frequencies and pulse width, the amount of difference of peak position of a detecting signal is calculated.

(2) Aquisition of Correction Data by Adjusting Positions

Figure 5:
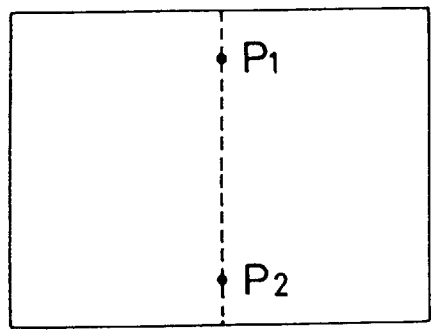
FIG. 5 (a) is a diagram showing positional correction coordinates in ITO delay correction of the embodiment.
Figure 5:
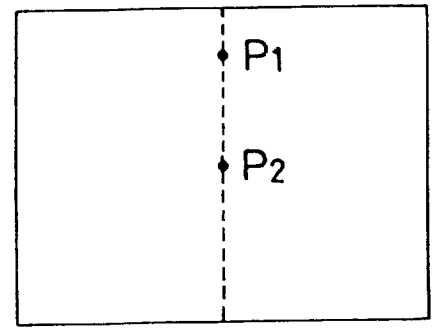
Figure 5:
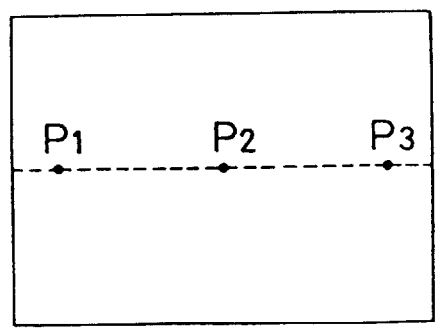
Figure 5:
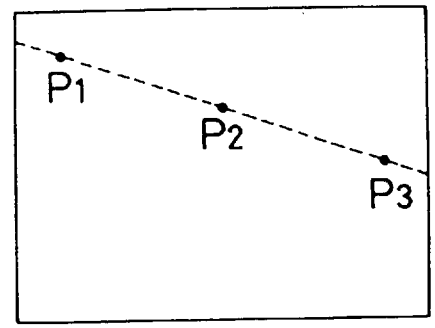

Positional differences in an x axis direction are corrected, for example, by adjusting positions at points, $P_1$ ($X_1$, $Y_1$) and $P_2$ ($X_2$, $Y_2$), on a line parallel to the y axis as shown in FIG. 5 (a). Since correlations as indicated in the following Formula 6 are found at the points on a line parallel to the y axis, x coordinates of every point on the line are primarily $X_0$. However, due to the transmission delay in an ITO electrode, differences are generated.

$$X_1 = X_2 = X_0 \quad \text{Formula 6}$$

Suppose coordinates at point $P_1$ are $X_1$ and $Y_1$; coordinates at point $P_2$ are $X_2$ and $Y_2$. Then, amount of difference Δx is calculated by the following Formula 7.

$$\Delta x = \gamma(Y_L - y) + \beta \quad \text{Formula 7}$$

$$\begin{cases} \gamma = (x_2 - x_1)/(y_2 - y_1) \\ \beta = ((x_1 - x_o)y_2 - (x_2 - x_o)y_1)/(y_2 - y_1) \end{cases}$$

When two laminated liquid crystal panels are used in the device, driving circuits are applied vertically, so that positions are adjusted, for example, at $P_1$ ($X_0$, $Y_1$) and $P_2$ ($X_0$, $Y_2$) on a straight line parallel to the y axis (See FIG. 5(b)). If the coordinates are $P_1$ ($X_1$, $Y_1$) and $P_2$ ($X_2$, $Y_2$), the amount of difference Δx is calculated by the following Formula 8.

$$\Delta x = \begin{cases} \gamma y + \beta & \ldots \quad 0 < y < Y_L/2 \\ \gamma(Y_L - y) + \beta & \ldots \quad Y_L/2 < y < Y_L \end{cases} \quad \text{Formula 8}$$

$$\gamma = (x_2 - x_1)/(y_2 - y_1)$$

$$\beta = ((x_1 - x_o)y_2 - (x_2 - x_o)y_1)/(y_2 - y_1)$$

Similarly, the amount of difference Δy in a y axis direction can also be calculated. However, the y electrode is longer than the x electrode, and has a longer delaying time than x electrode. Thus, the differences cannot be fully corrected by a linear equation. In other words, the amount of difference is calculated by a quadratic equation or a polygonal line. For example, as shown in FIG. 5(c), positions are adjusted at $P_1$, $P_2$ and $P_3$, and coordinates $P_1$ ($X_1$, $Y_1$) $P_2$ ($X_2$, $Y_2$) and $P_3$ ($X_3$, $Y_3$) are measured.

When approximated by a quadratic equation, the amount of difference Δy is calculated by the following Formula 9.

$$\Delta y = \alpha x^2 + \beta x + \gamma \quad \text{Formula 9}$$

$$\begin{pmatrix} \alpha \\ \beta \\ \gamma \end{pmatrix} = \begin{pmatrix} x_1^2 & x_1 & 1 \\ x_2^2 & x_2 & 1 \\ x_3^2 & x_3 & 1 \end{pmatrix}^{-1} \begin{pmatrix} y_1 - y_0 \\ y_2 - y_0 \\ y_3 - y_0 \end{pmatrix}$$

When approximated by a polygonal line, the amount of difference Δy is calculated by the following Formula 10.

$$\Delta y = \begin{cases} y_1 - y_o & \ldots \quad 0 < x < \lambda \\ \gamma(x - \lambda) + y_1 - y_o & \ldots \quad \lambda < x < X_L \end{cases} \quad \text{Formula 10}$$

$$\begin{cases} \gamma = (y_3 - y_2)/(x_3 - x_2) \\ \beta = x_3 - (x_3 - x_2)(y_3 - y_1)/(y_3 - y_2) \end{cases}$$

In this example, a linear equation is used for the x coordinates and a quadratic equation or a polygonal line is used for the y coordinates. However, in order to further increase precision, a higher-order correction can be directed. If precision is not required, correction can be carried out at a lower degree. Since the x coordinates have a small amount of difference caused by delays, the difference can be treated as a constant. It is also possible to increase points for measurement. In addition, by adjusting positions at points shown in FIG. 5(d), points for input can be decreased.

<Panel Edge γ Correction>

By taking advantage of the appearing time of the highest value, the position of a pen can be detected without being influenced by the height of the pen. However, (1) an electrode arranged area is the same as a coordinate detection area, and (2) the device is scanning with a plurality of electrodes due to weak signal strength. Therefore, positional differences are generated at the edges of the panel.

Figure 6:
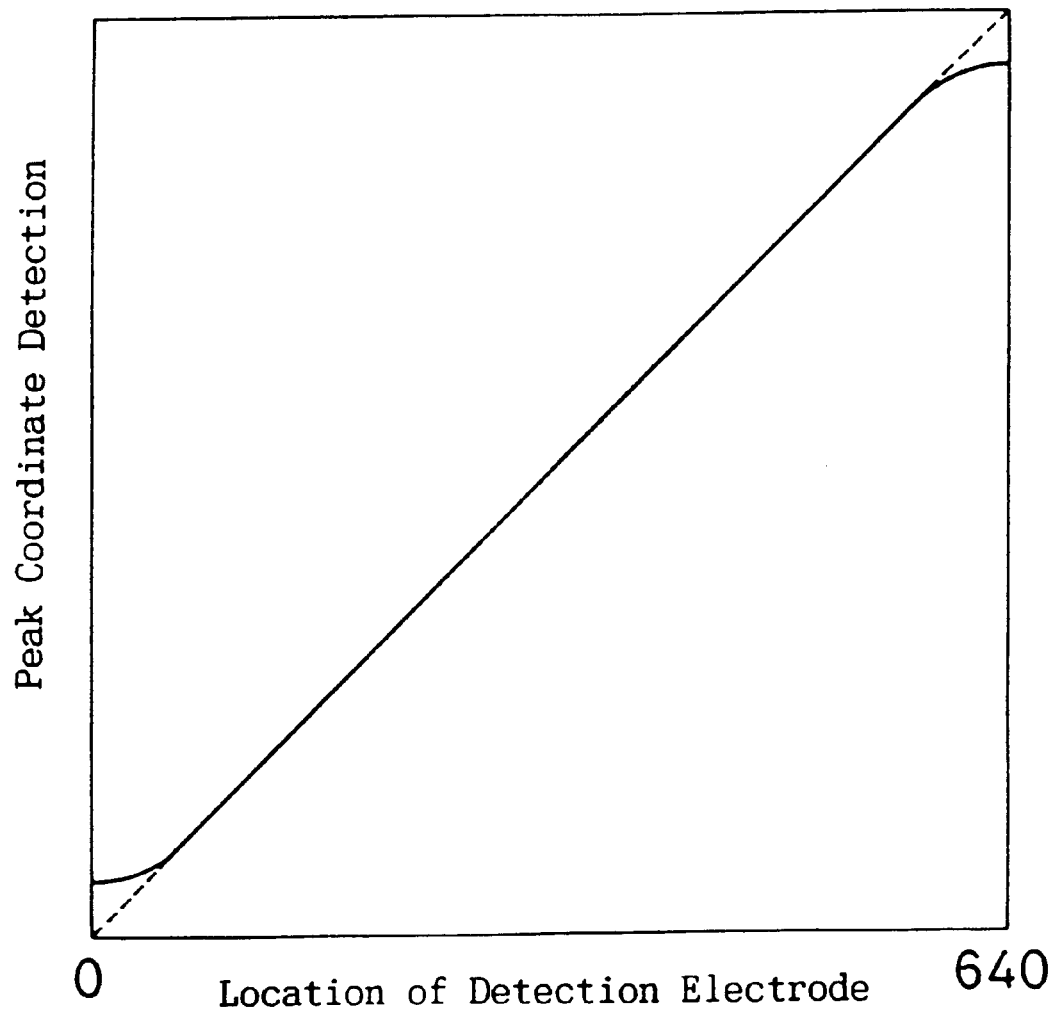
FIG. 6 is a graph showing detection coordinates at peak detection of the embodiment.

FIG. 6 shows the appearance times of peaks in detecting x coordinates. As shown in FIG. 6, γ becomes small at the edges; therefore, γ has to be raised at the edges. By using a circuit as shown in FIG. 7, positional differences caused by the transmission delays of signals are prevented.

Figure 7:
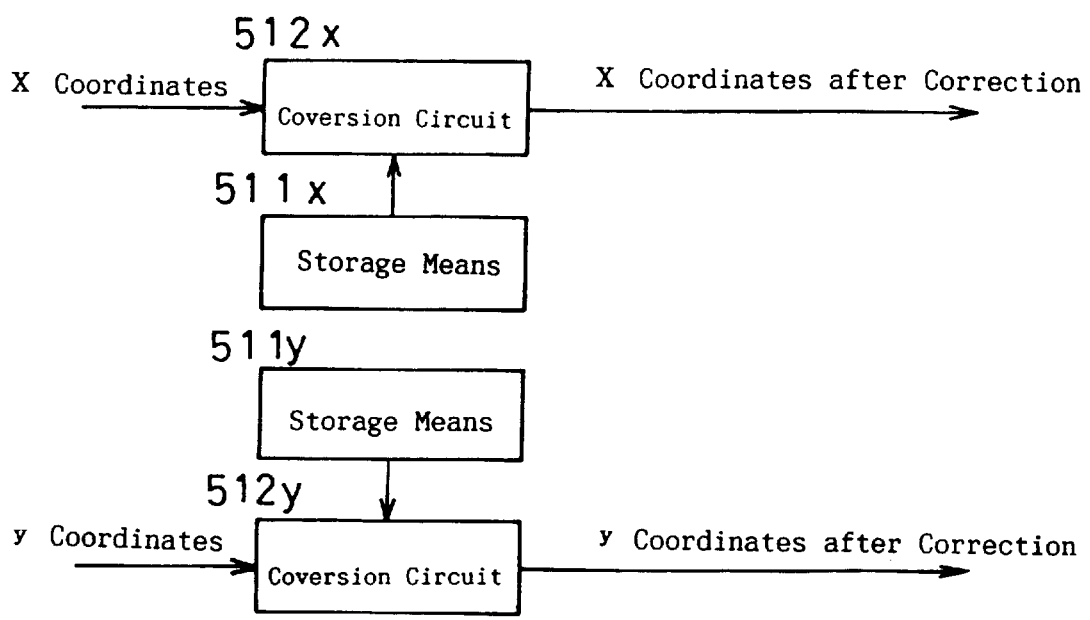
FIG. 7 is a schematic view of a γ correction circuit at panel edges of the embodiment.

In FIG. 7, 511$x$ is a storage means for storing correction information required for correcting x coordinates;. 512$x$ is a γ conversion circuit to correct differences from correction information of x coordinate values and storage means 511$x$; 511$y$ is a storage means to store correction information required for correcting y coordinates; and 512$y$ is a γ conversion circuit to correct differences from correction information of y coordinate values and storage means 511$y$.

At γ conversion circuits 512$x$ and 512$y$, inclination conversion is directed to detected coordinates as shown in the following Formula 11.

$$x_o = \begin{cases} (1-\gamma)x + \gamma\lambda & \ldots & 0 < x < \lambda \\ x & \ldots & \lambda < x < X_L - \lambda \\ (1-\gamma)x + \gamma(X_L - \lambda) & \ldots & X_L - \lambda < x < X_L \end{cases} \quad \text{Formula 11}$$

$$y_o = \begin{cases} (1-\gamma)y + \gamma\lambda & \ldots & 0 < y < \lambda \\ y & \ldots & \lambda < y < Y_L - \lambda \\ (1-\gamma)y + \gamma(Y_L - \lambda) & \ldots & Y_L - \lambda < y < Y_L \end{cases}$$

Figure 8:
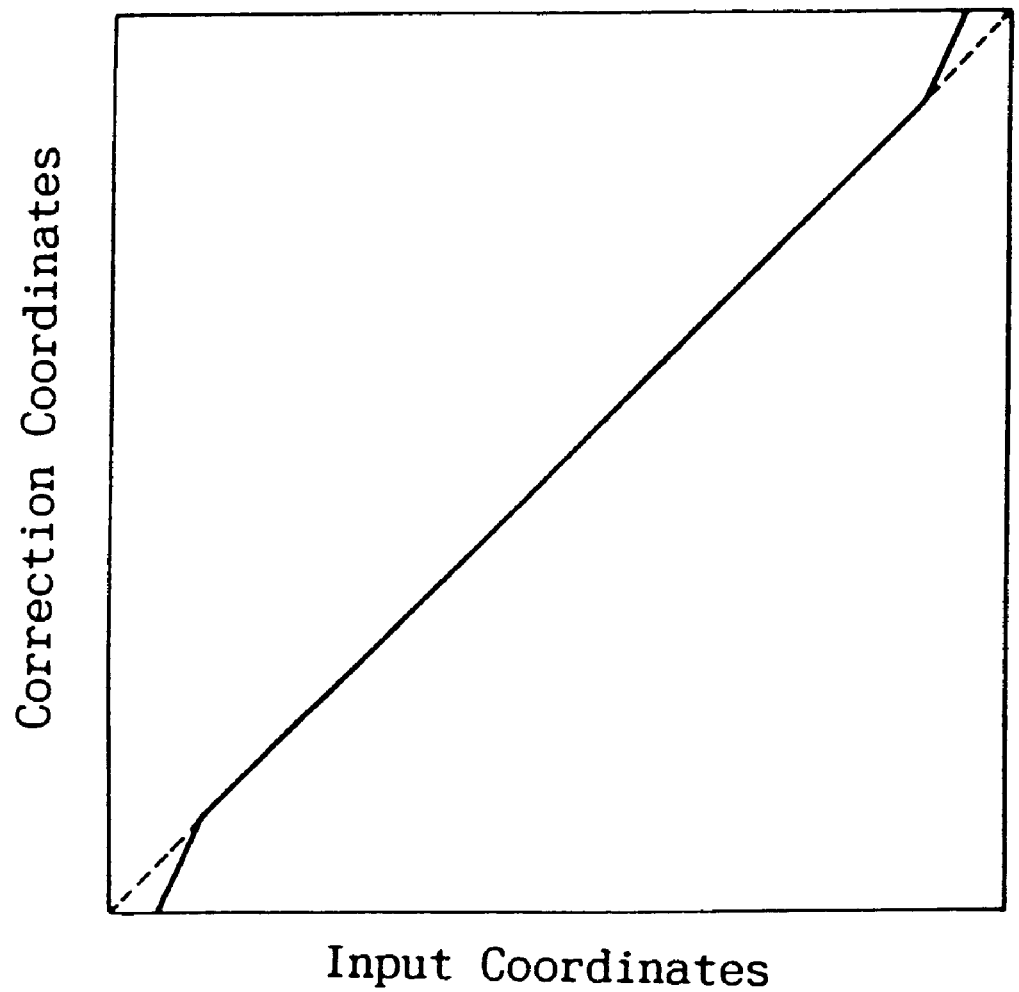
FIG. 8 is a graph showing γ function of the embodiment.

The γ function is shown in FIG. 8.

It is ideal if a switching width λ is half of the driving electrode width $X_w$, and thus $X_w/2$. However, due to the problems of a circuit, it is preferable to use measured values for the switching width λ.

<Correction around Tab Connections>

Figure 39:
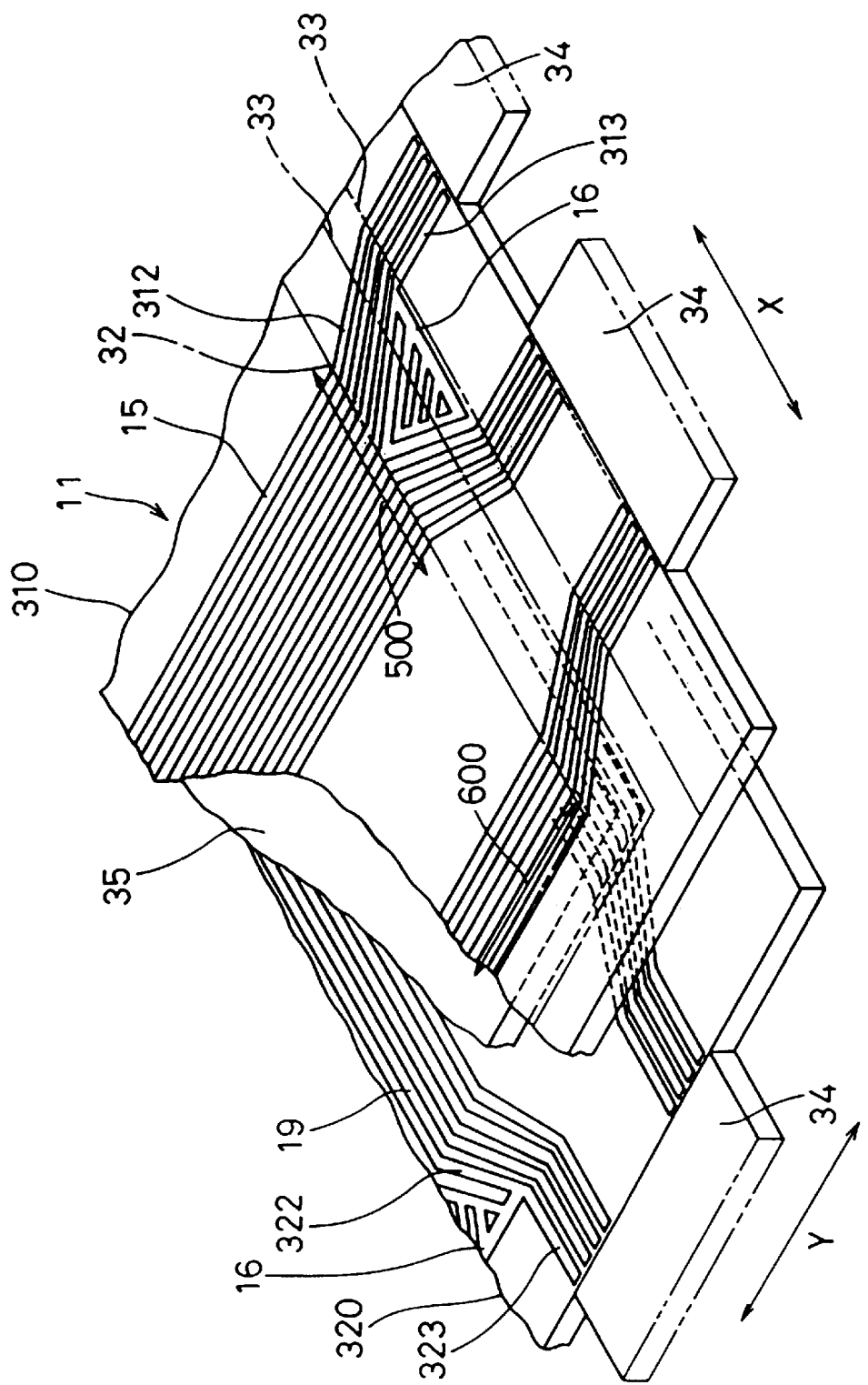
FIG. 39 is a perspective view of a matrix panel used for the conventional display-integrated coordinate input device.
Figure 40:
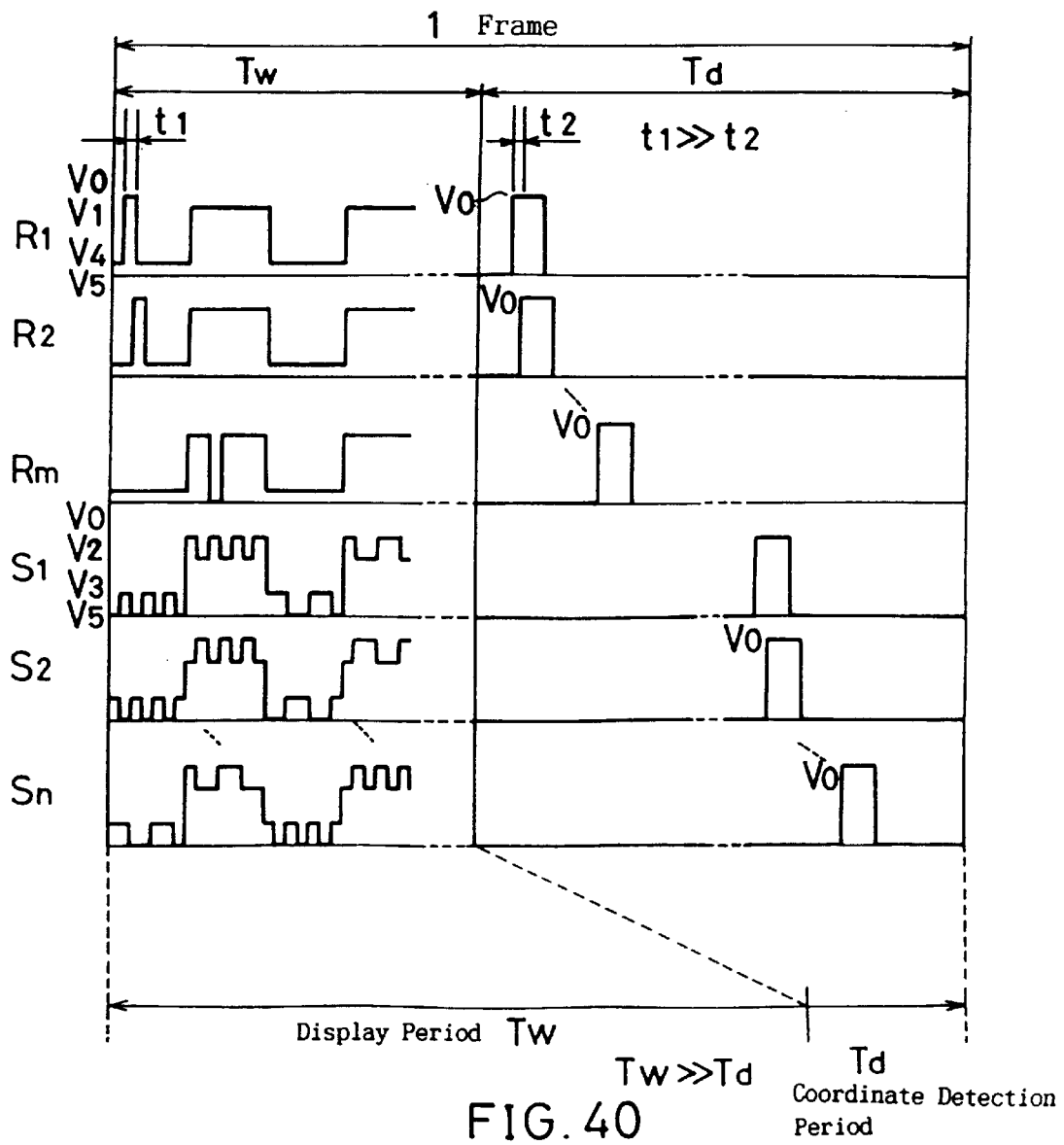
FIG. 40 is a diagram showing voltage applied to electrodes of the conventional display-integrated coordinate input device.
Figure 41:
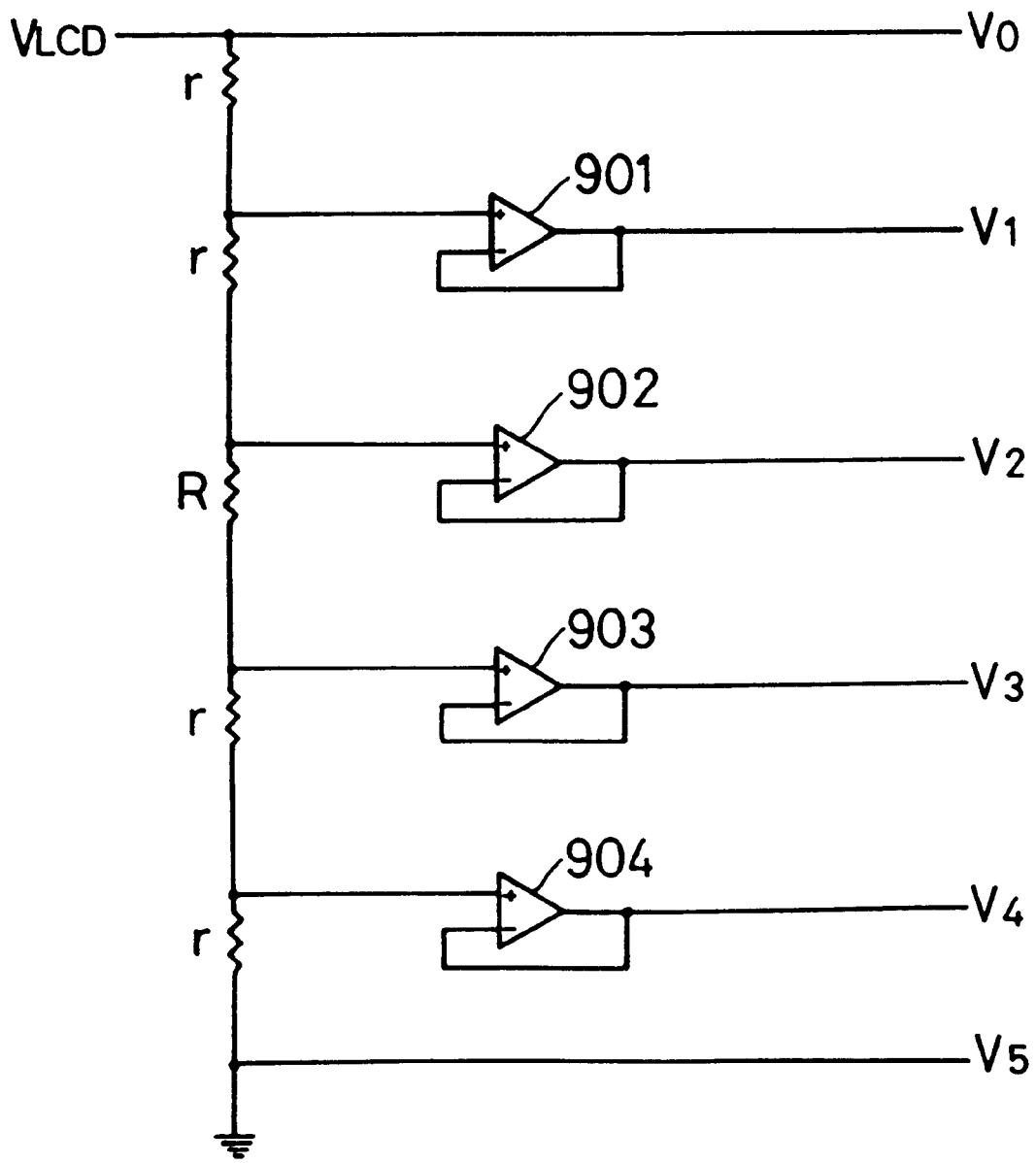
FIG. 41 is a view showing a drive power circuit of the conventional display-integrated coordinate input device.

As described above, electrode pitch at the edges becomes different from the pitch at a display area due to the connection with tabs 34 as shown in FIG. 39, thereby generating positional differences. In order to prevent this problem, it is necessary to use a correction processing circuit as shown in FIG. 10.

Figure 10:
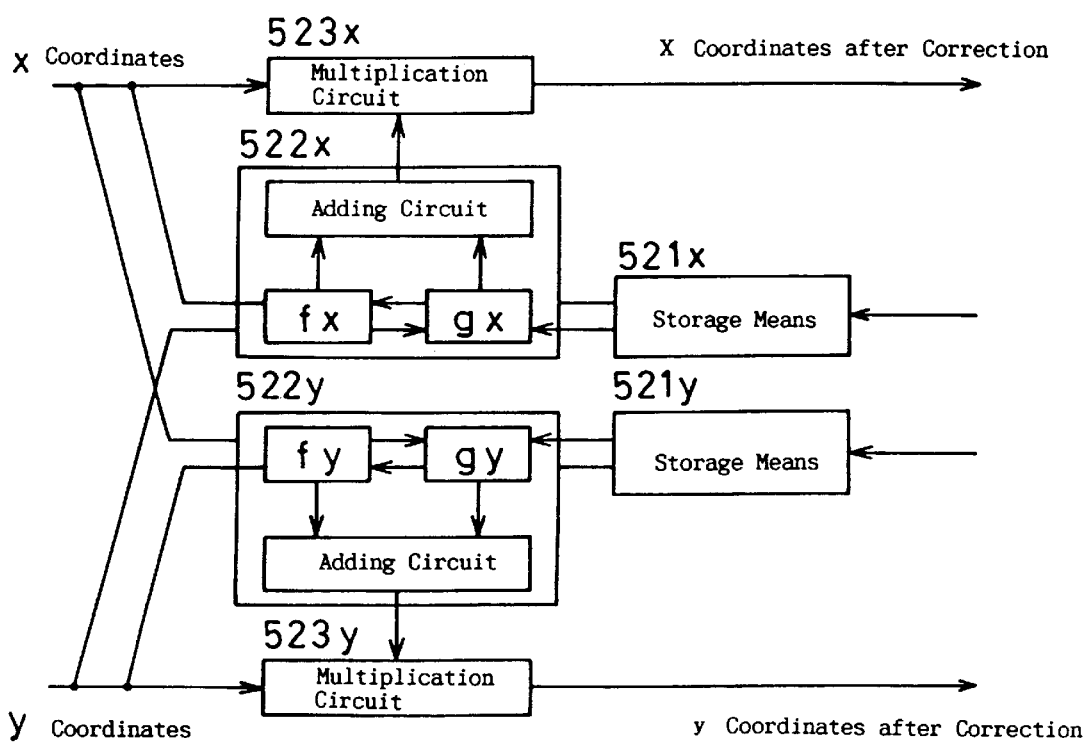
FIG. 10 is a schematic view of a correction circuit at the peripherally gathered ITO lines of the embodiment.

In FIG. 10, 521$x$ is a storage means to store correction information required for correcting x coordinates; 522$x$ is an arithmetic circuit of error amount for calculating amount of difference from the correction information of x and y coordinates and storage means 521$x$; 523$x$ is an adding circuit to add the output of arithmetic circuit of error amount 522$x$ to x coordinates; 521$y$ is a storage means to store correct information required for correcting y coordinates; 522$y$ an arithmetic circuit of error amount for calculating amount of difference from the correction information of x and y coordinate values and storage means 521$y$; and 523$y$ is an adding circuit to add the output of arithmetic circuit of error amount 522$y$ to y coordinates.

With reference to coordinate detection circuit 3 (shown in FIG. 1). y coordinates are determined from the appearing time of a peak value in the row coordinate (y coordinate) detection period, and x coordinate values are determined from the appearing time of a peak value in the column coordinate (x coordinate) detection period. These y and x coordinates are input to arithmetic circuits of error amount 522$x$ and 522$y$. By referring to the input y coordinates, amount of difference with respect to x coordinates is calculated: and amount of difference with respect to y coordinates is calculated from the input x coordinate values. For example, as shown in the following Formula 12, amount of difference $\Delta x$ (x, y) in a x direction is calculated from the product of function $\Delta X_x$, depending on x coordinates, and function $\Delta X_y$, depending on y coordinates.

$$\Delta x(x, y) = \Delta x_x(x) \times \Delta x_y(y) \quad \text{Formula 12}$$

$\Delta X_x(x)$ and $\Delta X_y(y)$ are expressed as in the following Formula 13.

$$\Delta x_x(x) = \begin{cases} \gamma(\lambda - x) & \ldots & 0 < x < \lambda \\ 0 & \ldots & \lambda < x < X_L - \lambda \\ \gamma(x - X_L + \lambda) & \ldots & X_L - \lambda < x < X_L \end{cases} \quad \text{Formula 13}$$

$$\Delta x_y(y) = \begin{cases} 0 & \ldots & y_c - y_F < y < y_c - \lambda \\ \gamma_2(y - y_c + \lambda) & \ldots & y_c - \lambda < y < y_c - \alpha \\ \gamma_1(y_c - y) & \ldots & y_c - \alpha < y < y_c + \alpha \\ \gamma_2(y - y_c - \lambda) & \ldots & y_c + \alpha < y < y_c + \lambda \\ 0 & \ldots & y_c + \lambda < y < y_c + y_F \end{cases}$$

wherein $\begin{cases} \alpha = \beta \cdot \gamma_2 / (\gamma_1 + \gamma_2) \\ y_c = Y_L / N \text{ (driver number)} \times n \end{cases}$ By equally allocating tabs, corrections and thus correction arithmetic are made by the repetition of simple process. Also, even if dummys mentioned below are not treated, noise can be lowered by the same process.

Thus by adding various correction process, positional differences caused, for example, by using a liquid crystal for detecting coordinates are eliminated, and detection precision can be improved.

EXAMPLE 2

Figure 11:
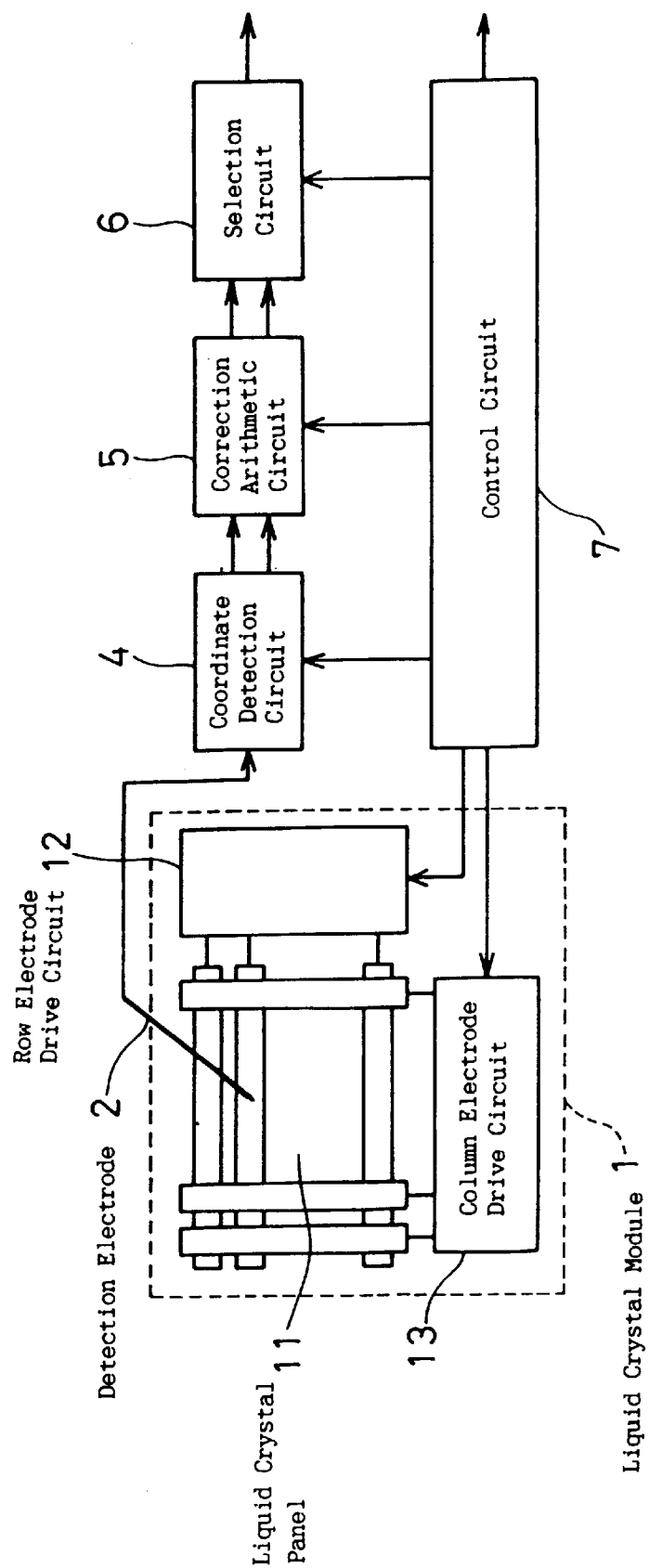
FIG. 11 is a schematic view of a display-integrated coordinate input device of the second embodiment of the invention.

FIG. 11 is a schematic view of the display integrated coordinate input device of the second embodiment of the invention. In FIG. 11, a liquid crystal module 1 comprises of a liquid crystal panel 11 including mutually orthogonal row electrodes $Y_1 - Y_n$ and column electrodes $X_1 - X_m$ and a liquid crystal layer disposed among the electrodes as a display element, a row electrode driving circuit 12 driving the row electrodes of liquid crystal panel 11, and a column electrode driving circuit 13 driving the column electrodes. A detection electrode 2 in the figure detects scanning signals of the liquid crystal panel 11. A coordinate detection circuit 4 outputs coordinates equivalent to row and column coordinates by detecting the time when signals obtained from detection electrode 2 reach a relative potential level (leading and trailing edge). A correction arithmetic circuit 5 removes the fixed, offset from the output values of the coordinate detection circuit 4 and corrects positional differences from physical parameters of the device. A selection circuit 6 selects two sets of output signals from correction arithmetic circuit 5; and a control circuit 7 controls the liquid crystal module 1, the coordinate detection circuit 4, the correction arithmetic circuit 5 and the selection circuit 6.

The object of the display-integrated coordinate device of this example is to solve the problem found in the device shown in FIG. 1, which is the generation of positional differences in the peripheral area of the panel due to low γ of detection signals. The operation of the device of this example is basically the same as the device shown in the first embodiment. Therefore, the display-integrated coordinate device of this example is explained below by mainly referring to differences between this device and the device of the first example.

<Level Detection Process>

One major difference is that the device of this example detects coordinates not by peak appearing time but by the time when detection signals reach a certain relative potential level. (Coordinates which are determined in this way are called "level detection coordinates").

For example, detection electrode 2 is placed at the center of liquid crystal panel 1, and potential level is $V_c$ as soon as ($X_a=X_L/2$), $X_a=X_p+x_w$ in the above-noted Formula 1. Then, the following Formula 14 is found.

$$V_C(t) = \frac{1}{C_{sum}(X_L/2, y_p, h_p)} \int_{X_L/2-xw+xw}^{X_L/2+xw+xw} dx \int_0^{YL} dy C\left(\frac{X_L}{2} - x, y_p - y, h_p\right) V(y)$$

$$= \frac{1}{C_{sum}(X_L/2, y_p, h_p)} \int_{XL/2}^{XL/2+2xw} dx \int_0^{YL} dy C\left(\frac{X_L}{2} - x, y_p - y, h_p\right) V(y)$$

Formula 14

On the other hand, at the right edge (from right to left scanning direction), potential $V_R$ measured at the point where $X_a=X_p+X_w$ is expressed as the following Formula 15.

$$V_R(t) = \frac{1}{C_{sum}(0, y_p, h_p)} \int_{-xw+xw}^{+xw+xw} dx \int_0^{YL} dy C(-x, y_p - y, h_p) V(y)$$

$$= \frac{1}{C_{sum}(0, y_p, h_p)} \int_{XL/2}^{XL/2+2xw} dx \int_0^{YL} dy C\left(\frac{X_L}{2} - x, y_p - y, h_p\right) V(y)$$

Formula 15

Practically, there is some difference since $C_{sum}$ is different. However, output values are the same as long as relative distance (including direction) is the same. Therefore, in an area excluding the left edge, the device can detect coordinates by detecting the time when detection voltage V reaches certain voltage $V_R$, wherein excluding the left edge area of the voltage VR.

In the left edge (from right to left scanning direction), potential is measured at a point where $X_a=X_p-X_w$. Potential $V_L$ is then expressed as the following Formula 16, and output values satisfying the correlations of $X_a=X_p-X_w$ become the same in the area excluding the right edge.

$$V_L(t) = \frac{1}{C_{sum}(X_L, y_p, h_p)} \int_{XL-xw-xw}^{XL-xw+xw} dx \int_0^{YL} dy C(X_L - x, y_p - y, h_p) V(y)$$

$$= \frac{1}{C_{sum}(X_L, y_p, h_p)} \int_{XL/2-2xw}^{XL/2} dx \int_0^{YL} dy C\left(\frac{X_L}{2} - x, y_p - y, h_p\right) V(y)$$

Formula 16

Similarly, coordinates can be detected in the left edge by detecting the time when detection voltage V reaches $V_L$.

Figure 12:
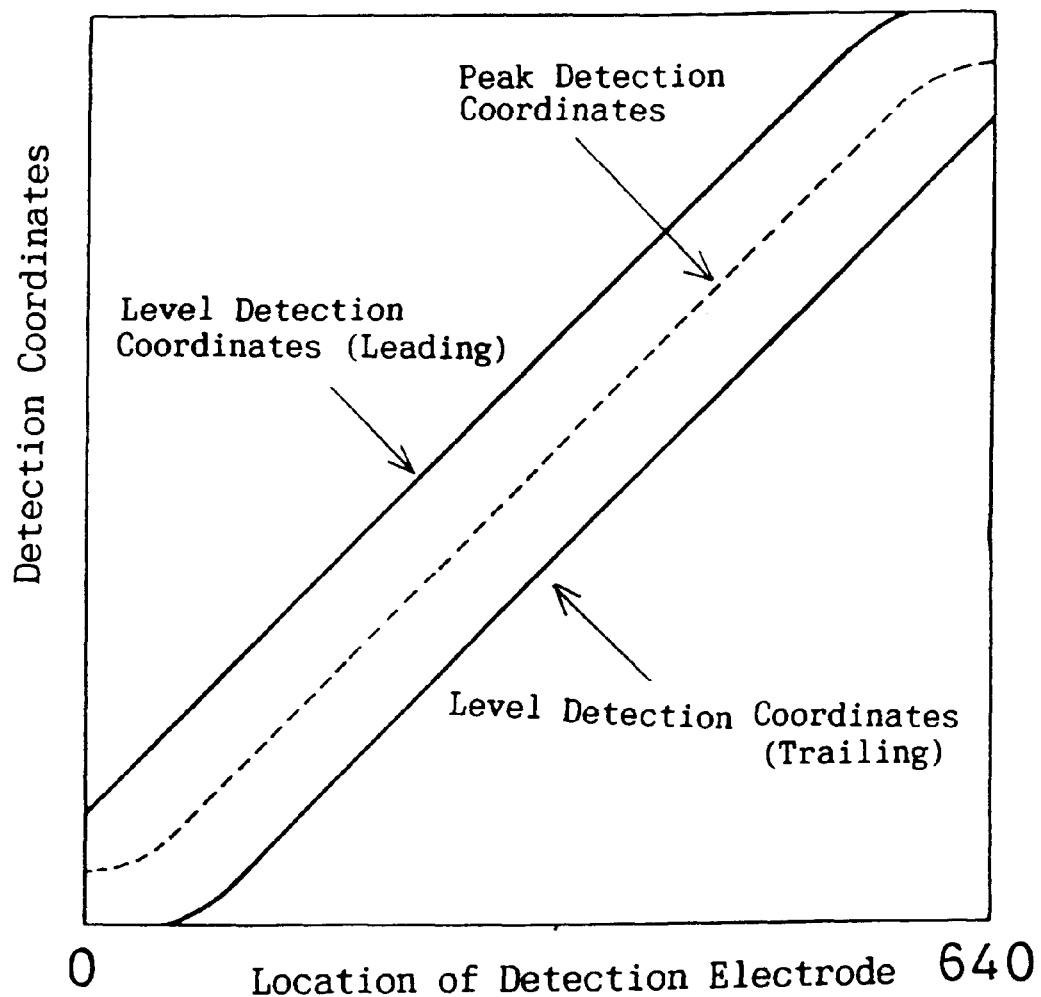
FIG. 12 is a graph showing detection coordinates in level detection of the embodiment.

By observing the time when voltage reaches $V_L$ and $V_R$, coordinates are detected and the results are shown in FIG. 12. As described above, $V_L$ loses linearity at the right edge; and $V_R$ loses linearity at the left edge. However, when $V_R$ is used at the right half and $V_L$ at the left half by selection circuit 6, coordinate input becomes possible over the entire area.

Figure 13:
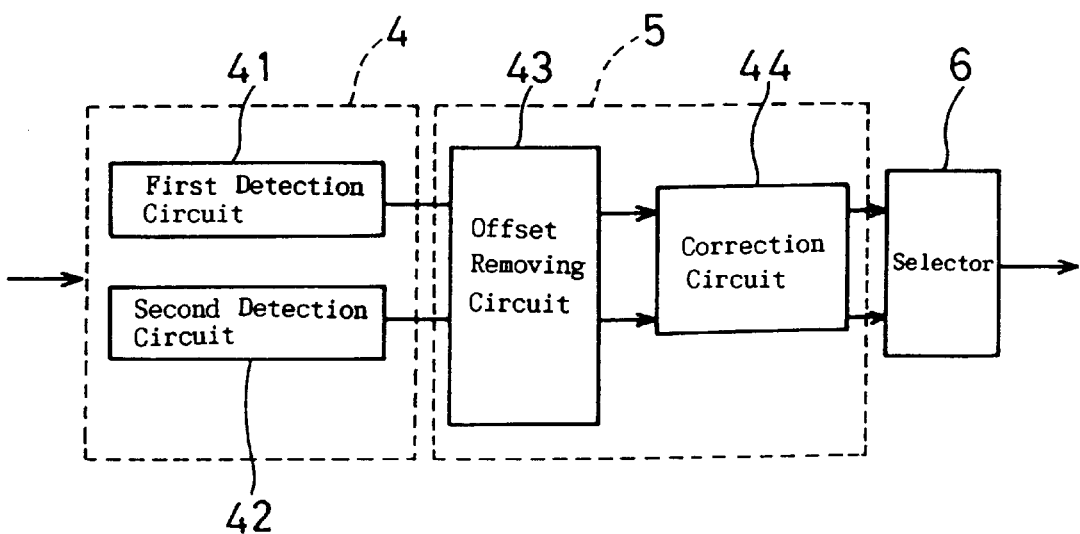
FIG. 13 is a schematic view of a coordinate detection circuit, correction arithmetic circuit and selection circuit of the embodiment.

More specifically, coordinate input can be accomplished, for example, with a circuit shown in FIG. 13. FIG. 13 specifically shows the functions of coordinate detection circuit 4, correction arithmetic circuit 5 and selection circuit 6 shown in FIG. 11. Coordinate detection circuit 4 consists of a first detection circuit which is a magnitude comparator 41 changing output as soon as signals detected by detection electrode 2 exceed relative potential, and a second detection circuit which is a magnitude comparator 42 changing output as soon as signals detected by the detection electrode fall short of the relative potential. Correction arithmetic circuit 5 consists of an offset removing circuit 43 removing fixed offset and a correction circuit 44 correcting positional differences from the physical parameters. Also, selection circuit 6 consists of a selector selecting one out of two sets of outputs from correction arithmetic circuit 5.

In the example of FIG. 13, $V_L$ is output by the first detection circuit and $V_R$ is output by the second detection circuit. Precise coordinates can be output by selecting one of two outputs with a selector.

As another example, $V_R$ is output at the right edge where linearity can be kept while $V_L$ is output at the left edge. Then, the average values of $V_L$ and $V_R$ are output in the area except the right and left edges. Thus, coordinate input becomes possible over the entire region, and detecting errors in a coordinate detection period are eliminated by applying an average value circuit to the device.

Figure 14:
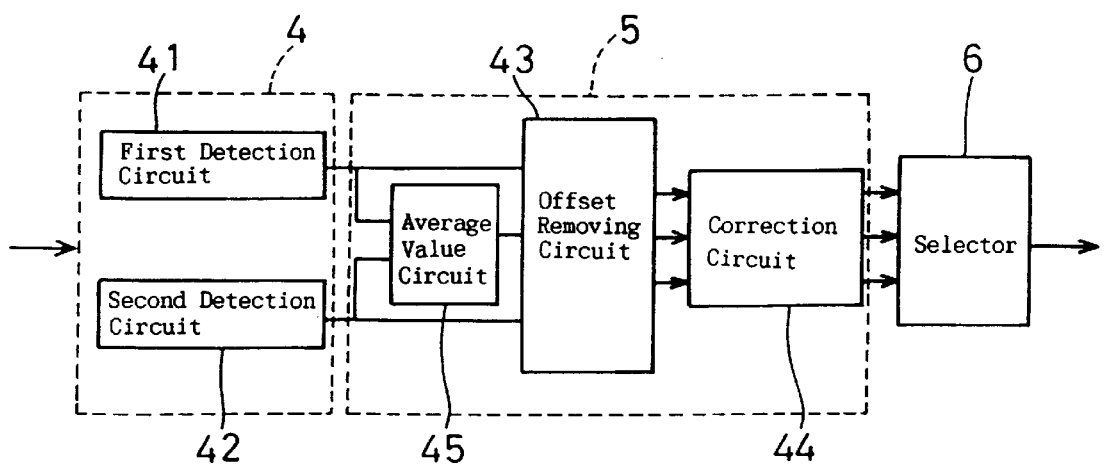
FIG. 14 is a schematic view of another coordinate detection circuit, correction arithmetic circuit and selection circuit of the embodiment.

More specifically, a circuit shown in FIG. 14 can achieve the above-noted advantages. In the figure, an average value circuit 45, outputting the average value of output from the first and second detection circuits, is disposed between coordinate detection circuit 4 and offset removing circuit 43 of FIG. 13. The output of average value circuit 45 is connected to selection circuit 6 through correction arithmetic circuit 5. By this average value circuit 45, $V_L$ is output on the left side of the panel by the first detection circuit and $V_R$ is output on the right side by the second detection circuit in response to the position of detection electrode 2. At the position in-between the right and left sides, average values are output by average value circuit 45, and one of three outputs is selected by the selector applied to selection circuit 6.

One problem found in using level detection coordinates is that the magnitude of detection signals is different when detecting x coordinates than when detecting y coordinates, and the device cannot operate normally at the same relative voltage level.

For instance, if y electrodes are closer to the detection electrode 2 than the x electrodes are, the intensity of signals obtained by scanning y electrodes becomes about 10 times greater than that of signals obtained by scanning x electrodes. In this sense, even if it is attempted to detect x coordinates at the most suitable relative level for detecting y coordinates, the intensity of signals obtained from scanning x electrodes does not reach relative voltage and cannot be detected. Therefore, the relative voltage should be set to a suitable level for both x and y coordinates. It is practically required that the relative voltage of each magnitude comparator shown in FIGS. 13 and 14 is alternated at x and y detection period.

The characteristics of the display element inserted in the matrix panel change in response to surrounding temperature and the like. For instance, when the optical characteristics of liquid crystals or the like vary in accordance with surrounding temperature, it is necessary to alter the voltage applied to the matrix panel in response to the temperature. Normally, by using contrast volume (variable resistance) or the like, the abovementioned properties are achieved. However, the intensity of coordinate detection signals also change at the same time.

The methods of solving this problem include (1) a method of varying the relative voltage level (magnitude comparator) in response to the driving voltage of the matrix panel; (2) a method of varying the relative voltage level (magnitude comparator) in response to the intensity of coordinate detection signals; (3) a method of correcting the detection coordinates by detecting the driving voltage of the matrix panel; (4) a method of correcting the detection coordinates by detecting the intensity of coordinate detection signals; and (5) a method of keeping driving signals used for detecting coordinates at a constant potential without linking them to driving the signals used for display.

Figure 15:
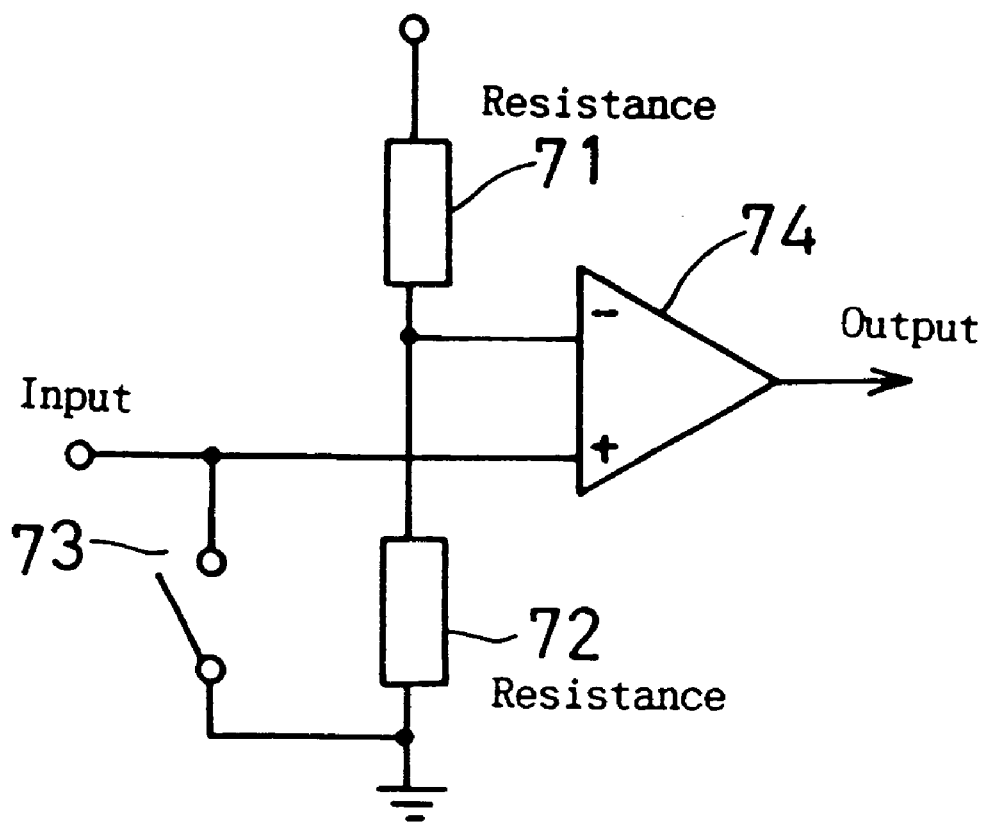
FIG. 15 is a schematic view of a circuit of the embodiment for changing levels in response to liquid crystal driving voltage.

In method (1), as shown in FIG. 15, the wave height of driving signals used for detecting coordinates and applied to liquid crystal panel 11, for instance, is almost in proportion to liquid crystal driving voltage $V_{LCD}$; the above-noted problem is thus solved by forming a device, adding potentials which are generated by dividing voltage between the liquid crystal driving voltage $V_{LCD}$ and GND by resistances 71 and 72 to the reverse input of a comparator 74, and adding detection signals passing through a reset circuit 73 which is designed so as to make detection signal potential during a non-scanning period become GND potential to the non-reverse input of comparator 74.

In method (2), the peak values of detection signals at a certain period are maintained by a peak hold circuit, and this voltage is changed to liquid crystal driving voltage $V_{LCD}$ in method (1) so that the same properties can be achieved. Also, the period of obtaining the peak values is not necessarily a coordinate detection period, and can be a display period. The period can include, for instance, a period of changing signals for altering current.

In method (3), for instance, the problem can be solved by a subtraction circuit, subtracting correction values from the obtained coordinates. The correction values correspond to the driving potential of liquid crystal panel 11, and are calculated and stored in memory beforehand.

Method (4) is not explained here since it is described in (Height Correction) in Example 3.

In addition, method (5) is not explained here and will be explained in (Method of Driving a Matrix Panel) in Example 7.

When differential signals are used as detection signals, a positive (negative) relative potential level is used for detecting time equivalent to the leading edge mentioned above while a negative (positive) relative potential level is used for detecting time equivalent to the trailing edge. Thus, the effects of a differential circuit consisting of the coupling capacity between the drive electrode and the detection electrode, and the input impedance of detection electrodes can be eliminated.

When the effects of the differential circuit formed in an input section are removed by adding a frequency compensating filter to level entire frequencies, it is sufficient to prepare one relative voltage level for each x and y axis direction.

EXAMPLE 3

Figure 16:
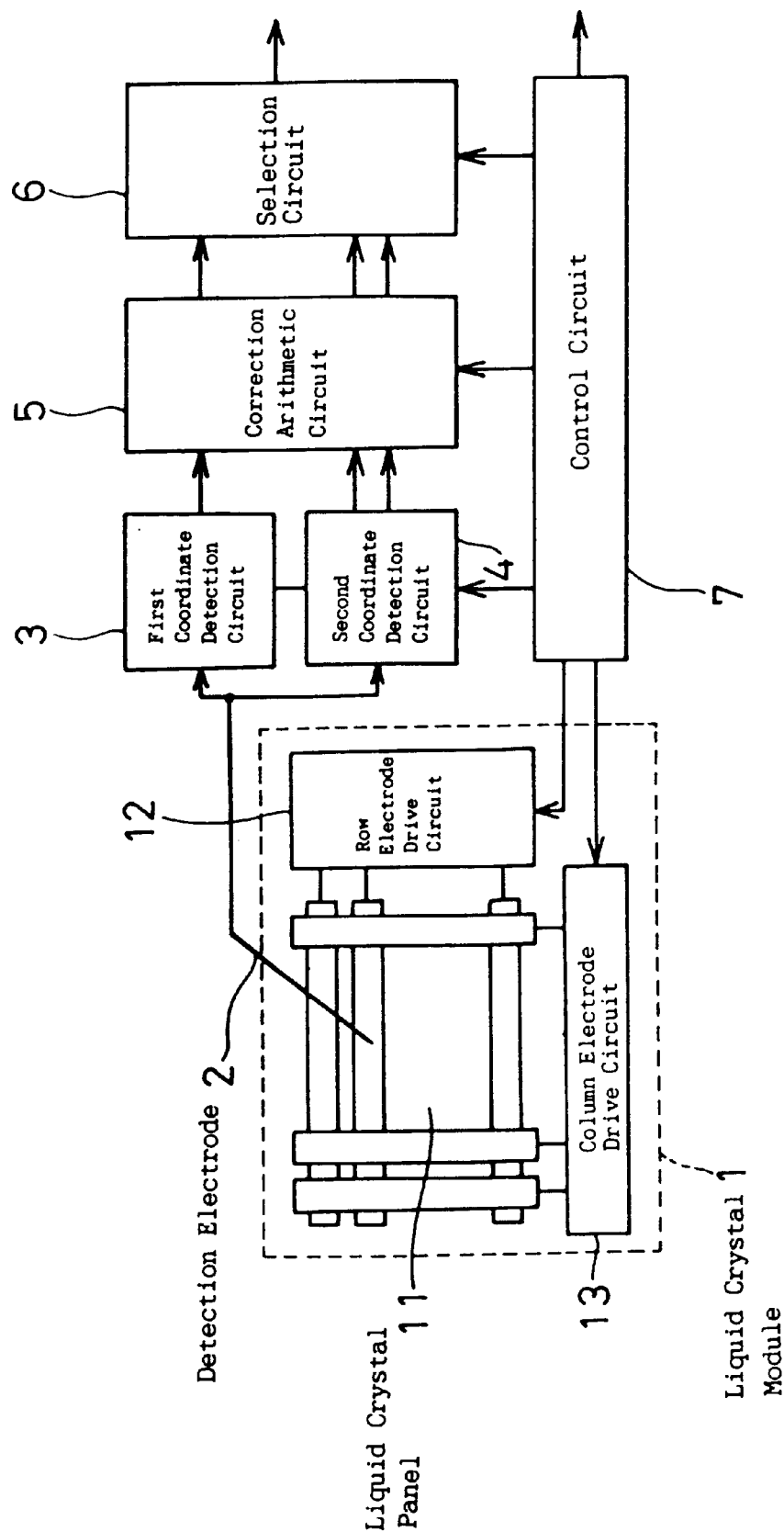
FIG. 16 is a schematic view of a display-integrated coordinate input device of the third embodiment of the invention.

FIG. 16 shows the display-integrated coordinate input device of the third embodiment of the invention.

In FIG. 16, a liquid crystal module 1 comprises a liquid crystal panel 11 including mutually orthogonal row electrodes $Y_1-Y_n$ and column electrodes $X_1-X_m$ and a liquid crystal layer disposed among the electrodes as a display element, a row electrode driving circuit 12 driving the row electrodes of the liquid crystal crystal panel 11, and a column electrode driving circuit 13 for driving the column electrodes. A detection electrode 2 detects scanning signals applied to liquid crystal panel 11; a first coordinate detection circuit 3 detects the time when signals obtained from detection electrode 2 reach a maximum and outputs coordinates equivalent to row and column coordinates; a second coordinate detection circuit 4 detects the time when signals obtained from detection electrode 2 reach a fixed potential level (leading and trailing edges) and outputs coordinates equivalent to row and column coordinates; a correction arithmetic circuit 5 removes fixed offset from the output values of first and second coordinate detection circuits 3 and 4 and corrects the positional differences from physical parameters of the device; a selection circuit 6 selects the output signals of correction arithmetic circuit 5; and a control circuit 7 controls the liquid crystal module 1, the coordinate detection circuit 4, the correction arithmetic circuit 5 and the selection circuit 6.

The object of the input device of this example is to solve a problem found in the device shown in FIG. 11, a positional difference generated by bending the input surface with the pressure of a pen in the central section or the like. The device of the invention basically has the same functions as the device of the second embodiment, so that mainly the different characteristics of the device of the invention are explained hereinafter.

<Process of Peak and Level Detection>

As described above, coordinates at the peripheral area cannot be detected by peak detection (Example 1), and a positional difference is generated by the change in the height of a pen due to the bent panel in detecting coordinates by level detection (Example 2).

In order to solve these problems, coordinates are basically detected by the peak detection, and are detected by the level detection at sections where peak detection cannot be applied.

In an x axis direction, for example, positions can be detected by converting values as in the following Formula 17, when a coordinate value obtained from first coordinate detection circuit 3 is $X_p$ and coordinates obtained from second coordinate detection circuit 4 are $X_u$ (coordinate detected at a point where $X_a=X_p-X_w$) and $X_d$ (coordinate detected at a point where $X_a=X_p+X_w$).

$$x = \begin{cases} x_d & \ldots & 0 < x < x_w \\ x_p & \ldots & x_w < x < x_L - x_w \\ x_u & \ldots & x_L - x_w < x < x_L \end{cases} \quad \text{Formula 17}$$

In a y axis direction, positions can be detected by converting values as in the following Formula 18, when a coordinate value obtained from first coordinate detection circuit 3 is $Y_p$ and coordinate values obtained from second coordinate detection circuit 4 are $Y_u$ (coordinate detected at a point where $Y_a = Y_p - Y_w$) and $Y_d$ (coordinate detected at a point where $Y_a = Y_p + Y_w$).

$$y = \begin{cases} y_d & \ldots & 0 < y < y_w \\ y_p & \ldots & y_w < y < y_L - y_w \\ y_u & \ldots & y_L - y_w < y < y_L \end{cases} \quad \text{Formula 18}$$

Thus, by the above-noted conversion control, the positional differences caused by the height at the center can be reduced, and positions can also be detected at a peripheral position.

Figure 17:
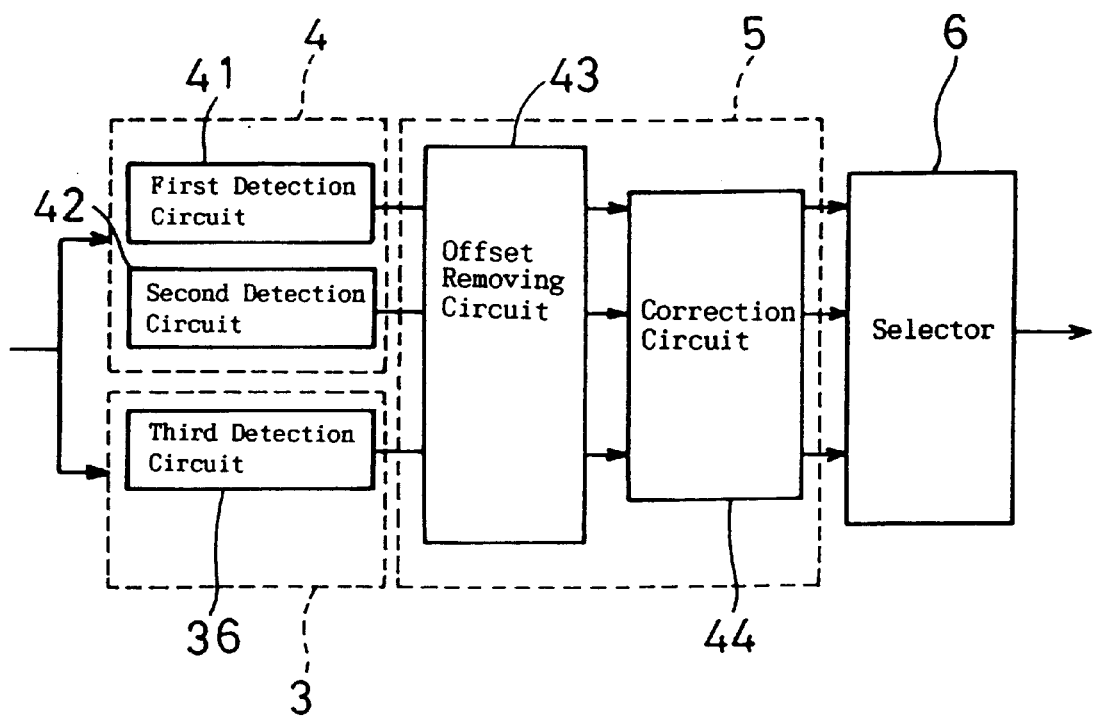
FIG. 17 is a schematic view of a coordinate detection circuit, a correction arithmetic circuit and a selection circuit of the embodiment.

More specifically, the problems can be solved, for example, by a device shown in FIG. 17. FIG. 17 specifically shows the first coordinate detection circuit 3, the second coordinate detection circuit 4, the correction arithmetic circuit 5 and the selection circuit 6 shown in FIG. 16. First coordinate detection circuit 3 is a third detection circuit consisting of a magnitude comparator 36 which varies its output just as signals detected by detection electrode 2 reach a maximum. Also, coordinate detection circuit 4 includes a first detection circuit, consisting of a magnitude comparator 41 which changes its output just as signals detected by detection electrode 2 exceed a certain relative potential, and a second detection circuit, consisting of a magnitude comparator 42 which changes its output just as signals detected by detection electrode 2 go below the relative potential. Correction arithmetic circuit 5 consists of an offset removing circuit 43 removing fixed offset and a correction circuit 44 which, corrects positional differences from the physical parameters of the device. Moreover, selection circuit 6 includes a selector which selects one out of three outputs from the first and second coordinate detection circuits 3 and 4.

By applying a circuit having the above-mentioned structure, input becomes possible over the entire panel by selecting one of three outputs of the peak and level detection coordinates.

Figure 18:
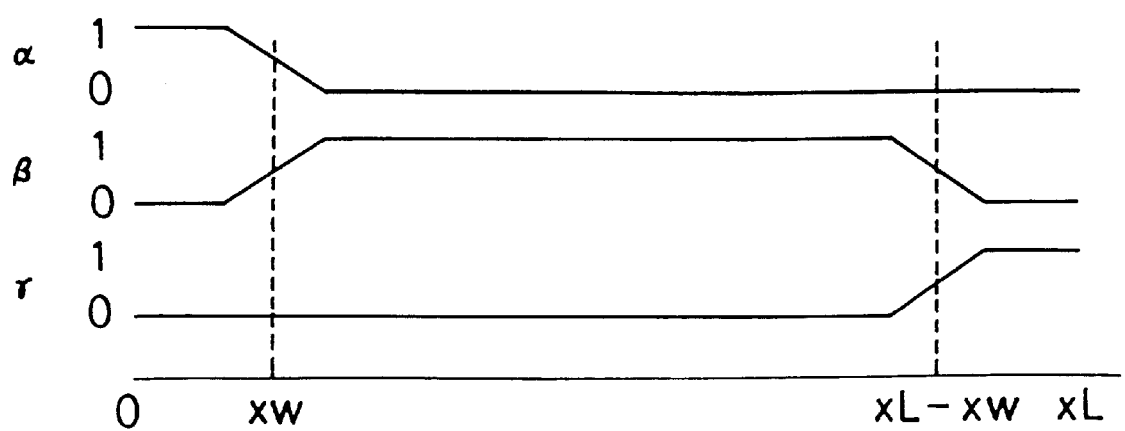
FIG. 18 is a diagram showing the specific gravity of α, β and γ of the embodiment.

In order to maintain the continuity of peak and level coordinates at each connecting section, the following Formula 19 is applied, and the specific gravity of α, β and γ is controlled as in FIG. 18.

$$\begin{cases} x = \alpha_x \cdot x_d + \beta_x \cdot x_p + \gamma_x \cdot x_u \\ y = \alpha_y \cdot y_d + \beta_y \cdot y_p + \gamma_y \cdot y_u \end{cases} \quad \text{Formula 19}$$

Figure 19:
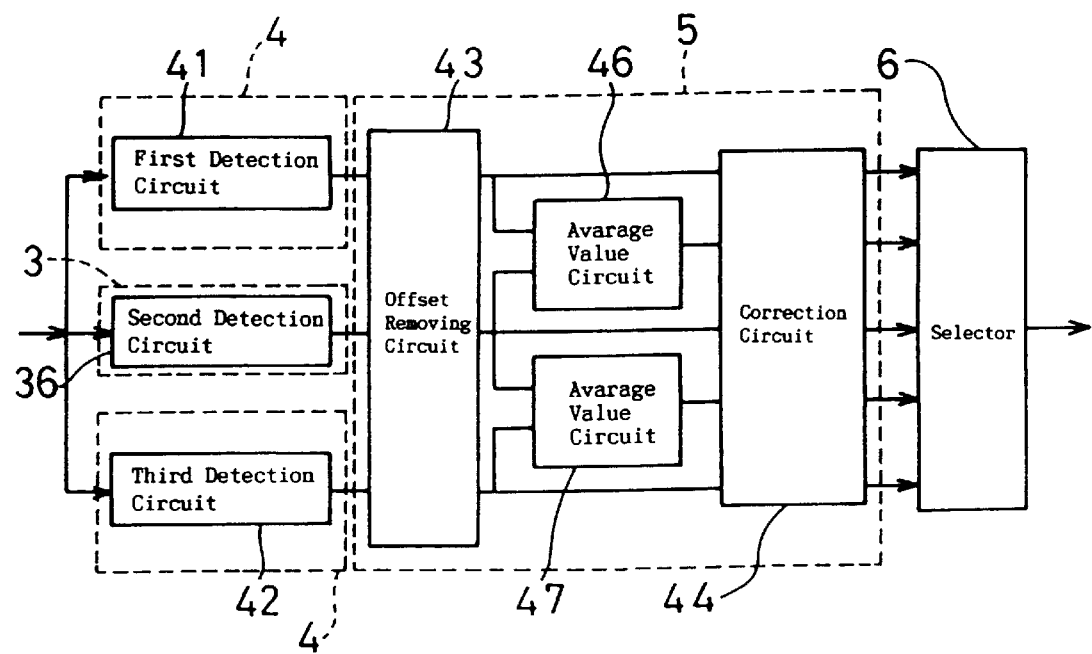
FIG. 19 is a schematic view of another coordinate detection circuit, correction arithmetic circuit and selection circuit of the embodiment.

More specifically, in addition to the circuit structure shown in FIG. 17, a first average value circuit 46, which outputs the average output of the first and third detection circuits, and a second average value circuit 47, which outputs the average output of the second and third detection circuits, are disposed between offset removing circuit 43 and correction circuit 44, as shown in FIG. 19. Furthermore, as shown in FIG. 18, the outputs of the first and second average value circuits 46 and 47 are used in the conversion region of the peak and the level detection.

By applying the circuit having the above-noted structure and characteristics, coordinate values having continuity and no positional differences are obtained even in the peak and level conversion region by selecting one output from five sets of outputs of correction arithmetic circuit 5 in response to the position of detection electrode 2.

<Height Correction>

In the above-noted method, the distance ("height of detection electrode") between a liquid crystal layer and a writing surface (surface of an acrylic plate or the like used to protect the matrix panel) has to be constant. If the height is not constant, the offset values of coordinate values obtained from the level detection during the period of differential position adjusting (one point in center) become different from peripheral offset values which are actually used, and detection coordinates at a conversion section become inconsistant. Therefore, it is necessary to know the peripheral offset values.

As a method, the offset values are directly obtained by adjusting positional differences at several points. However, it is always necessary to input at several points when positional differences are adjusted so as to correct parallax. The treatment of correcting parallax thus becomes complex.

Figure 20:
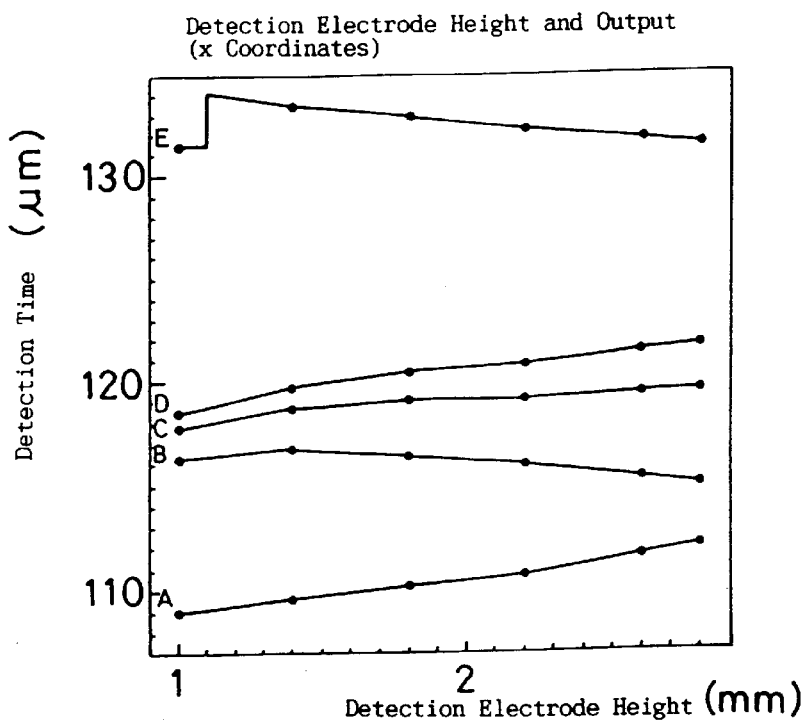
FIG. 20 (a) is a graph showing the dependency of detection coordinates on detection electrode height of the embodiment.
Figure 20:
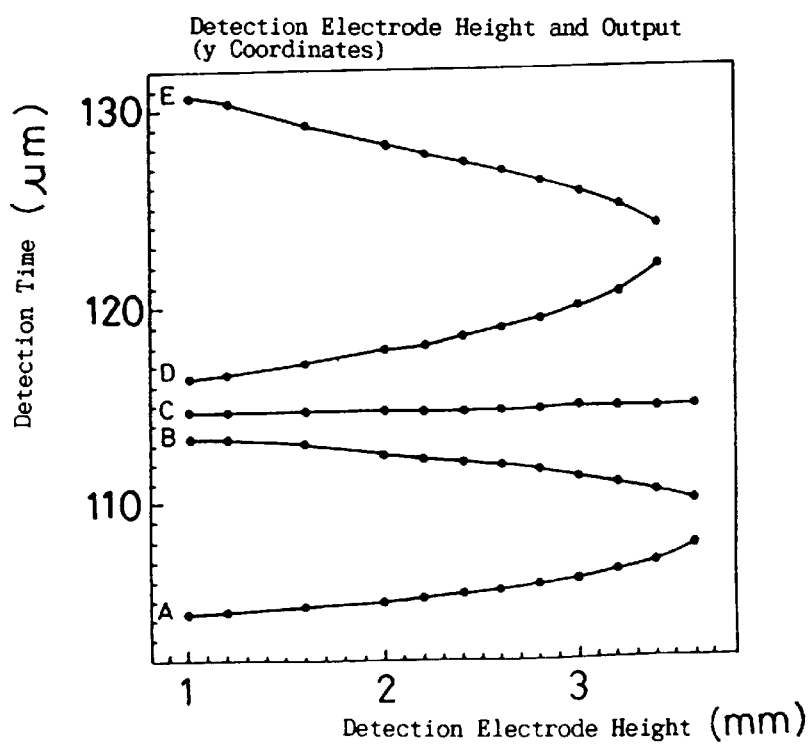
Figure 21:
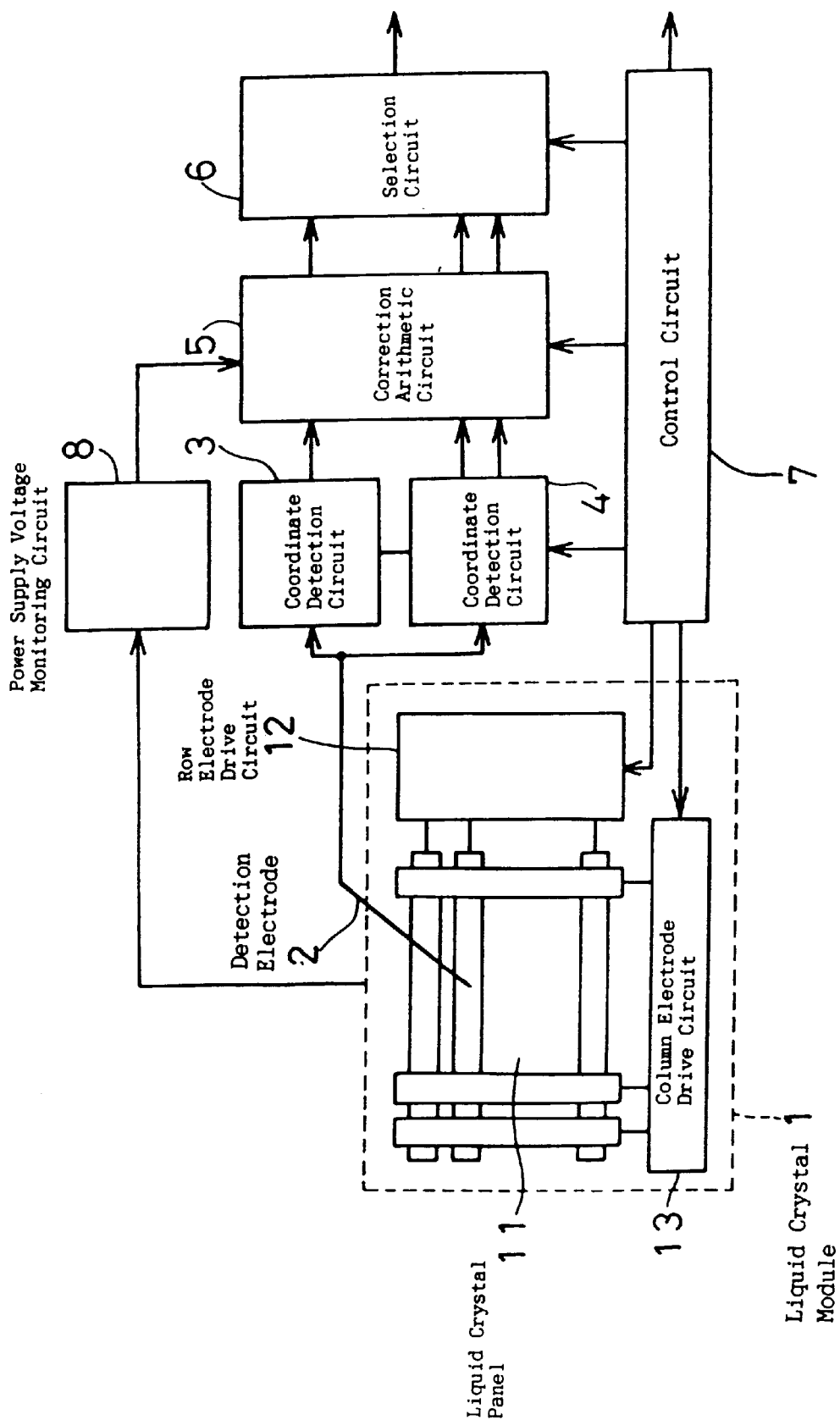
FIG. 21 is a schematic view showing other characteristics of the display-integrated coordinate input device of the embodiment.

In another method of avoiding this problem, the offset values are calculated from detected height and measured data. There is actually little variation in the height of a detection electrode at the edges, and the height can be determined during the design period. Thus, in accordance with FIG. 20 which shows the change in height of the detection electrode relative to the detection coordinates when a normal voltage is applied to the liquid crystal panel, differences from coordinates obtained from peaks—$\Delta x_{uh}$, $\Delta x_{dh}$, $\Delta y_{uh}$ and $\Delta y_{dh}$ ("difference in offset value")—are calculated and then removed.

For instance, if the distance between the liquid crystal layer and the surface of the acrylic plate is 3 mm, the differences in offset values are about 2 dots ($\Delta x_{uh}$, $\Delta x_{dh}$) in x coordinates and about 7 dots ($\Delta y_{uh}$, $\Delta y_{dh}$) in y coordinates.

Correction values obtained as mentioned above are converted as in the following Formula 20.

$$x = \begin{cases} x_d + \Delta x_{dh} & \ldots & 0 < x < x_w \\ x_p & \ldots & x_w < x < x_L - x_w \\ x_u - \Delta x_{uh} & \ldots & x_L - x_w < x < x_L \end{cases} \quad \text{Formula 20}$$

$$y = \begin{cases} y_d + \Delta y_{dh} & \ldots & 0 < y < y_w \\ y_p & \ldots & y_w < y < y_L - y_w \\ y_u - \Delta y_{uh} & \ldots & y_L - y_w < y < y_L \end{cases}$$

Continuity at joined sections can be obtained by controlling the specific gravity of α, β and γ as shown in FIG. 18 and determining coordinates in accordance with the following Formula 21.

$$\begin{cases} x = \alpha_x(x_u - \Delta x_{uh}) + \beta_x \cdot x_p + \gamma_x(x_d - \Delta x_{dh}) \\ y = \alpha_y(y_u - \Delta y_{uh}) + \beta_y \cdot y_p + \gamma_y(y_d - \Delta y_{dh}) \end{cases} \quad \text{Formula 21}$$

(Correction of Power Supply Voltage)

Detection coordinates obtained by the level detection are changed not only by the height but by the inclination of the detection electrode. However, the change can be subdued by making a section, where the detection electrode is coupled to the drive electrode, spherical in shape so as to keep the coupling intensity constant even if the inclination changes slightly.

Also, signal intensity changes due to drive signal voltage (changes by contrast controlling volume). More specifically, $x_u$ changes in a direction where coordinate values become small and $X_d$ varies in a direction where coordinate values further enlarge, as drive signal voltage increases.

There is a driving method for preventing the change in coordinate detection pulse intensity caused by driving conditions (this method will be explained below) and a method of correcting differences in offset values obtained from the outputs of a power supply voltage monitoring circuit 8 for monitoring power supply voltage.

In addition, when there is detection electrode 2 in the center area of liquid crystal panel 11, the intensity of driving signals can be detected by detecting $x_p$–$x_u$ and $x_d$–$x_p$. (This is applied when there is little variation in the height of the detection electrode.)

In the above-described Examples 1–3, a liquid crystal panel is mentioned as a matrix panel. However, the panel is not limited to a liquid crystal panel. Other matrix panels having a plurality of electrodes in a row and a column direction can also be applied.

EXAMPLE 4
<Method of Applying Voltage to a Dummy Electrode>

In this example, detection precision around dummy electrodes is improved by applying voltage, particularly to the electrode formed on a matrix panel.

As shown in FIG. 39, an electrode pitch becomes narrow and a triangular gap is formed among the tabs, since electrodes are connected to tabs which are coupled to the row electrode drive circuit 12 and the column electrode drive circuit 13 at the edges of the matrix panel 11. Light transmits through this gap more than other sections, and images become poor. Thus, like other sections, electrodes (dummy electrodes) are formed in this gap so as to reduce the amount of light leakage.

Figure 9:
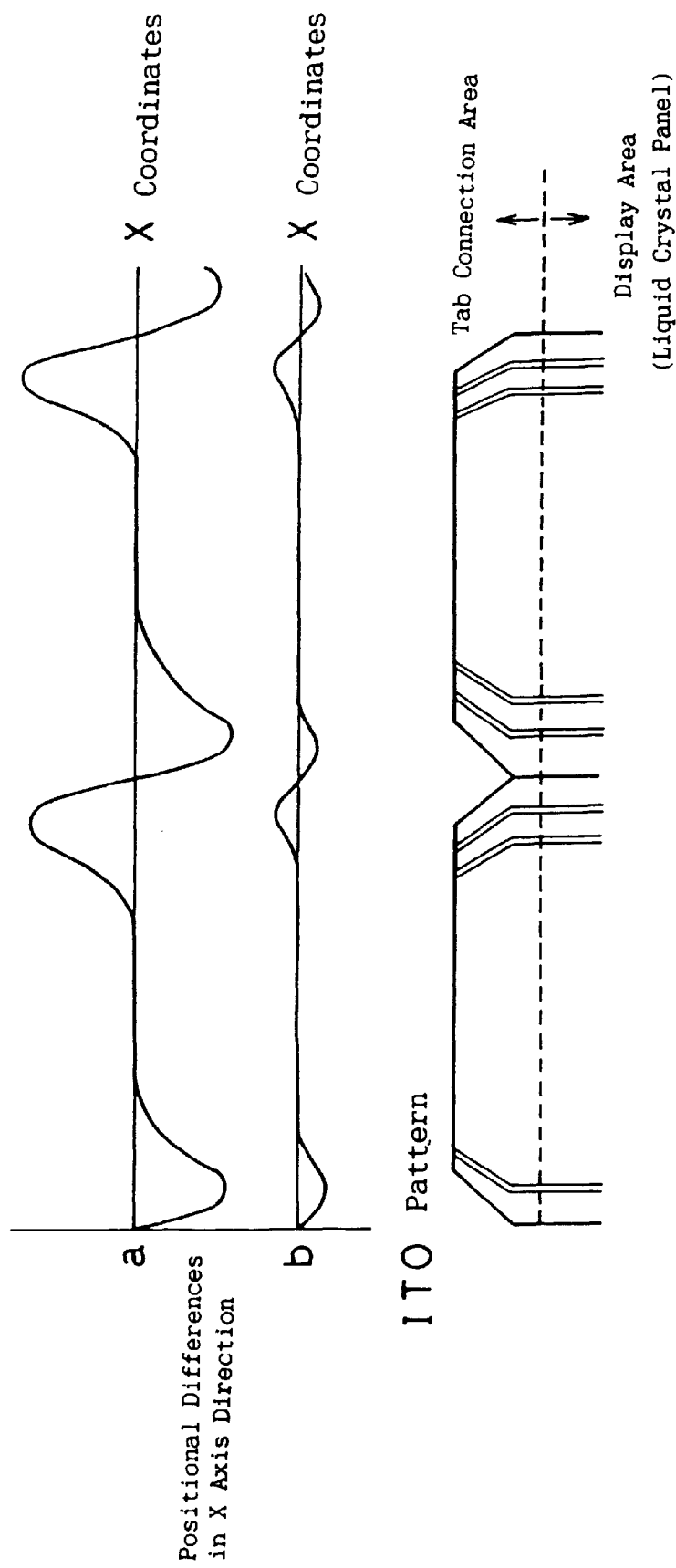
FIG. 9 is a diagram showing the results of coordinate detection near the tab joint area.

When no signals are applied to the triangular dummy electrodes, light radiates due to the accumulation of charge at the coupling capacity formed together with peripheral electrodes, so that potential at the gap has to be fixed. However, when driving signals are applied to this section having a large area, positional differences as shown in FIG. 9a are generated. This effect of the dummy electrodes can be reduced by electrically separating the electrodes and fixing the potential.

However, when the potential of the dummy electrodes is fixed, liquid crystals between the dummy electrode and the neighboring electrode on the same surface react, thus emitting light from borders. This problem can be solved by driving the dummy electrodes as mentioned below.

Figure 22:
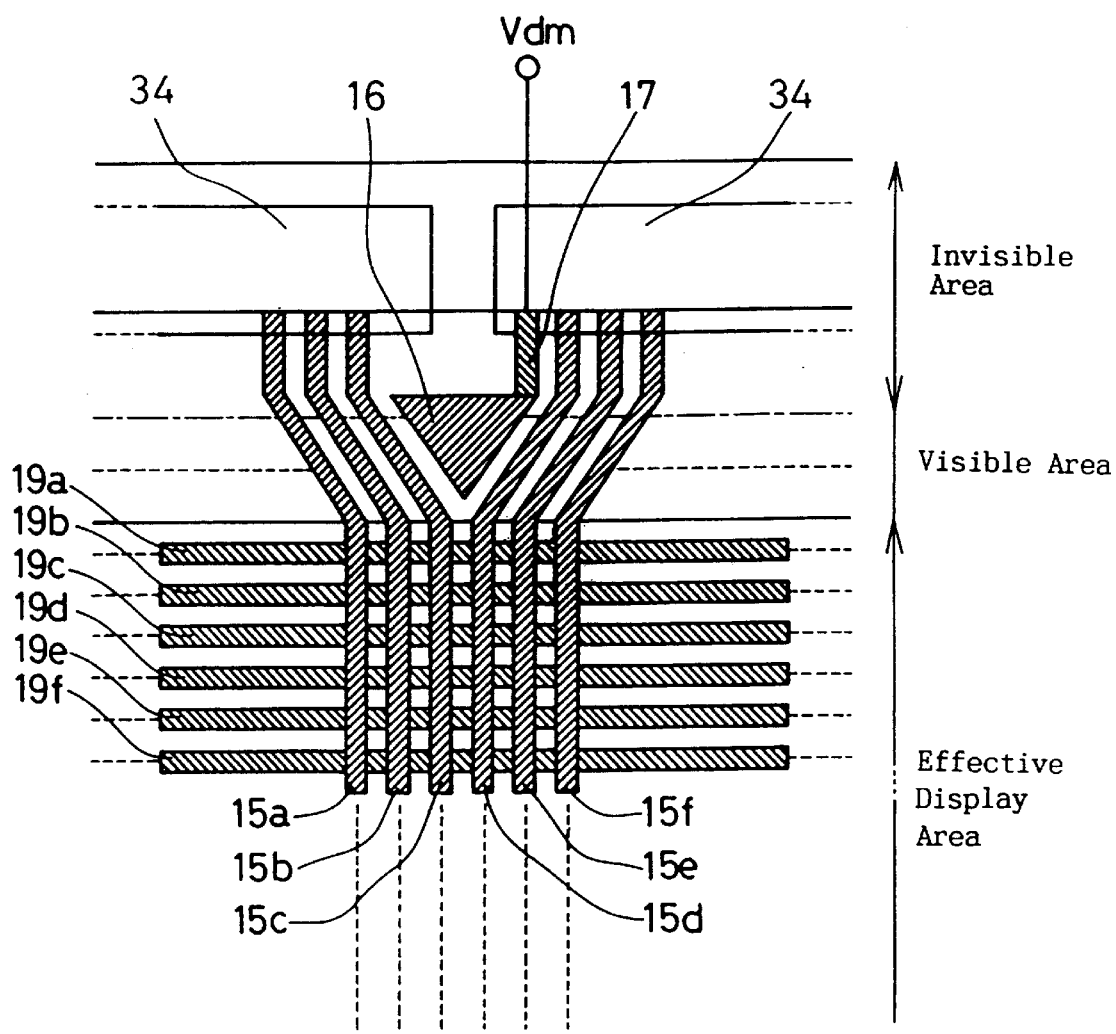
FIG. 22 is a schematic view of dummy electrodes formed at the periphery of a display-integrated coordinate input device of the fourth embodiment of the invention.

FIG. 22 shows an enlarged section of dummy electrodes of FIG. 39 in liquid crystal panel 11. In the figure, 15a–15f are column electrodes; 19a–19f are row electrodes; and the electrodes are generally transparent. A tab 34 is to be connected to column electrode drive circuit 12, and each output terminal of the tab is connected to the column electrodes 15a–15f respectively. A dummy electrode 16 is to eliminate the difference in brightness in a visible area between where column electrodes 15a–15f exist and where they do not; electrode 16 is generally transparent. Dummy electrode 16 is led by a transparent electrode 17, and is connected to column dummy electrode voltage $V_{dm}$.

Figure 23:
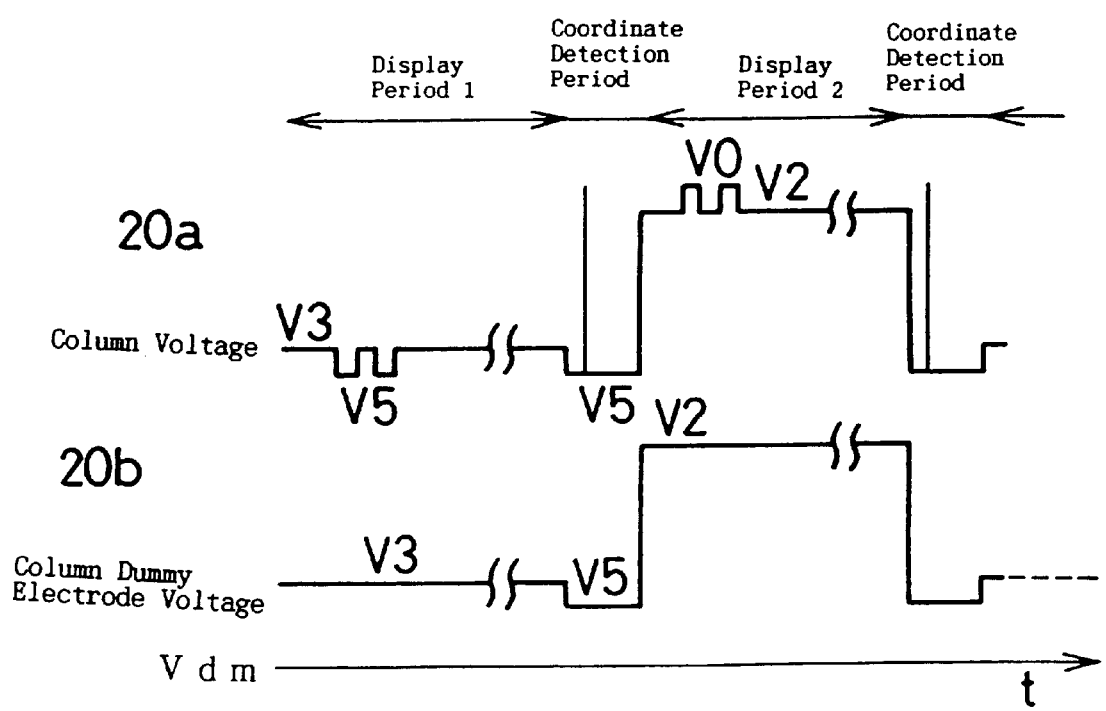
FIG. 23 is a diagram showing the voltage applied to column dummy electrodes in dummy electrode treatments of the embodiment.

FIG. 23 shows an example of the column dummy electrode voltage $V_{dm}$. In the figure, $V_2$ and $V_3$ are column non-selective voltages in the period of displaying mode; $V_0$ and $V_5$ are selective voltages; and $V_0>V_2>V_3>V_5$. 20a shows the voltage waveforms of column electrode 15d adjacent to dummy electrode 16 while 20b indicates the voltage waveforms of the dummy electrode. In other words, voltage $V_3$ is applied to dummy electrode 16 in a display period 1, and voltage $V_2$ is applied to the electrode in a display period 2. In addition, voltage $V_5$ is applied to the electrode in a coordinate detection period.

Since the voltage having the above-mentioned waveforms is applied to dummy electrodes 16, the voltage at the electrodes does not include a coordinate detection pulse. Thus, even if a coordinate detection pulse is detected by the electrostatic capacity coupling between detection electrode 2 and column electrodes 15a–15f or row electrodes 19a–19f, dummy electrodes 19 do not generate the pulse at the same timing as the neighboring column electrode 15c or 15d do. In addition, it is not found that only the signal intensity in the timing becomes large. As a result, coordinate detection signals detected before and after the timing do not deteriorate when detection electrode 2 is positioned close to the dummy electrode. Therefore, coordinates in an effective display area including the peripheral area of the panel (especially, the section close to dummy electrodes 16) can be precisely detected.

The gap between dummy electrode 16 and the neighboring column electrode 15c or 15d is generally 100 μm or more. Since signals for alternating current used during a displaying mode period of liquid crystal 11 are applied to dummy electrode 16, there is a difference in effective voltage between voltage waveforms 20a and 20b. Therefore, even if voltage as shown in FIG. 23 is applied, liquid crystals between dummy electrode 16 and the neighboring column electrode 15c or 15d do not respond from off to on, so that display quality cannot be reduced.

Figure 24:
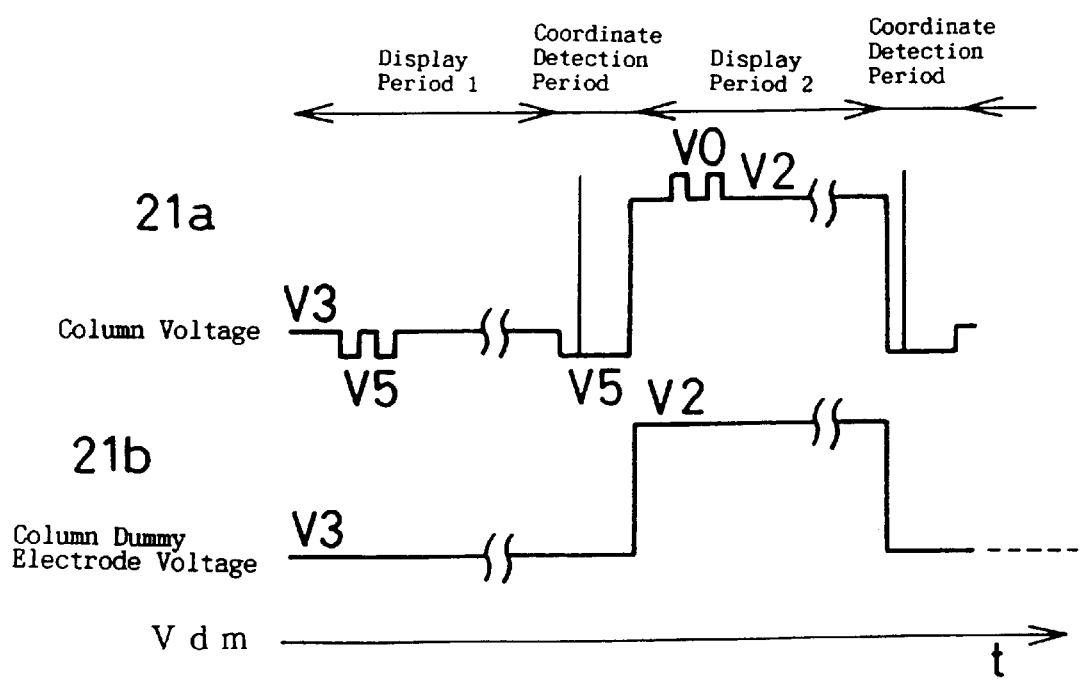
FIG. 24 is a diagram showing a different voltage applied to column dummy electrodes in dummy electrode treatments of the embodiment.

FIG. 24 shows another example of column dummy electrode voltage $V_{dm}$. Similar to FIG. 23, 21a shows the voltage waveform of column electrode 15d adjacent to dummy electrode 16 while 21b indicates the voltage waveform of the dummy electrode. Voltage $V_3$ is applied to dummy electrode 16 in display period 1 and the coordinate detection period, and voltage $V_2$ is applied to the electrode in display period 2.

Even if voltage applied to dummy electrode 16 has the above-noted voltage waveform, it does not include a coordinate detection pulse. Thus, even if a coordinate detection pulse is detected by the electrostatic capacity coupling between detection electrode 2 and column electrodes 15a–15f or row electrodes 19a–19f, dummy electrode 19 does not generate at the same timing as the neighboring column electrode 15c or 15d does. In addition, it is not found that the only signal intensity in the timing becomes large. As a result, coordinate detection signals detected before and after the timing do not deteriorate when detection electrode 2 is positioned close to the dummy electrode. Therefore, coordinates in an effective displaying region including the peripheral area of the panel (especially, a section close to dummy electrode 16) can be precisely detected. As described above, even if voltage as shown in FIG. 24 is applied, liquid crystals between dummy electrode 16 and the neighboring column electrode 15c or 15d do not respond from off to on, so that display quality cannot be reduced.

Figure 25:
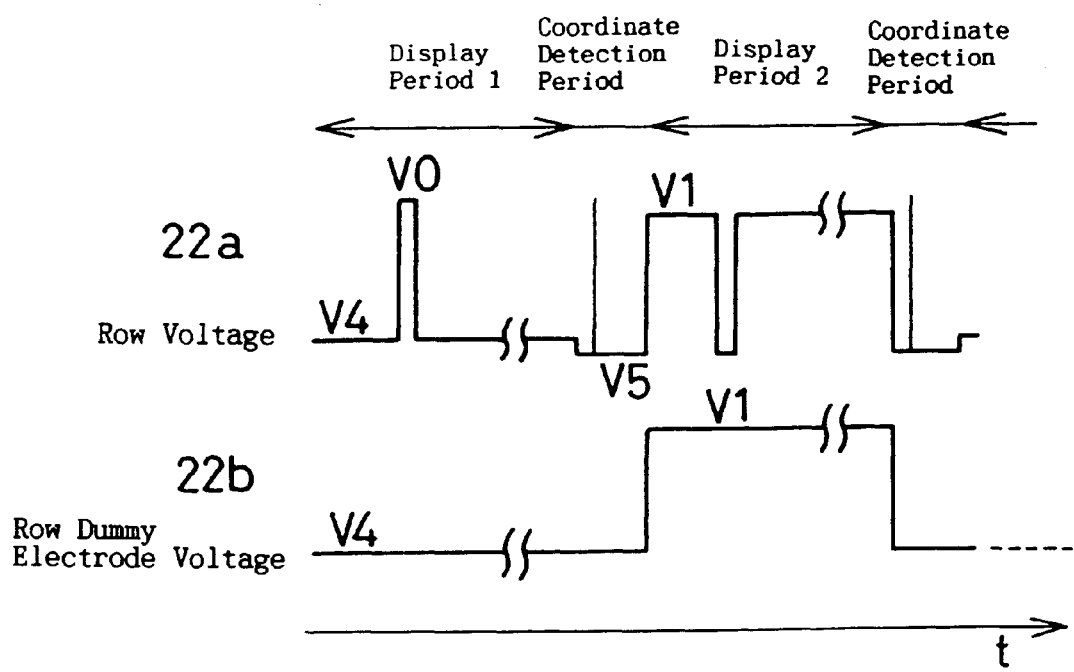
FIG. 25 is a diagram showing voltage applied to row dummy electrodes in dummy electrode treatments of the embodiment.

Liquid panel 11 shown in FIG. 39 has not only column but also row dummy electrodes (not shown in the figure). FIG. 25 shows an example of applying voltage to the row dummy electrodes. In the FIG., $V_1$ and $V_4$ are row non-selective voltages in a period of displaying mode; $V_0$ and $V_5$ are selective voltages; and $V_0>V_1>V_4>V_5$. 22a shows the voltage waveform of a row electrode adjacent to the row dummy electrode, and 22b indicates the voltage waveform of the row dummy electrode. In other words, voltage $V_4$ is applied to the row dummy electrode in display period 1 and the coordinate detection period, and $V_1$ is applied to the electrode in display period 2.

When voltage applied to the row dummy electrode has the above-noted voltage waveforms, it does not include a coordinate detecting pulse. Thus, even if it is attempted to detect a coordinate detecting pulse by the electrostatic capacity coupling between detection electrode 2 and column electrodes 15a–15f or row electrodes 19a–19f, the row dummy electrode does not generate a coordinate detecting pulse at the same timing as the neighboring row electrode does. In addition, it is not found that only the signal intensity in the timing becomes large. As a result, coordinate detection signals detected before and after the timing do not deteriorate when detection electrode 2 is positioned close to the row dummy electrode. Therefore, coordinates in an effective displaying region including the peripheral area of the panel (especially, a section close to the row dummy electrodes) can be precisely detected. As described above, even if voltage as shown in FIG. 25 is applied, liquid crystals between the row dummy electrode and the neighboring row electrode do not respond from off to on, so that display quality cannot be reduced.

EXAMPLE 5
<Panel Structure and Leading Electrode Process>

By changing particularly the structure of a matrix panel itself, detection precision can deteriorate due to electrodes leading to a dummy electrode and a tab. This example is to improve the detection precision.

Figure 26:
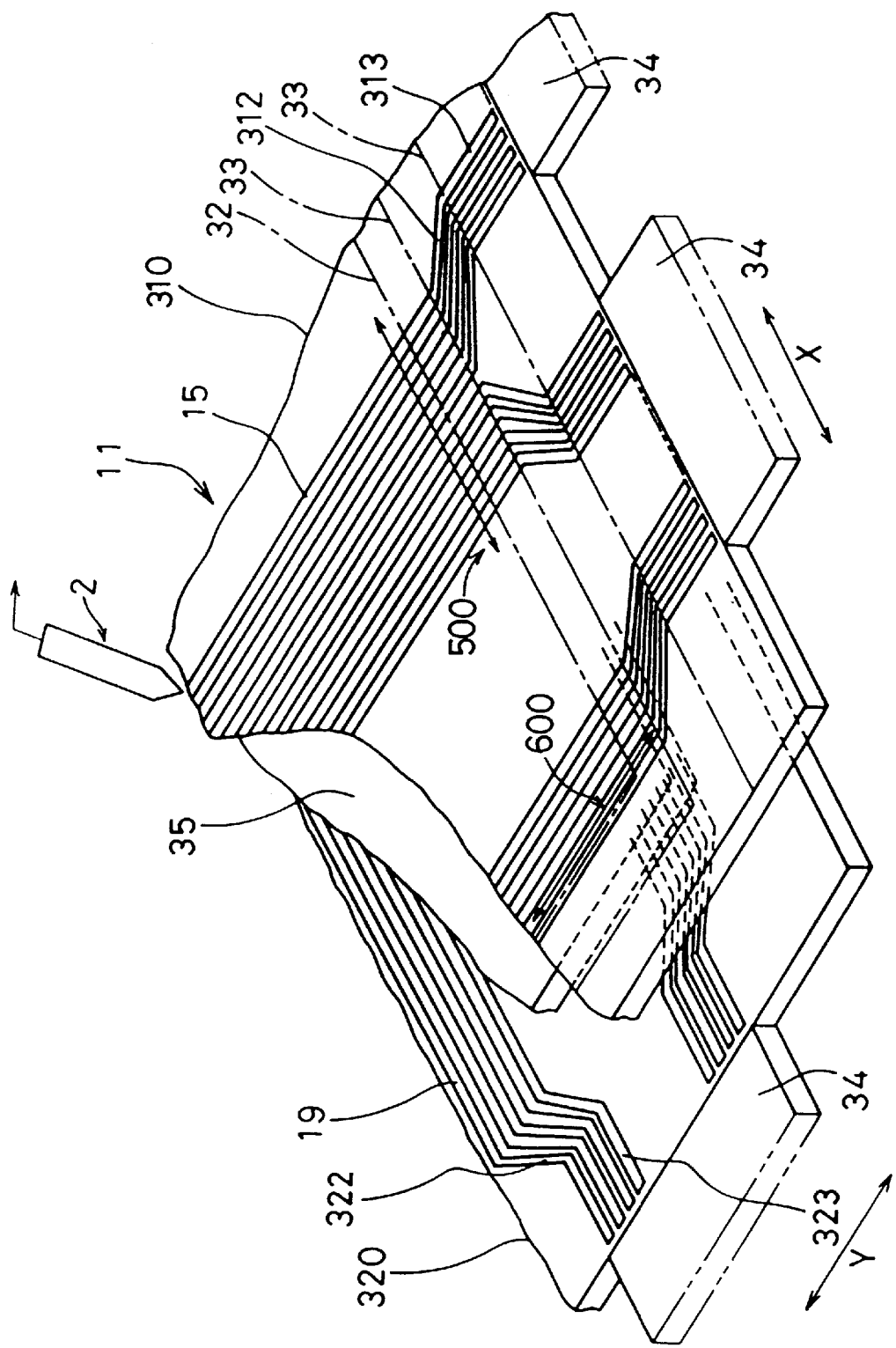
FIG. 26 is a perspective view of a matrix panel of a display-integrated coordinate input device of the fifth embodiment of the invention.

FIG. 26 is a perspective view of the display-integrated coordinate input device of the fifth embodiment of the invention. In the figure, matrix panel 11 is, for instance, a 480×320 dot STN-type liquid crystal panel, and a protective plate is applied to the surface of the panel with approximately a 1 mm gap between the liquid crystal panel and the protective plate (not shown in the figure). Matrix panel 11 includes a first glass substrate 310 on top, a second glass substrate 320 on the bottom, a liquid crystal layer 35 between the first glass substrate 310 and the second glass substrate 320, and sealing resin used for sealing the pheripheral area of first and second glass substrates 310 and 320. Sealed sections are indicated by a dotted line 33. On first glass substrate 310, column electrodes 15, $X_1$, $X_2$, . . . $X_n$, are formed at a first predetermined pitch in a first predetermined direction. On the other hand, row electrodes 19, $Y_1$, $Y_2$, . . . $Y_n$, are formed on second glass substrate 320 at a second predetermined pitch (generally, the same as the first predetermined pitch) in a second fixed direction, at a right angle to the first predetermined direction.

A section where column electrodes 15 and row electrodes 19 are indirectly laminated to each other is a display area 32, and the section not including the area is a non-display area. One tab 34 is applied to a predetermined number of column electrodes 15 at edges which are at right angles to the first predetermined direction of first substrate 310. As a whole, a plurality of tabs 34 are arranged in the first predetermined direction. Tabs 34 are to connect row electrode drive circuit 13 shown in FIG. 1 and column electrodes 15. The pitch of connecting terminals or the like on tabs 34 is narrower than the first pitch of column electrodes 15. Thus, in the non-display area on first glass substrate 310, parallel connecting electrodes 313 having a pitch the same as the pitch of the connecting terminals or the like of tabs 34, and non-parallel (inclined) leading electrodes 312 or the like connecting column electrodes 15 to connecting electrodes 313 are formed so as to connect each column electrode 15 to the connecting terminal or the like of tabs 34. Similarly, at edges which are at right angles to the second predetermined direction of second glass substrate 320, one tab 34 is applied to a predetermined number of row electrodes 19. As a whole, a plurality of tabs 34 is arranged in the second predetermined direction. These tabs 34 are to connect row electrode driving circuit 12 shown in FIG. 1 and row electrodes 19. The pitch of connecting terminals or the like on tabs 34 is different from the second pitch of row electrodes 19. Thus, in the non-display area on second glass substrate 320, parallel connecting electrodes 323 having a pitch the same as the pitch of the connecting terminals or the like of tabs 34, and non-parallel (inclined) leading electrodes 322 or the like connecting row electrodes 19 to connecting electrodes 323 are formed so as to connect each row electrode 19 to the connecting terminal or the like of tabs 34. While maintaining the pitch in display area 32, row electrodes 19 and column electrodes 15 are led near sealing section 33 in the non-display area with no bending points. The row and column electrodes are connected to leading electrodes 312 and 322 at the bottom of sealing section 33. In consideration of restriction by the surface area of first and second glass substrates 310 and 320, adjustability with the pitches of tabs 34 and the like, it is not necessary to form a triangular dummy electrode around the neighboring section of two tabs 34 on glass substrates 310 and 320. The operations of the display-integrated coordinate input device of this example are fundamentally the same as the conventional display-integrated coordinate input devices.

Figure 27:
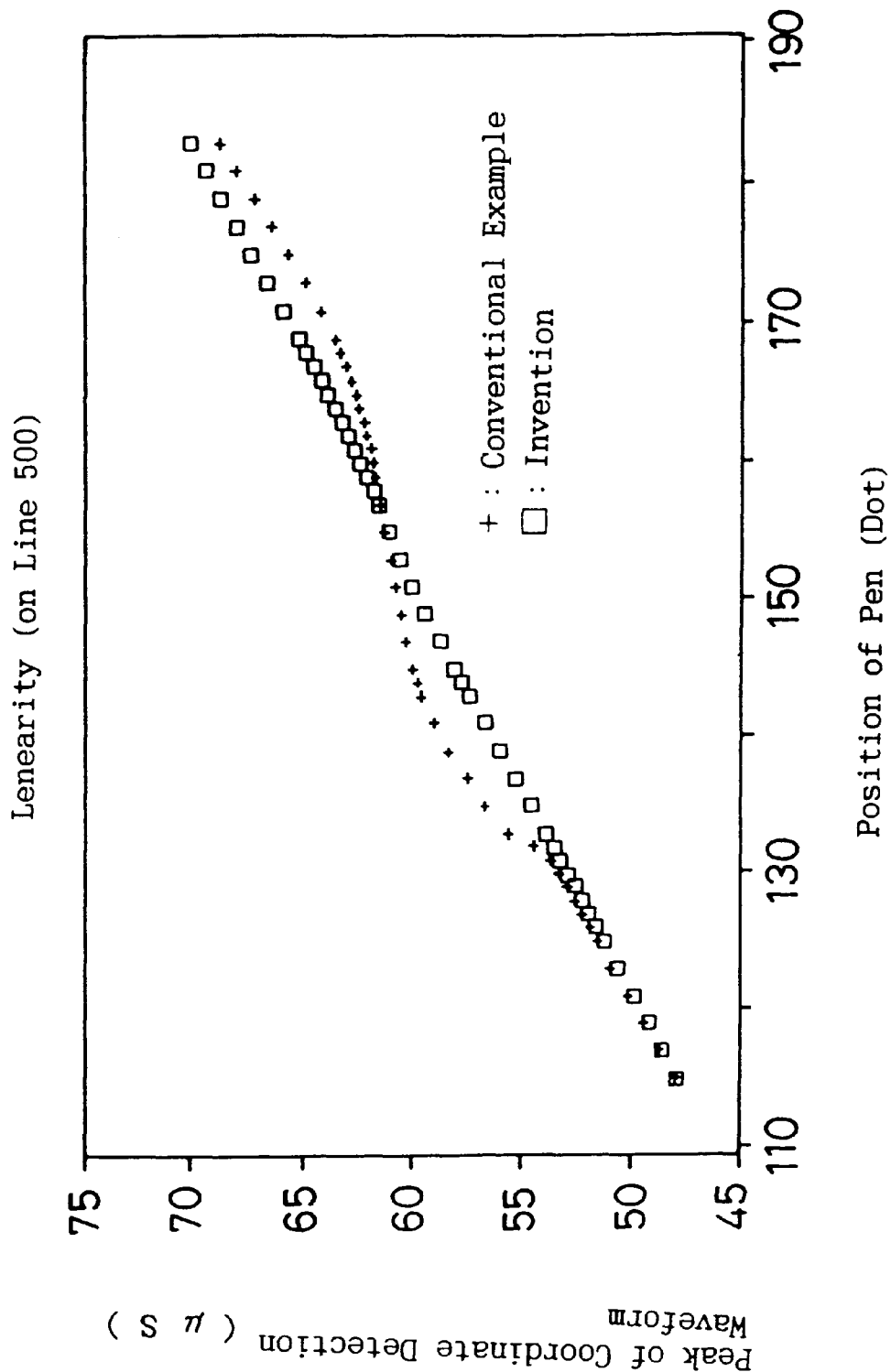
FIG. 27 is a graph comparing the linearity characteristics at the edges of the matrix panel of the embodiment with conventional linearity characteristics.

The characteristics of the display-integrated coordinate input device of this example are explained by referring to FIGS. 26 and 27. Suppose a row electrode direction is Y and a column electrode direction is X. When detection electrode 2 is pointed at the center of liquid crystal panel 11 which is a matrix panel in FIG. 26, it is possible to detect X and Y coordinates with about 1 dot precision, as indicated in the conventional examples.

When detection electrode 2 is shifted near the leading electrodes (in other words, edges of liquid crystal panel 11), detection coordinates become as follows.

For example, the peaks of coordinate detection waveform of detection signals of column electrodes 15 in the X direction were tested, when detection electrode 2 was shifted in an X direction on line 500 of liquid crystal panel 11 shown in FIG. 26. The results of the example and the conventional example are compared in FIG., 27. In the figure, if the frequency of coordinate detection signals is, for example, 3 MHz, the conventional display-integrated coordinate input device shows deteriorated linearity in the X direction at the equivalence of about 8 dots due to the effects of dummy electrodes, leading electrodes and the like. On the contrary, the display-integrated coordinate input device of this example maintains the linearity of a pen position and a detection position at a precision of 1 dot or below. Based on the above-noted results, the display-integrated coordinate input device of the example can accomplish preferable coordinate detection precision not only in the center but also at the edges of the matrix panel. Thus, the device is especially useful for the reading of coordinates around edges such as when Windows is used.

Thus, in this example, column electrodes 19 and row electrodes 15 are led near sealing section 33 by leading electrodes 322 and 312 respectively while keeping the pitches of the column and row electrodes in display area 32 with no bending points. Therefore, no triangular dummy electrodes are required in the structure, and the electrodes can be led straight. In other words, the problem that coordinate detection precision decreases depending on the shape of electrodes is solved, and a display-integrated coordinate input device having preferable coordinate detection precision over the entire panel can be provided.

EXAMPLE 6

Similar to Example 5, this example is to improve detection precision—which deteriorates due to dummy electrodes and electrodes leading to tabs—by changing the structure of a matrix panel itself.

Figure 28:
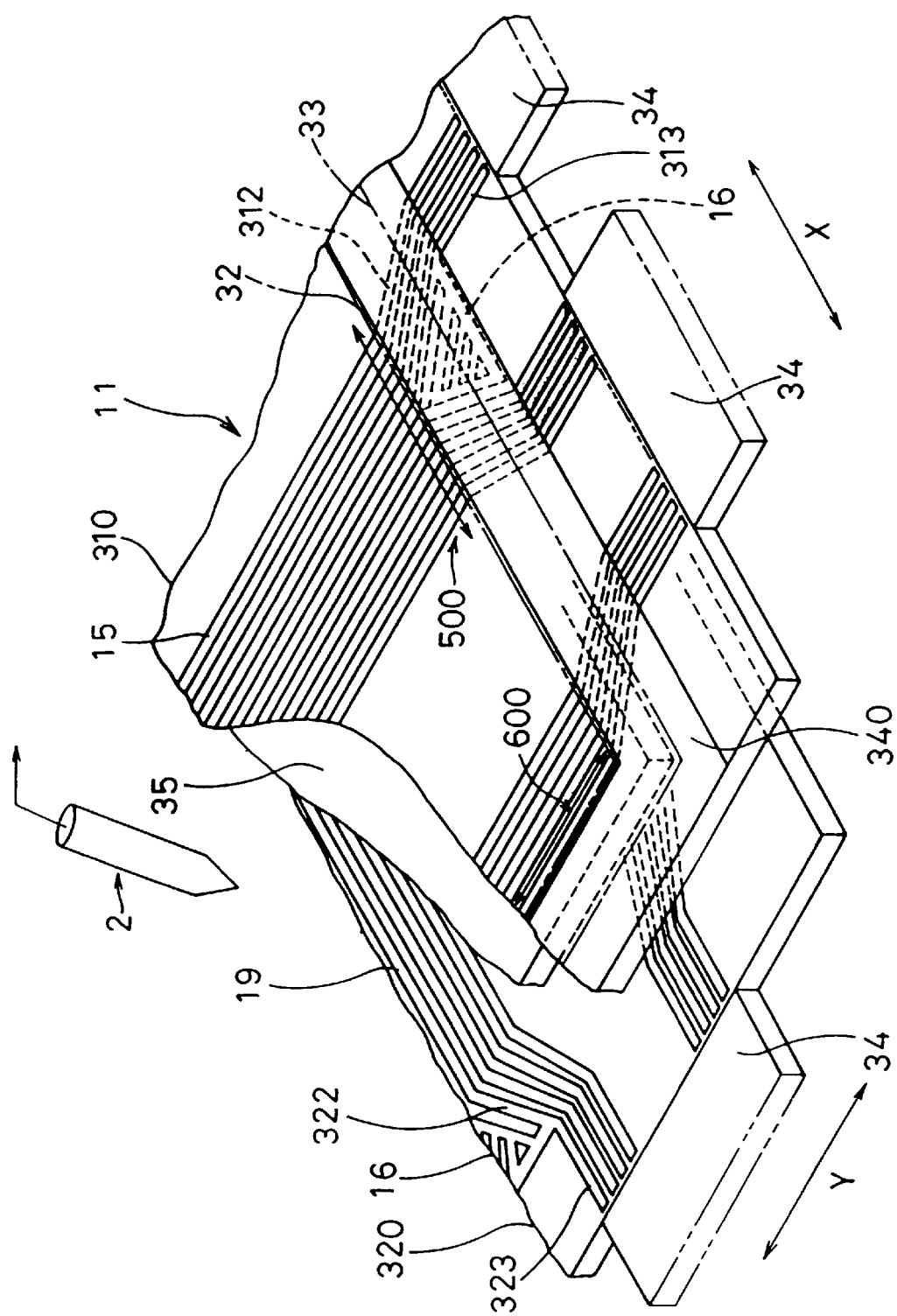
FIG. 28 is a perspective view of a display-integrated coordinate input device of the sixth embodiment of the invention.

FIG. 28 is a perspective view of the display-integrated coordinate input device of of the sixth embodiment of the invention. In the figure, matrix panel 11 is, for instance, a 480×320 dot STN-type liquid crystal panel, and a protective plate is applied to the surface of the panel with approximately a 1 mm gap between the liquid crystal panel and the protective panel (not shown in the figure). Matrix panel 11 includes a first glass substrate 310 on top, a second glass substrate 320 on the bottom, a liquid crystal layer 35 between first glass substrate 310 and second glass substrate 320, and sealing resin used for sealing the pheripheral area of first and second glass substrates 310 and 320. (The sealing section is indicated as numeral 33.) On first glass substrate 310, column electrodes 15, $X_1$, $X_2$, ... $X_n$, are formed at a first predetermined pitch in a first predetermined direction. On the other hand, row electrodes 19, $Y_1$, $Y_2$, ... $Y_n$, are formed on second glass substrate 320 at a second predetermined pitch (generally, the same as the first predetermined pitch) in a second fixed direction, at right angles to the first predetermined direction.

A section where column electrodes 15 and row electrodes 19 are indirectly laminated to each other is a display area 32, and the section not including the area is a non-display area. One tab 34 is applied to a predetermined number of column electrodes 14 at edges which are at right angles to the first predetermined direction of first substrate 310. As a whole, a plurality of tabs 34 are arranged in the first predetermined direction. Tabs 34 are to connect the row electrode drive circuit 13 (shown in FIG. 1) and row electrodes 15. The pitch of connecting terminals or the like on tabs 34 is narrower than the first pitch of column electrodes 15. Thus, in the non-display area on first glass substrate 310, parallel connecting electrodes 313 having a pitch the same as the pitch of the connecting terminals or the like of tabs 34, and nonparallel (inclined) leading electrodes 312 or the like connecting column electrodes 15 to connecting electrodes 313 are formed so as to connect each column electrode 15 to the connecting terminal or the like of tabs 34. Similarly, at edges which are at right angles to the second predetermined direction of second glass substrate 320, one tab 34 is applied to a predetermined number of row electrodes 19. As a whole, a plurality of tabs 34 is arranged in the second predetermined direction. These tabs 34 are to connect row electrode driving circuit 12 shown in FIG. 1 and row electrodes 19. The pitch of connecting terminals or the like on tabs 34 is different from the second pitch of row electrodes 19. Thus, in the non-display area on second glass substrate 320, parallel connecting electrodes 323, having a pitch the same as the pitch of the connecting terminals or the like of tabs 34, and non-parallel (inclined) leading electrodes 322 or the like connecting row electrodes 19 to connecting electrodes 323, are formed so as to connect each row electrode 19 to the connection terminal or the like of tabs 34. Triangular dummy electrodes 16, the same as in the conventional examples, are formed around the sections between two tabs 34 on glass substrates 310 and 320. The shape of each electrode on the glass substrates is almost the same as the one in the conventional example shown in FIG. 39. Also, in order to protect matrix panel 11, a transparent protective plate 340 is formed on the non-display area with a gap of about 1 mm. The protective plate is prepared by coating conductive resin on the non-display area of matrix panel 11 as a shield, and is connected to a ground terminal (not shown in the figure). The operations of the display-integrated coordinate input device of the example are basically the same as the conventional devices.

Figure 29:
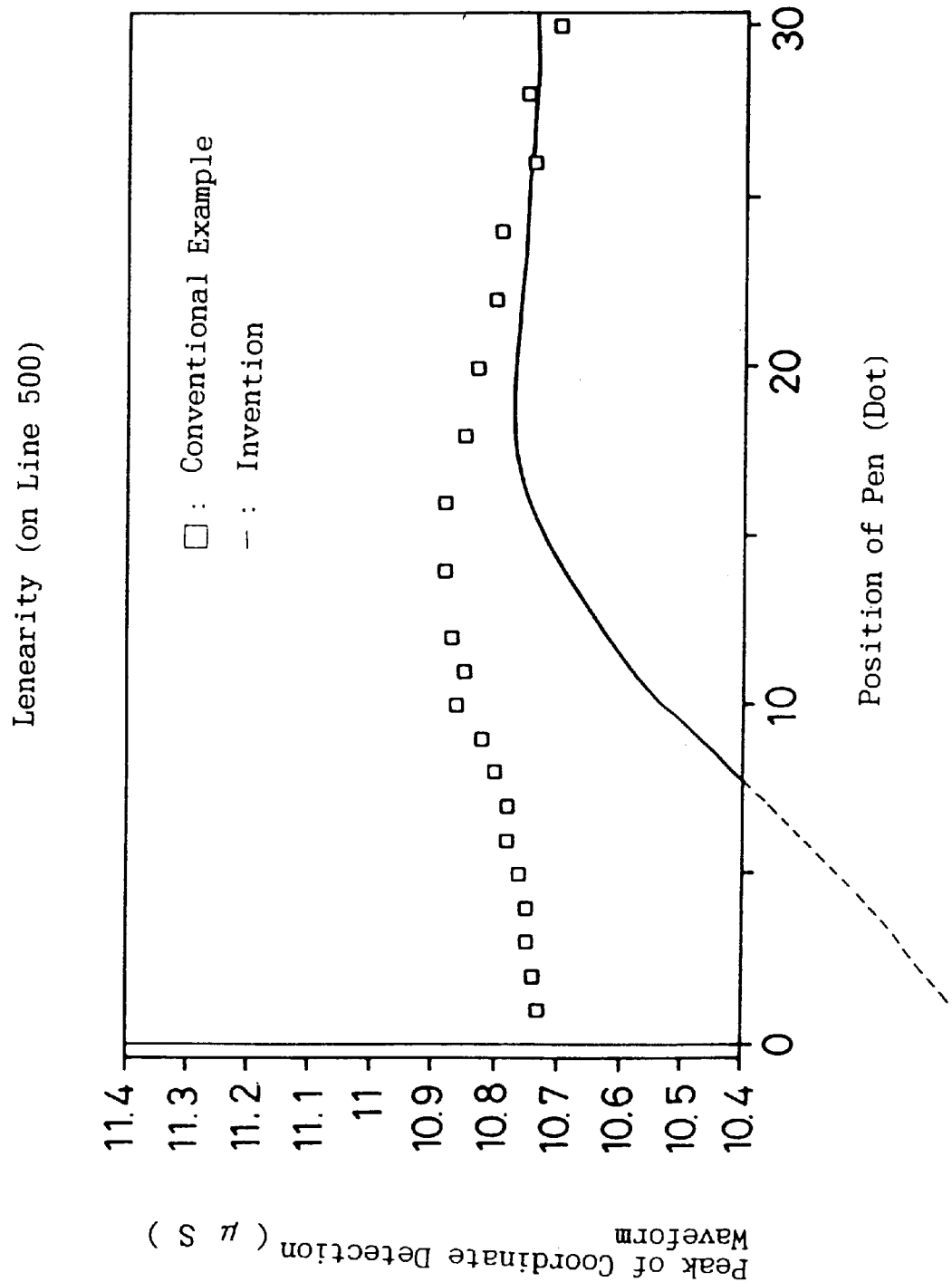
FIG. 29 is a graph comparing the linearity characteristics at the edges of the matrix panel of the embodiment with conventional linearity characteristics.

The characteristics of the display-integrated coordinate input device of this example are explained by reffering to FIGS. 27, 28 and 29. Suppose a row electrode direction is Y and a column electrode direction is X. When detection electrode 2 is pointed at the center of liquid crystal panel 11 which is a matrix panel in FIG. 28, it is possible to detect X and Y coordinates with about 1 dot precision, as indicated in the conventional examples. When detection electrode 2 is shifted near leading electrode 312 shown in FIG. 28 (in other words, near an edge of matrix panel 11), detection coordinates become as follows. For example, the peaks of coordinate detection waveform in the X direction were tested when detection electrode 2 was shifted in a Y direction on line 600 of matrix panel 11 shown in FIG. 28, and the results of the example and the conventional example are compared in FIG. 29. In the figure, if the frequency of coordinate detection signals is, for example, 3 MHz, the conventional display-integrated coordinate input device shows deteriorated linearity in the X direction at a maximum of 3.6 dots, as the electrode becomes close to leading electrodes 312. Also, the linearity varies depending on the shape of electrodes on line 600. On the contrary, the display-integrated coordinate input device of this example with the shield maintains the linearity of a pen position and a detection position at a precision of 1 dot or below as shown in FIG. 29. Similarly, results the same as those shown in FIG. 27 were obtained for coordinate detection values when detection electrode 2 was shifted to an X direction on line 500 of matrix panel 11 shown in FIG. 28.

Thus, in this example, leading electrodes 312 and 322 in the non-display area are electrically shielded from detection electrode 2 by the conductive film, so that the coordinate detecting pulse at dummy electrodes 16 and leading electrodes 312 and 322 is not detected by detection electrode 2 even when the electrode patterns of matrix panel 11 are almost the same as conventional devices. As a result, the deterioration of coordinate detection precision is prevented, and a display-integrated coordinate input device having preferable coordinate detection precision over the entire panel is provided.

Thus, the device is especially useful for the reading of coordinates around edges such as when Windows is used.

In Examples 5 and 6, a STN-type liquid crystal panel is used as the matrix panel. However, the invention is not limited to this panel. Besides a STN-type matrix panel, other matrix panels such as EL panels and plasma display panels can also be used.

EXAMPLE 7

This example explains the driving method of scanning pulse used particularly for a coordinate detection period and the structure for achieving the method.

Figure 30:
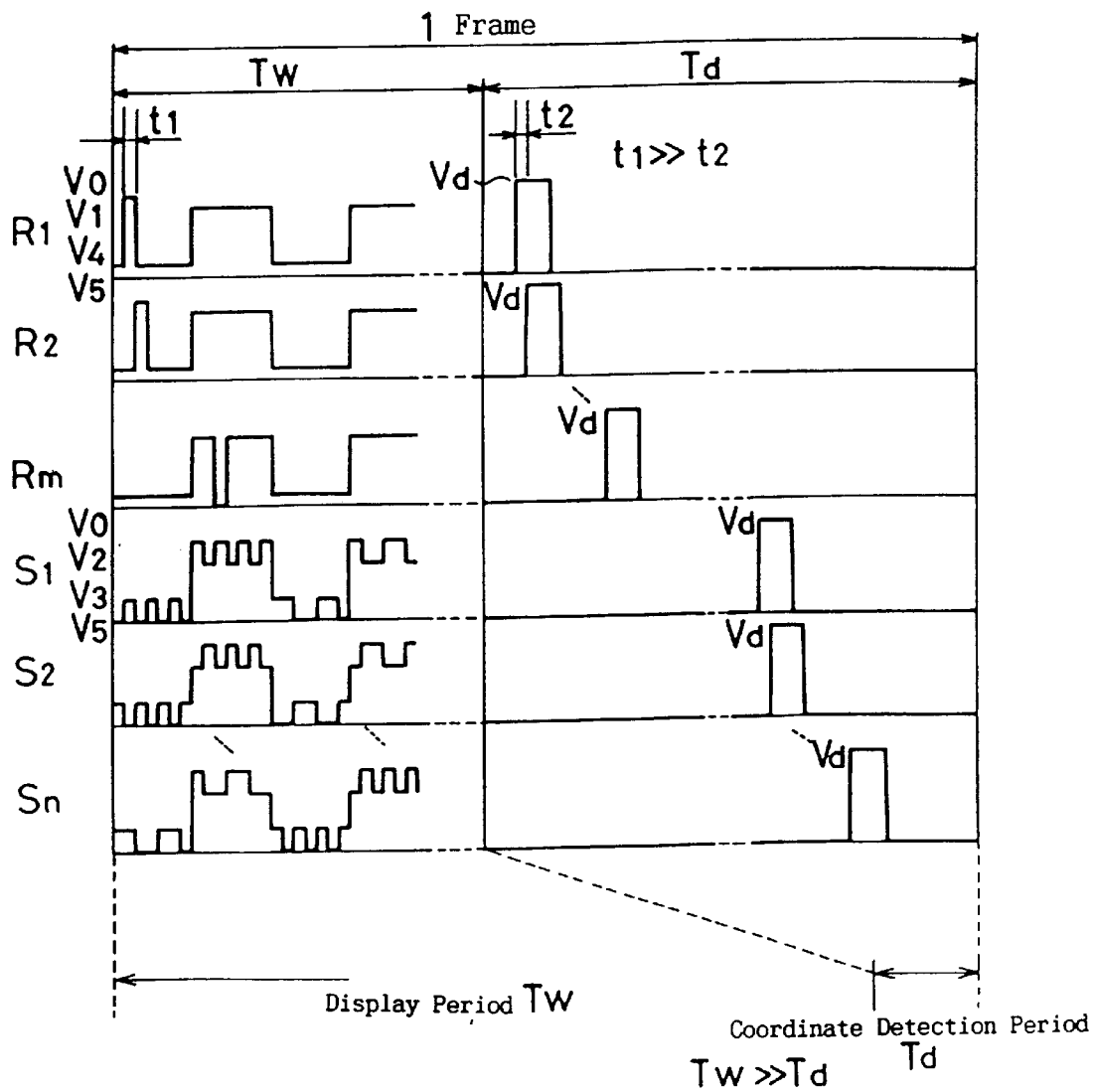
FIG. 30 is a diagram showing voltage waveforms applied to electrodes of the matrix panel of a display-integrated coordinate input device of the seventh embodiment of the invention.

FIG. 30 shows voltage waveforms applied to the electrodes of the matrix panel of Example 7 of the display-integrated coordinate input device of the invention.

In the figure, $T_w$ is a display period; $T_d$ is a detection period; and $T_w >> T_d$. $t_1$ is a scanning period of one line in display period $T_w$; $t_2$ is a scanning period of one line in detection period $T_d$; and $t_1 >> t_2$. $R_1$, $R_2$ and $R_m$ show the waveforms applied to row electrodes while $S_1$, $S_2$ and $S_n$ indicate the waveforms applied to column electrodes.

In display period $T_w$, voltage at the level of $V_0$ or $V_5$ is applied to the row electrodes during the period of selection. During the period of non-selection, voltage at the level of $V_1$ or $V_4$ is applied. For instance, when the display is ON, voltage at the level of $V_0$ or $V_5$ is applied to the column electrodes. When the display is OFF, voltage at the level of $V_2$ or $V_3$ is applied.

On the other hand, in detection period $T_d$, a scanning pulse for detection is continuously applied to row and column electrodes. As the scanning pulse for detection, $V_d$ in the selection period and $V_5$ in the non-selection period are applied so as to make the amplitude constant without regard to the driving conditions of display.

Figure 31:
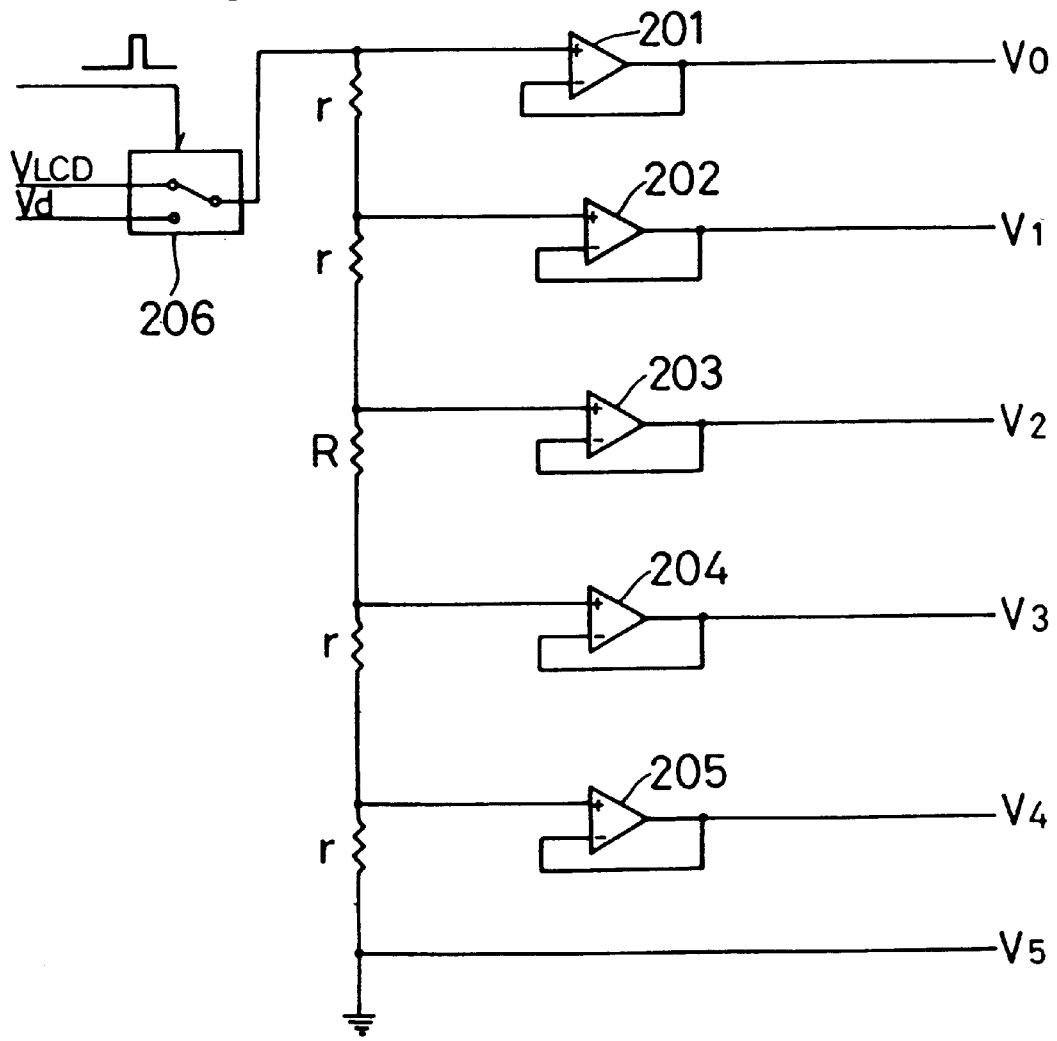
FIG. 31 is a diagram showing one example of a liquid crystal drive power circuit of the seventh embodiment.

FIG. 31 shows an example of a liquid crystal drive power circuit of the display-integrated coordinate input device of the invention. As shown in the figure, the circuit includes resistances r and R, dividing liquid crystal drive voltage for display ($V_{LCD}$) into voltages used for driving liquid crystals—$V_0$, $V_1$, $V_2$, $V_3$, $V_4$ and $V_5$, and operation amplifiers 201, 202, 203, 204 and 205. When the driving conditions of the liquid crystal display change due to a change in temperature or the like, liquid crystal drive voltage for display ($V_{LCD}$) is changed, so that display can be maintained by varying voltage $V_0$–$V_5$. A switching circuit 206 is applied to the liquid crystal drive power circuit, and the output of switching circuit 206 is connected to $V_0$ of the liquid crystal drive power circuit. Due to switching signals, the output voltage from switching circuit 206 in display period $T_w$ and detecting period $T_d$ can be switched to $V_{LCD}$ or liquid crystal drive voltage for detection. Thus, a preferable display can be obtained by applying driving pulse for display when $V_{LCD}$ is changed in response to the drive conditions of the matrix panel in display period $T_w$; voltage $V_d$ having a fixed amplitude can be always applied as scanning pulse for detection. As a result, stable detection can be carried out without influencing the intensity of detection signals during a change in driving conditions for display.

Figure 32:
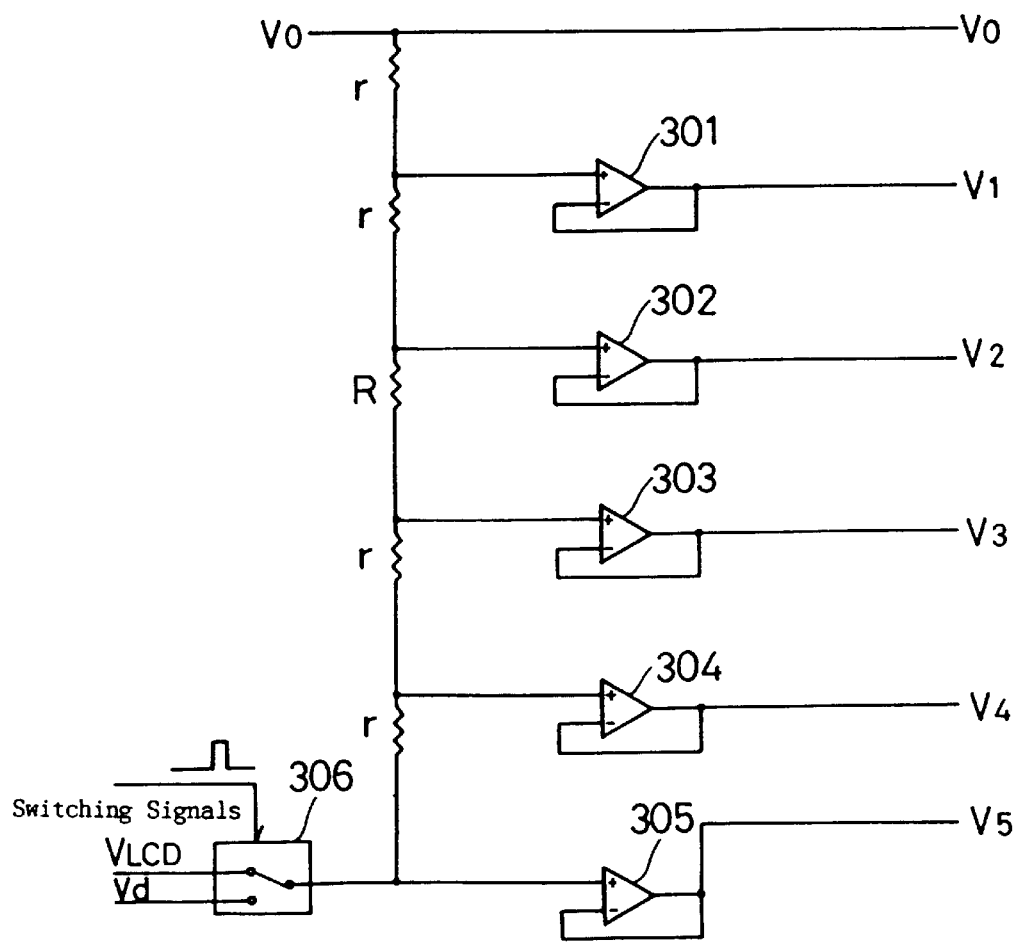
FIG. 32 is a diagram showing another example of a liquid crystal drive power circuit of the seventh embodiment.

Even though the output voltage of the liquid crystal drive circuit was 0 volts or above in this example, some drive circuits output not only the voltage of positive polarity but of negative polarity. FIG. 32 shows another example of a liquid crystal drive power circuit of the display-integrated coordinate input device of the example. In the figure, r and R are resistances; 301, 302, 303, 304 and 305 are operating amplifiers; 306 is a switching circuit; $V_{LCD}$ is liquid crystal drive voltage for display; and $V_d$ is liquid crystal drive voltage for detection. Since the driving voltage is changed by varying the voltage of the negative polarity, the output of switching circuit 306 is connected to $V_5$ of the liquid crystal drive circuit.

Figure 33:
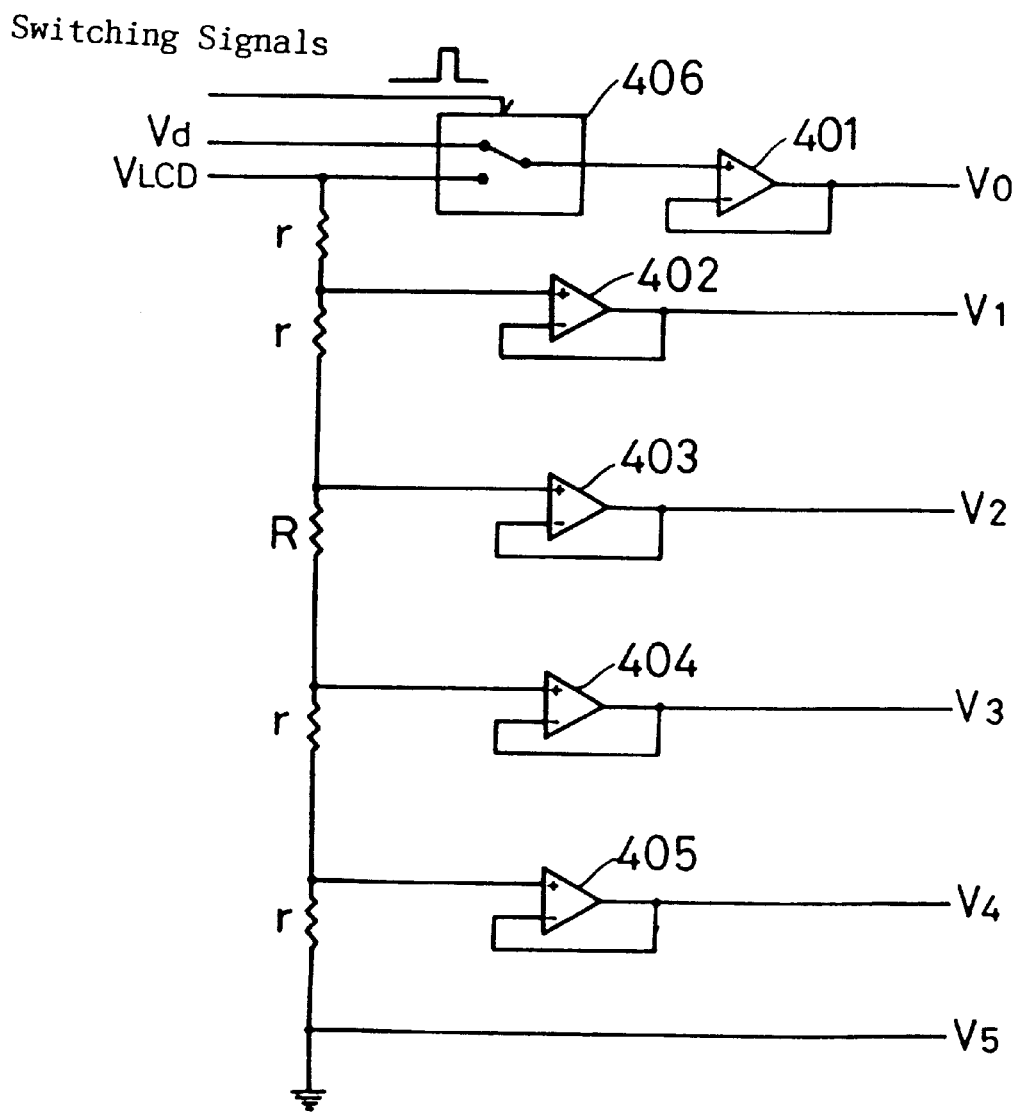
FIG. 33 is a diagram showing another example of a liquid crystal drive power circuit of the seventh embodiment.

Furthermore, FIG. 33 shows another example of a liquid crystal drive power circuit of the display-integrated coordinate input device of the example. In the figure, r and R are resistances; 401, 402, 403, 404 and 405 are operating amplifiers; 406 is a switching circuit; $V_{LCD}$ is liquid crystal drive voltage for display; and $V_d$ is liquid crystal drive voltage for detection. Switching circuit 406 is applied between $V_{LCD}$ and operating amplifier 401. By switching signals, only the input voltage to liquid crystal drive circuit $V_0$ can be switched to liquid crystal drive voltage for detection $V_d$. As a result, the same effects as mentioned above can be obtained.

In the liquid crystal drive circuit, the conditions of $V_0 > V_1$, $V_2 > V_3$ and $V_4 > V_5$ are generally set for the level of liquid crystal drive voltage for input. In this case, it is necessary to satisfy $V_d > V_1$, $V_2$, $V_3$, $V_4$ and $V_5$. Therefore, if $V_d$ is set so as to keep $V_{LCD}$ above the obtainable maximum value, these conditions can be satisfied.

Figure 34:
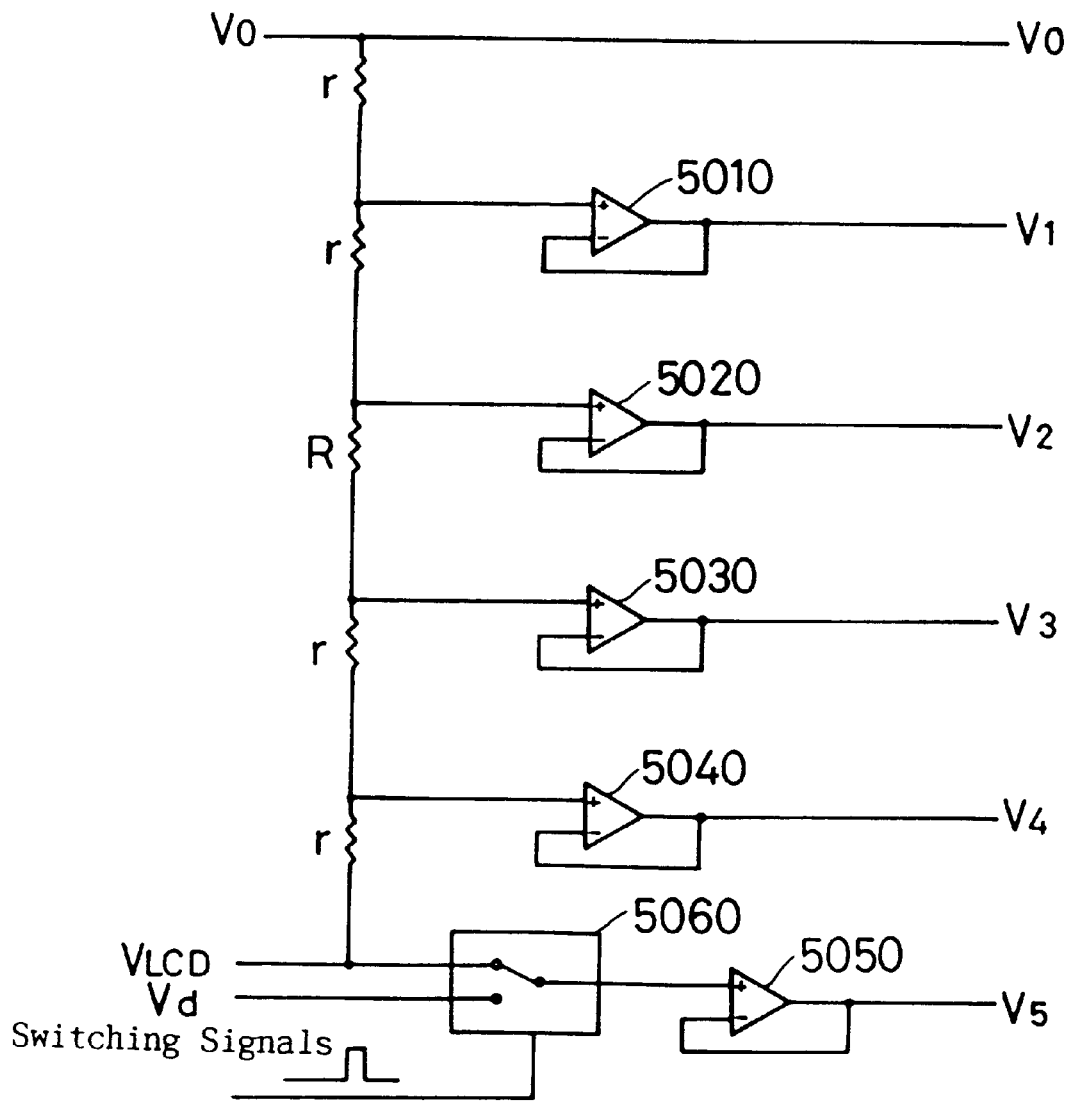
FIG. 34 is a diagram showing another example of a liquid crystal drive power circuit of the seventh embodiment.

The same explanation mentioned above can be applied to a liquid crystal drive circuit having an output of negative polarity. FIG. 34 shows another example of a liquid crystal drive power circuit of the display-integrated coordinate input device of the example. In this figure, r and R are resistances; 5010, 5020, 5030, 5040 and 5050 are operating amplifiers; 5060 is a switching circuit; $V_{LCD}$ is liquid crystal drive voltage for display; and $V_d$ is liquid crystal drive voltage for detection. Since the driving voltage is changed by varying the voltage of negative polarity, $V_{LCD}$ is connected to $V_5$ of the liquid crystal drive circuit. Also, switching circuit 5060 is disposed between $V_{LCD}$ and operating amplifier 5050. By switching signals, only the output voltage to $V_5$ of the liquid crystal drive circuit can be switched to liquid crystal drive voltage for detection. As a result, the same effects can be obtained.

It is necessary to set $V_d$ to satisfy $V_d < V_4$, $V_3$, $V_2$, $V_1$ and $V_0$. This condition can be satisfied if $V_d$ is set so as to keep $V_{LCD}$ below its obtainable minimum value.

EXAMPLE 8

An example of applying a liquid crystal drive power circuit which has the above-noted switching circuit inside a row electrode driving circuit and a column electrode driving circuit is explained below.

Figure 36:
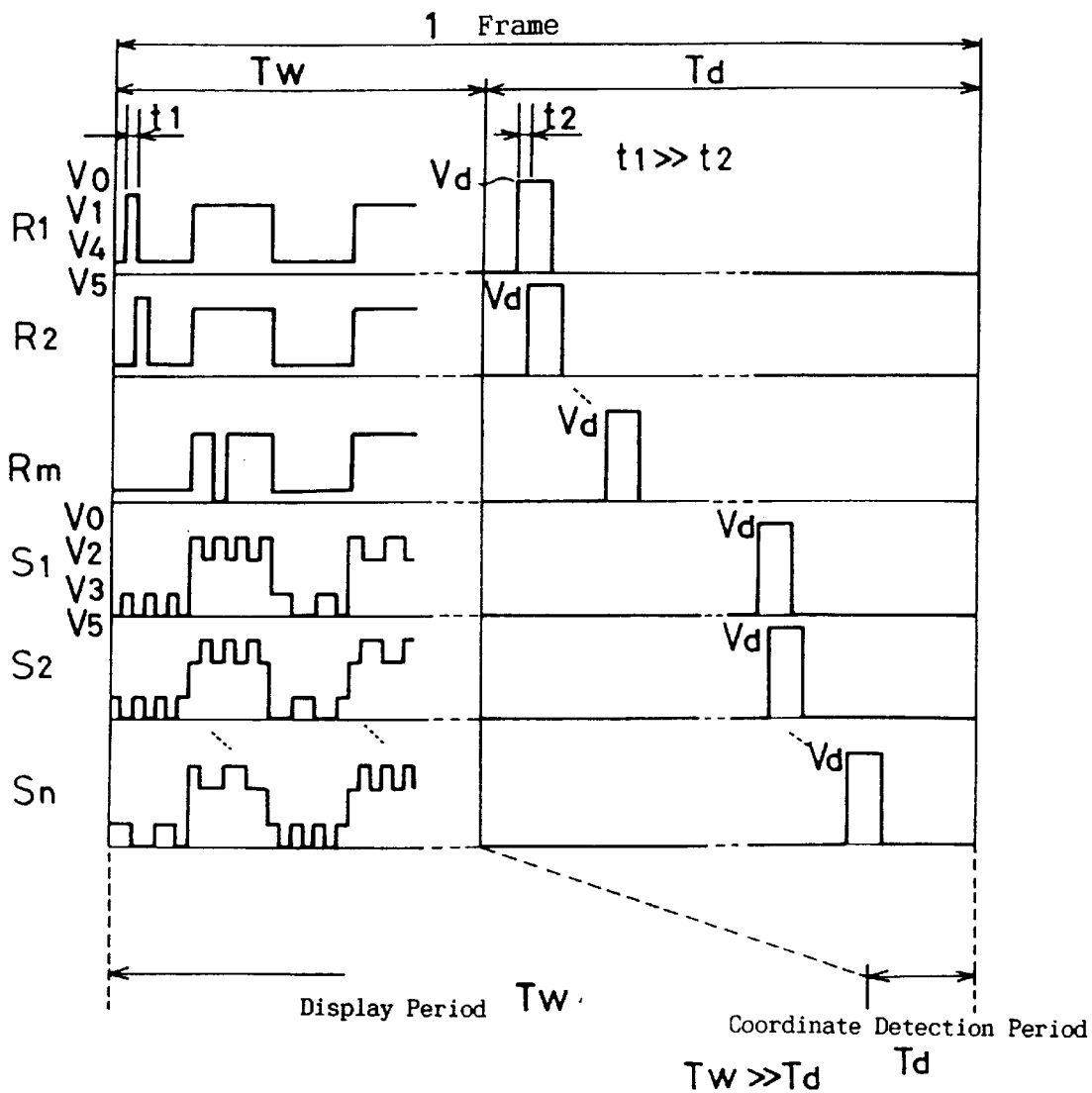
FIG. 36 is a diagram showing voltage applied to electrodes of the matrix panel of the embodiment.
Figure 37:
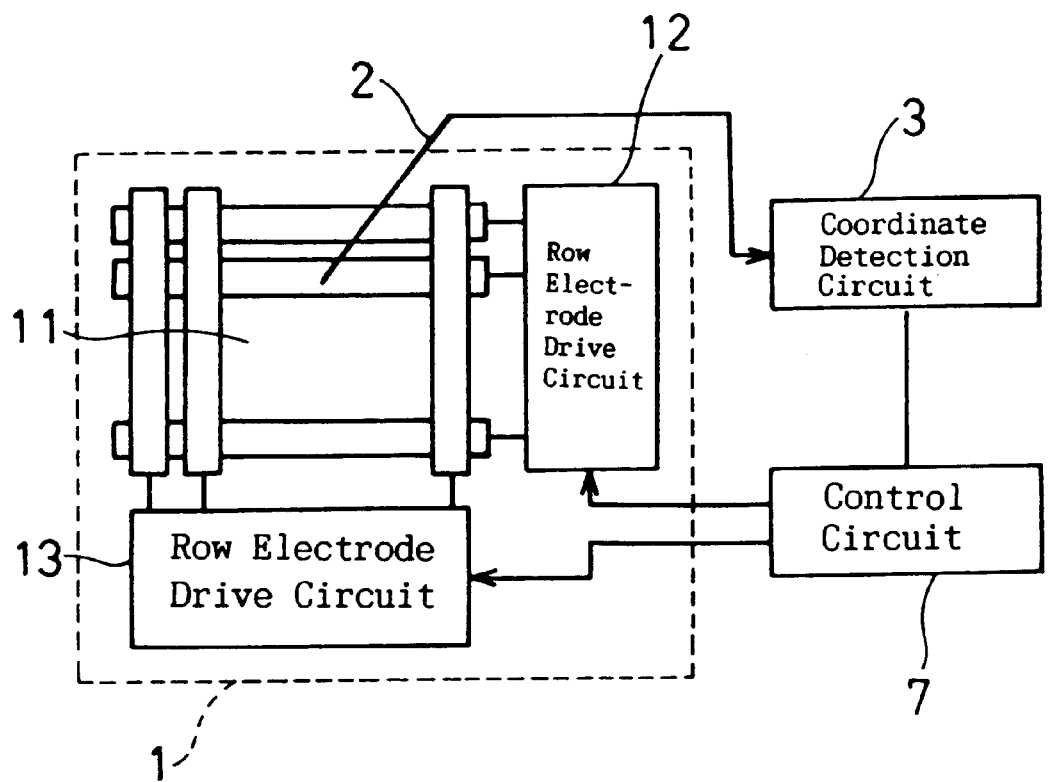
FIG. 37 is a schematic view of a conventional display-integrated coordinate input device.
Figure 38:
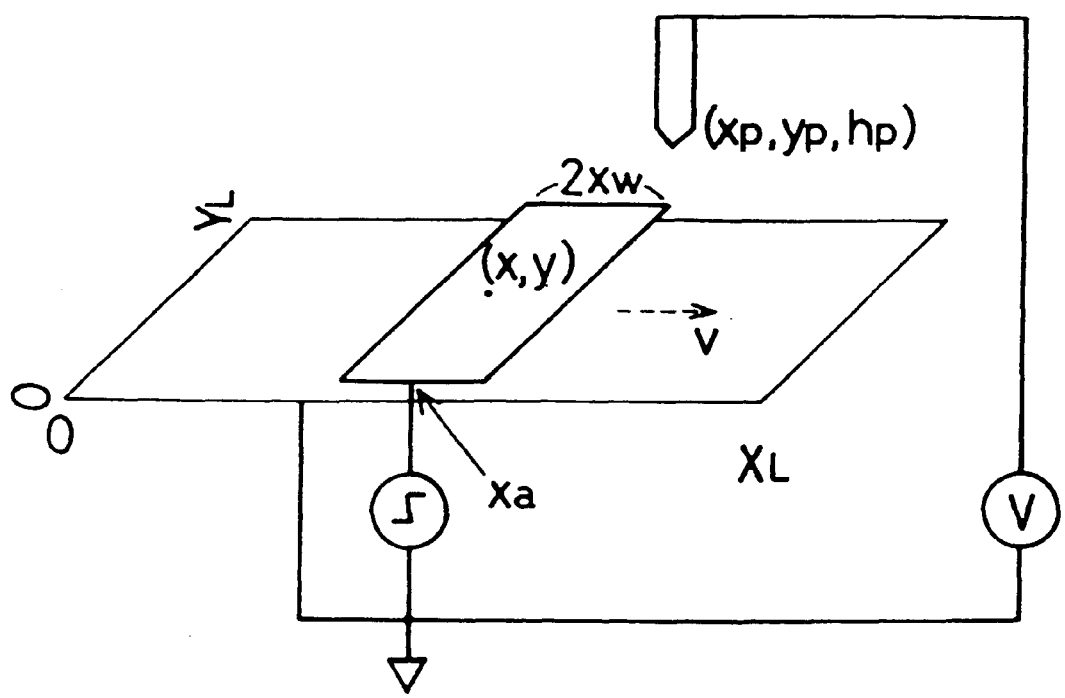
FIG. 38 is a diagram showing the principles of the conventional display-integrated coordinate input device.

FIG. 36 shows voltage waveforms applied to the electrodes of the matrix panel of Example 8 of the display-integrated coordinate input device of the invention.

In the figure, $T_w$ is a display period; $T_d$ is a detection period; and $T_w \gg T_d$. In FIG. 36, t1 is a scanning period of one line in display period $T_w$; $t_2$ is a scanning period of one line in detecting period $T_d$; and $t_1 \gg t_2$. $R_1$, $R_2$ and Rm show the waveforms applied to row electrodes while $S_1$, $S_2$ and $S_n$ indicate the wave forms applied to column electrodes.

In display period $T_w$, voltage at the level of $V_0$ or $V_5$ is applied to the row electrodes during the period of selection. During the period of non-selection, voltage at the level of $V_1$ or $V_4$ is applied. For instance, when the display is on, voltage at the level of $V_0$ or $V_5$ is applied to the column electrodes. When the display is off, voltage at the level of $V_2$ or $V_3$ is applied. Therefore, since the amplitudes of scanning pulse for detection during the detection period can be independently set, the intensity of signals detected by the detection electrode can be always set at a constant level.

Figure 35:
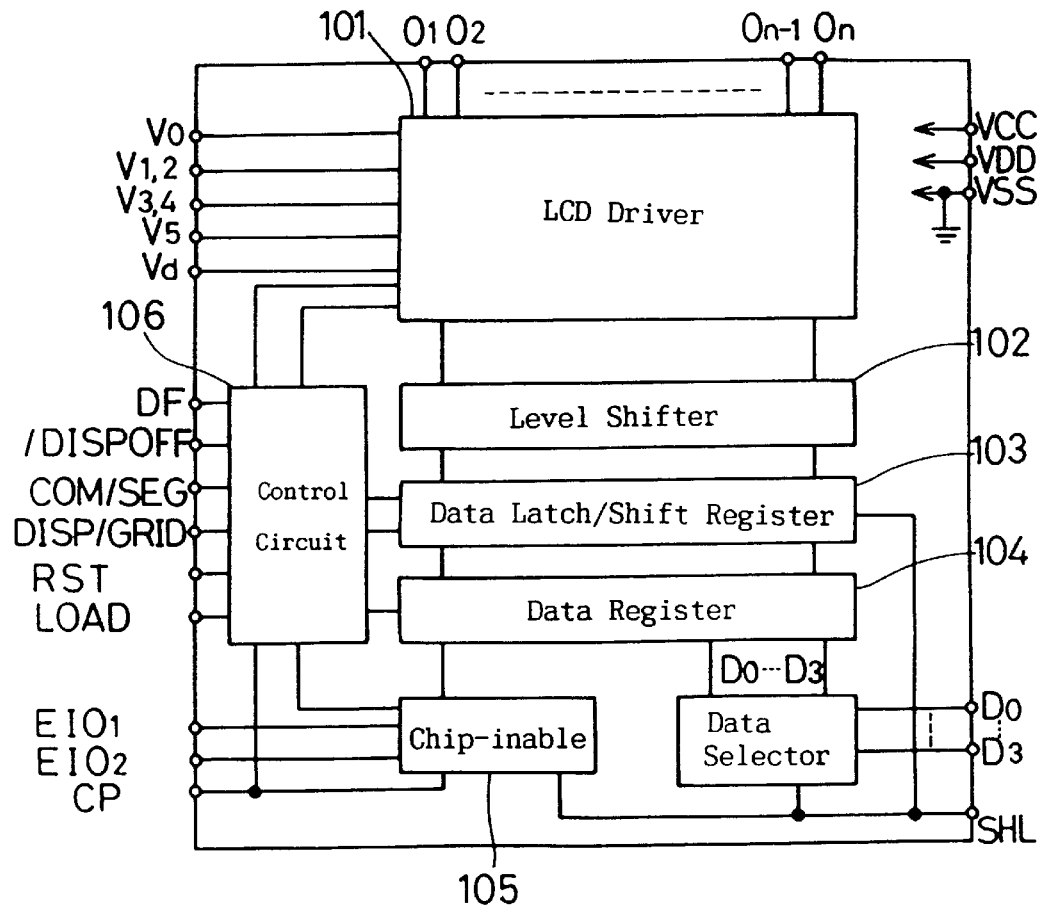
FIG. 35 is a diagram showing a drive circuit of the drive device of a display-integrated coordinate input device of the eighth embodiment of the invention.

FIG. 35 shows the driving circuit of the driving device of Example 8. The driving circuit in FIG. 35 can be used for both row and column electrodes. In the figure, 101 is a LCD driver; 102 is a level shifter so as to control the level of logical values; 103 is a data latch/shift register: 104 is a data register; 105 is a chip-inable; and 106 is a controlling circuit. Also, $V_0$, $V_{1,2}$, $V_{3,4}$ and $V_5$ are input terminals of liquid crystal drive voltage. When the circuit is used as a row electrode drive circuit, voltage at level $V_1$ is input to $V_{1,2}$ and voltage at level $V_4$ is input to $V_{3,4}$. Voltage at level $V_2$ is input to $V_{1,2}$ and voltage at level $V_3$ is input to $V_{3,4}$, when the circuit is used as a column electrode driving circuit. $O_1$–$O_n$ are output terminals; DF is an input terminal of a signal for alternating current; /DISPOFF is a disable terminal for driver output; COM/SEG is an input terminal of a conversion signal for driving row and column electrodes; DISP/GRID is an input terminal of a conversion signal for display and detection; RST is an input terminal of a clear signal for the data latch circuit; LOAD is an input terminal of a latch or shift pulse of the data latch/shift register circuit;

CP is a shift lock input terminal of data register 10; D₀–D₃ are display data input terminals; SHL is a control signal input terminal in the direction of data shift; VCC is a power input terminal for a high-pressure resisting logic circuit: VDD is a power input terminal for a 5 V-base logic circuit; and VSS is a ground level terminal. When the circuit is used as a column electrode driving circuit, EIO₁ and EIO₂ operate as the chip-inable input terminals of cascade connection and the input-output terminals of coordinate detection pulse during a detection period. They also function as shift data input-output terminals when the circuit is used as a row electrode driving circuit.

The case of using the above-mentioned driving circuit as the column electrode driving circuit is explained below.

Suppose the input logic of DISP/GRID (input terminal of a display and detection conversion signal) is "0" in a display period, display data is input from D₀–D₃ (display data input terminals), and the data is latched at data register 104 along with the shift lock input from CP (shift lock input terminal of the data register). Chip-inable 105 counts the shift lock input from CP. When the shift lock reaches a certain number, enable signals are output from one of EIO₁ or EIO₂, which became an output terminal. Thus, data register 104 stops reading data. Data latch/shift register 103 latches the data at data register 104 along with the latch pulse input from LOAD (input terminal of latch pulse or shift pulse). Level shifter 102 shifts the level of 5 V-base output of the data latch/shift register 103, and the LCD driver 101 outputs by selecting V₀ and V₅ for ON data and V₂ and V₃ for OFF data in response to the output of level shifter 102 and the logic of DF (input terminal of a signal for alternating current), /DISPOFF (disable terminal of driver output), COM/SEG (input terminal of a conversion signal for driving row and column electrodes) and COM/SEG.

Suppose the input logic of DISP/GRID is "1" in a detection period, and the data of scanning pulse used for detection is input from one of EIO₁ and EIO₂, which became an input terminal. The data of input scanning pulse is input to data latch/shift register 103, and is shifted along with the shift lock input to LOAD. Level shifter 102 shifts the level of 5 V-type output of data latch/shift register 103, and LCD driver 101 outputs V5 for OFF data and $V_d$ for ON data in response to the output of level shifter 102 and the logic of DF, /DISPOFF, COM/SEG and DIPS/GRID. Also, it is possible that the driver outputs $V_d$ for OFF data and V₅ for ON data.

The case of using the driving circuit as a row electrode driving circuit is explained below.

Suppose the input logic of DISP/GRID in a display period is "0", and the data of scanning pulse used for displaying is input from one of EIO₁ and EIO₂, which became an input terminal. The input data of a scanning pulse is input to data latch/shift register 103, and is shifted along with the shift lock input to LOAD. The circuit outputs by choosing V₀ and V₅ for ON data and V₁ and V₄ for OFF data.

Suppose the input logic of DISP/GRID is "1" in a detection period, and the data of scanning pulse used for detection is input from one of EIO₁ and EIO₂, which became an input terminal. The input data of scanning pulse is input to data latch/shift register 103, and is shifted along with the shift lock input to LOAD. Level shifter 102 shifts the level of 5 V-base output of data latch/shift register 103, and LCD driver 101 outputs V₅ for OFF data and $V_d$ for ON data in response to the output of level shifter 102 and the logic of DF, /DISPOFF, COM/SEG and DIPS/GRID. Also, it is possible that the driver outputs $V_d$ for OFF data and V₅ for ON data.

Input-output logic is shown in the following Table 1.

TABLE 1

| COM/SEG | /DISPOFF | DISP/GRID | DF | DETA | OUT PU |
|---|---|---|---|---|---|
| 0 | 0 | — | — | — | $V_5$ |
| Column electrode drive mode | 1 | 0 | 0 | 0 | $V_3$ |
| | 1 | 0 | 0 | 1 | $V_5$ |
| | 1 | 0 | 1 | 0 | $V_2$ |
| | 1 | 0 | 1 | 1 | $V_0$ |
| | 1 | 1 | 0 | 0 | $V_5$ |
| | 1 | 1 | 0 | 1 | $V_d$ |
| | 1 | 1 | 1 | 0 | $V_d$ |
| | 1 | 1 | 1 | 1 | $V_5$ |
| 1 | 0 | — | — | — | $V_5$ |
| Row electrodes drive mode | 1 | 0 | 0 | 0 | $V_4$ |
| | 1 | 0 | 0 | 1 | $V_0$ |
| | 1 | 0 | 1 | 0 | $V_1$ |
| | 1 | 0 | 1 | 1 | $V_5$ |
| | 1 | 1 | 0 | 0 | $V_5$ |
| | 1 | 1 | 0 | 1 | $V_d$ |
| | 1 | 1 | 1 | 0 | $V_d$ |
| | 1 | 1 | 1 | 1 | $V_5$ |

In any structure satisfying the above-noted driving method, the combinations of output voltage level are not limited to the above-noted combinations.

The invention may be embodied in other forms without departing from the spirit or essential characteristics thereof. The embodiments disclosed in this application are to be considered in all respects as illustrative and not restrictive, the scope of the invention is indicated by the appended claims rather than by the foregoing description, all changes which come within the meaning and range of equivalency of the claims are intended to be embraced therein.

What is claimed is:

1. A display-integrated coordinate input device comprising:

a matrix panel having more than one row electrode (y direction), more than one column electrode (x direction) and a display element sealed between said row electrodes and said column electrodes;

a row electrode device circuit for driving said row electrodes;

a column electro de d rive circuit for driving said column electrodes;

a detection electrode for detecting scanning signals applied to said row electrodes and said column electrodes by electrically coupling said row electrodes and said column electrodes with electrostatic coupling capacity;

a coordinate detection circuit for obtaining positional information from output signal s of said detection electrode;

a correction circuit for correcting coordinates output from said coordinate detection circuit;

a multiplication circuit for multiplying the corrected coordinates output from said correction circuit and for outputting detection coordinates for each x, y position of the matrix panel; and a control circuit for controlling said matrix panel, said row electrode drive circuit, said column electrode drive circuit, said detection electrode, said coordinate detection circuit and said correction circuit;

wherein said row electrodes are disposed at right angles to said column electrodes; and wherein the coordinate detection circuit comprises a first coordinate detection circuit and a second coordinate detection circuit; wherein said first coordinate detection circuit is a magnitude comparator which changes its output as soon as a signal detected by the detection electrode exceeds a predetermined relative potential; wherein said second coordinate detection circuit is a magnitude comparator which changes its output as soon as a signal detected by said detection electrode falls below the predetermined relative potential; and wherein the correction circuit comprises an arithmetic circuit for operating the positions of the detection electrode from two coordinate values transmitted from said coordinate detection circuit.

2. The display-integrated coordinate input device as in claim 1, further comprising a means of switching a relative potential of the magnitude comparator in a row coordinate detection period and a column coordinate detection period.

3. The display-integrated coordinate input device as in claim 1, further comprising a means of switching relative potential of the magnitude comparator by detecting a driving voltage of a matrix panel.

4. The display-integrated coordinate input device as in claim 1, further comprising a means of switching a relative potential of the magnitude comparator in response to a signal intensity generated in the detection electrode.

5. The display-integrated coordinate input device as in claim 1, wherein the correction circuit further comprises an average value circuit which outputs average values of the first coordinate detection circuit and the second coordinate detection circuit; and wherein the arithmetic circuit comprises a selector which selects the output of the second coordinate detection circuit when a coordinate is below a second predetermined value, selects the output of the first coordinate detection circuit when a coordinate is above a first predetermined value, and selects the output of said average value circuit when a coordinate falls between the first predetermined level and the second predetermined level.

6. The display-integrated coordinate input device as in claim 1, wherein the matrix panel comprises column electrodes arranged in a first predetermined direction on a first glass substrate at a first predetermined pitch, and row electrodes arranged in a second predetermined direction, which is at a right angle to said first predetermined direction, on a second glass substrate at a second predetermined pitch: wherein said second glass substrate is disposed so as to face said first glass substrate through the display element, formed as a layer of a display material; wherein said column electrodes and said row electrodes are led to a sealing section in a non-display area with no bending points, while maintaining said first predetermined pitch and said second predetermined pitch respectively; and wherein said non-display area is an area other than a display area where at least said column electrodes and said row electrodes are laminated to each other.

7. The display-integrated coordinate input device as in claim 1, wherein the matrix panel comprises column electrodes arranged in a first predetermined direction on a first glass substrate at a first predetermined pitch, row electrodes arranged in a second predetermined direction, which is at a right angle to said first predetermined direction, on a second glass substrate at a second predetermined pitch, leading electrodes disposed in a non-display area and a conductive film which is applied on said leading electrodes so as to electrically shield said leading electrodes; wherein said second glass substrate is disposed so as to face said first glass substrate through the display element, formed as a layer of a display material; and wherein said non-display area is an area other than a display area where at least said column electrodes and said row electrodes are laminated to each other.

8. The display-integrated coordinate input device as in claim 1, wherein the matrix panel is a liquid crystal panel.

9. A display-integrated coordinate input device comprising:

a matrix panel having more than one row electrode (y direction), more than one column electrode (x direction) and a display element sealed between said row electrodes and said column electrodes;

a row electrode device circuit for driving said row electrodes;

a column electrode drive circuit for driving said column electrodes;

a detection electrode for detecting scanning signals applied to said row electrodes and said column electrodes by electrically coupling said row electrodes and said column electrodes with electrostatic coupling capacity;

a coordinate detection circuit for obtaining positional information from output signals of said detection electrode;

a correction circuit for correcting coordinates output from said coordinate detection circuit; and a control circuit for controlling said matrix panel, said row electrode drive circuit, said column electrode drive circuit, said detection electrode, said coordinate detection circuit and said correction circuit;

wherein said row electrodes are disposed at right angles to said column electrodes; and wherein the coordinate detection circuit comprises a first coordinate detection circuit, a second coordinate detection circuit and a third coordinate detection circuit; wherein said first coordinate detection circuit is a magnitude comparator which changes its output as soon as a signal detected by the detection electrode exceeds a predetermined relative potential; wherein said second coordinate detection circuit is a magnitude comparator which changes its output as soon as a signal detected by said detection electrode falls below the predetermined relative potential; wherein said third coordinate detection circuit is a magnitude comparator which changes its output as soon as a signal detected by the detection electrode reaches a maximum value; and wherein the correction circuit comprises an arithmetic circuit which calculates the position of the detection electrode from three coordinate values transmitted from said first coordinate detection circuit, said second coordinate detection circuit and said third coordinate detection circuit.

10. The display-integrated coordinate input device as in claim 9, further comprising a means of switching a relative potential of the magnitude comparator in a row coordinate detection period and a column coordinate detection period.

11. The display-integrated coordinate input device as in claim 9, further comprising a means of switching a relative potential of the magnitude comparator by detecting driving voltage of a matrix panel.

12. The display-integrated coordinate input device as in claim 9, further comprising a means of switching a relative potential of the magnitude comparator in response to the signal strength generated at the detection electrode.

13. The display-integrated coordinate input device as in claim 9, wherein the arithmetic circuit comprises a selector for selecting the output of the second coordinate detection circuit when a coordinate is below a second predetermined value, for selecting the output of the first coordinate detection circuit when the coordinate is above a first predetermined value, and for selecting the output of the third coordinate detection circuit when the coordinate is between the first predetermined value and the second predetermined value.

14. The display-integrated coordinate input device as in claim 9, further comprising a means for utilizing the output of the second coordinate detection circuit when a coordinate is below a second predetermined value, the output of the first coordinate detection circuit when the coordinate is above a first predetermined value and the output of the third coordinate detection ciruit when a coordinate falls between the first predetermined value and the second predetermined value; and wherein said means gradually changes mixing ratios of outputs in response to the distance from a switching point.

15. A display-integrated coordinate input device comprising:
   a matrix panel having more than one row electrode (y direction), more than one column electrode (x direction), dummy electrodes which are electrically insulated from said column electrodes and said row electrodes and are formed between tabs at a leading section of said matrix panel, and a display element sealed between said row electrodes and said column electrodes;
   a row electrode drive circuit for driving said row electrodes;
   a column electrode drive circuit for driving said column electrodes;
   a dummy electrode drive circuit connected to said dummy electrodes which outputs a fixed voltage in a coordinate detection period;
   a detection electrode for detecting scanning signals applied to said row electrodes and said column electrodes by electrically coupling said row electrodes and said column electrodes with electrostatic coupling capacity;
   a coordinate detection circuit for obtaining positional information from output signals of said detection electrode; and
   a control circuit for controlling said matrix panel, said row electrode drive circuit, said column electrode drive circuit, said dummy electrode drive circuit, said detection electrode, and said coordinate detection circuit;
   wherein said row electrodes are disposed at right angles to said column electrodes.

16. The display-integrated coordinate input device as in claim 15, wherein the dummy electrodes on the matrix panel are provided with voltage at a level so that the display element does not respond.

17. The display-integrated coordinate input device as in claim 15, wherein the dummy electrodes are provided with signals for alternating current as applied voltage which are used in a display mode period of the matrix panel.

18. The display-integrated coordinate input device as in claim 15, wherein the matrix panel comprises column electrodes arranged in a first predetermined direction on a first glass substrate at a first predetermined pitch, and row electrodes arranged in a second predetermined direction, which is at right angle to said first predetermined direction, on a second glass substrate at a second predetermined pitch; wherein said second glass substrate is disposed so as to face said first glass substrate through the display element, formed as a layer of a display material; wherein said column electrodes and said row electrodes are led to a sealing section in a non-display area with no bending points, while maintaining said first predetermined pitch and said second predetermined pitch respectively; and wherein said non-display area is an area not including a display area where at least said column electrodes and said row electrodes are laminated to each other.

19. The display-integrated coordinate input device as in claim 15, wherein the matrix panel comprises column electrodes arranged in a first predetermined direction on a first glass substrate at a first predetermined pitch, row electrodes arranged in a second predetermined direction, which is at a right angle to said first predetermined direction on a second glass substrate at a second predetermined pitch, leading electrodes disposed in a nondisplay area and a conductive film which is applied on said leading electrodes so as to electrically shield said leading electrodes; wherein said second glass substrate is disposed so as to face said first glass substrate through the display element, formed as a layer of a display material; and wherein said non-display area is an area not including a display area where at least said column electrodes and said row electrodes are laminated to each other.

20. The display-integrated coordinate input device as in claim 15, wherein the matrix panel is a liquid crystal panel.

21. A display-integrated coordinate input device comprising:
   a matrix panel having more than one row electrode (y direction) and more than one column electrode (x direction);
   a row electrode drive circuit which applies a row scanning pulse for display in response to driving conditions of said matrix panel in a display period, and supplies, by switching, a row detecting pulse for coordinate detection having a constant amplitude in a detection period, regardless of driving conditions of said display period;
   a column electrode drive circuit which applies a column scanning pulse for display in response to driving conditions of said matrix panel in a display period, and supplies, by switching, a column detecting pulse for coordinate detection having a constant amplitude in a detection period, regardless of driving conditions of said display period;
   a drive power circuit which supplies voltage at a level required for driving said column electrodes and row electrodes to said column electrode drive circuit and said row electrode drive circuit;
   a detection electrode for detecting scanning signals for detection applied to said row electrodes and said column electrodes by electrically coupling said row electrodes and said column electrodes with electrostatic coupling capacity;
   a multiplication circuit for multiplying coordinates obtained as the positional information by said coordinate detection circuit and for outputting detection coordinates for each x, y position of the matrix panel; and
   a control circuit for controlling said matrix panel, said row electrode drive circuit, said column electrode drive circuit, said drive power circuit, said multiplication circuit and said detection electrode;
   wherein said row electrodes are disposed at right angles to said column electrodes.

22. The display-integrated coordinate input device as in claim 21, wherein the scanning pulse for detection has an amplitude higher than maximum amplitude of a driving pulse in a display period.

23. The display-integrated coordinate input device as in claim 21, wherein the column electrode drive circuit comprises selection circuit, which outputs by selecting driving voltage for detection in a display period, and a driving power source; and wherein the row electrode drive circuit comprises a selection circuit, which outputs by selecting a driving voltage for detection in a display period, and a driving power source.

24. The display-integrated coordinate input device as in claim 21, wherein the matrix panel comprises column electrodes arranged in a first predetermined direction on a first glass substrate at a first predetermined pitch, and row electrodes arranged in a second predetermined direction, which is at a right angle to said first predetermined direction, on a second glass substrate at a second predetermined pitch; wherein said second glass substrate is disposed so as to face said first glass substrate through the display element, formed as a layer of a display material; wherein said column electrodes and said row electrodes are led to a sealing section in a non-display area with no bending points, while maintaining said first predetermined pitch and said second predetermined pitch respectively; and wherein said non-display area is an area not including a display area where at least said column electrodes and said row electrodes are laminated to each other.

25. The display-integrated coordinate input device as in claim 21, wherein the matrix panel comprises column electrodes arranged in a first predetermined direction on a first glass substrate at a first predetermined pitch, row electrodes arranged in a second predetermined direction, which is at a right angle to said first predetermined direction, on a second glass substrate at a second predetermined pitch, leading electrodes disposed in a nondisplay area and a conductive film which is applied on said leading electrodes so as to electrically shield said leading electrodes; wherein said second glass substrate is disposed so as to face said first glass substrate through the display element, formed as a layer of a display material; and wherein said non-display area is an area not including a display area where at least said column electrodes and said row electrodes are laminated to each other.

26. The display-integrated coordinate input device as in claim 21, wherein the matrix panel is a liquid crystal panel.

* * * * *